US011632677B2

(12) United States Patent
Gunasekara et al.

(10) Patent No.: US 11,632,677 B2
(45) Date of Patent: Apr. 18, 2023

(54) METHODS AND APPARATUS FOR DYNAMIC CONTROL AND UTILIZATION OF QUASI-LICENSED WIRELESS SPECTRUM

(71) Applicant: CHARTER COMMUNICATIONS OPERATING, LLC, St. Louis, MO (US)

(72) Inventors: Don Gunasekara, Reston, VA (US); Umamaheswar Kakinada, Carpentersville, IL (US); Ahmed Bencheikh, Lorton, VA (US); Shane Newberg, St. Louis, MO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 233 days.

(21) Appl. No.: 16/741,626

(22) Filed: Jan. 13, 2020

(65) Prior Publication Data
US 2020/0228993 A1    Jul. 16, 2020

Related U.S. Application Data

(62) Division of application No. 15/677,940, filed on Aug. 15, 2017, now Pat. No. 10,536,859.

(51) Int. Cl.
*H04W 16/14* (2009.01)
*H04W 36/16* (2009.01)
(Continued)

(52) U.S. Cl.
CPC ......... *H04W 16/14* (2013.01); *H04W 16/10* (2013.01); *H04W 36/0022* (2013.01); *H04W 36/165* (2013.01); *H04W 36/22* (2013.01)

(58) Field of Classification Search
CPC ............... H04W 16/14; H04W 16/10; H04W 36/0022; H04W 36/165; H04W 36/22
See application file for complete search history.

(56) References Cited

U.S. PATENT DOCUMENTS

| 5,995,499 A | 11/1999 | Hottinen et al. |
| 6,154,648 A | 11/2000 | Comer |

(Continued)

FOREIGN PATENT DOCUMENTS

| CA | 2546598 C | 12/2011 |
| CA | 2643806 C | 6/2013 |

(Continued)

OTHER PUBLICATIONS

Souryal, Michael R., et al., "Effect of Federal Incumbent Activity or on CBRS Commercial Service", International Symposium on Dynamic Spectrum Access Networks (DySPAN), IEEE 2019.

(Continued)

*Primary Examiner* — Sam Bhattacharya
(74) *Attorney, Agent, or Firm* — Patent Beach PC

(57) ABSTRACT

Methods and apparatus for providing quasi-licensed spectrum access within an area or venue. In one embodiment, the quasi-licensed spectrum utilizes 3.5 GHz CBRS (Citizens Broadband Radio Service) spectrum allocated by a Federal or commercial SAS (Spectrum Access System) to a managed content delivery network that includes one or more wireless access nodes (e.g., CBSDs and APs) in data communication with a controller. In one variant, the controller dynamically allocates (i) spectrum within the area or venue within CBRS bands, and (ii) MSO users or subscribers to CBRS bands or WLAN (e.g., public ISM) bands in to manage interference between the coexisting networks, and maximize user experience. In another variant, the controller cooperates with a provisioning server to implement a client (Continued)

device application program or "app" on MSO user or subscriber client devices which enables inter-RAT access.

20 Claims, 22 Drawing Sheets

(51) Int. Cl.
*H04W 36/00* (2009.01)
*H04W 16/10* (2009.01)
*H04W 36/22* (2009.01)

(56) References Cited

U.S. PATENT DOCUMENTS

| | | |
|---|---|---|
| 6,356,560 B1 | 3/2002 | Venters et al. |
| 6,757,837 B1 | 6/2004 | Platt et al. |
| 6,771,953 B1 | 8/2004 | Chow et al. |
| 6,782,262 B1 | 8/2004 | Lundborg |
| 7,266,726 B1 | 9/2007 | Ladd et al. |
| 7,293,201 B2 | 11/2007 | Ansari |
| 7,592,912 B2 | 9/2009 | Hasek et al. |
| 7,602,820 B2 | 10/2009 | Helms et al. |
| 7,698,606 B2 | 4/2010 | Ladd et al. |
| 8,024,607 B2 | 9/2011 | Ladd et al. |
| 8,046,636 B2 | 10/2011 | Ladd et al. |
| 8,095,610 B2 | 1/2012 | Gould et al. |
| 8,170,065 B2 | 5/2012 | Hasek et al. |
| 8,189,465 B1 | 5/2012 | Pawar et al. |
| 8,302,111 B2 | 10/2012 | Ladd et al. |
| 8,321,723 B2 | 11/2012 | Ladd et al. |
| 8,718,100 B2 | 5/2014 | Markley et al. |
| 8,719,847 B2 | 5/2014 | Agarwal et al. |
| 8,799,723 B2 | 8/2014 | Ladd et al. |
| 8,997,136 B2 | 3/2015 | Brooks et al. |
| 9,166,891 B2 | 10/2015 | Hu et al. |
| 9,185,341 B2 | 11/2015 | Hardin |
| 9,213,538 B1 | 12/2015 | Ladd et al. |
| 9,264,751 B2 | 2/2016 | Sarosi et al. |
| 9,300,445 B2 | 3/2016 | Hardin |
| 9,386,496 B2 | 7/2016 | Gupta et al. |
| 9,413,651 B2 | 8/2016 | Tsym et al. |
| 9,414,111 B2 | 8/2016 | Hasek et al. |
| 9,472,091 B2 | 10/2016 | Stern et al. |
| 9,479,404 B2 | 10/2016 | Ladd et al. |
| 9,526,056 B2 | 12/2016 | Tomici et al. |
| 9,564,932 B1 | 2/2017 | Pack et al. |
| 9,591,491 B2 | 3/2017 | Tapia et al. |
| 9,612,816 B2 | 4/2017 | Choi et al. |
| 9,654,149 B2 | 5/2017 | Piipponen et al. |
| 9,730,135 B1 | 8/2017 | Rahman |
| 9,730,143 B2 | 8/2017 | Gormley et al. |
| 9,769,692 B2 | 9/2017 | Freda et al. |
| 9,807,778 B2 | 10/2017 | Ma et al. |
| 9,813,148 B2 | 11/2017 | Syed et al. |
| 10,098,568 B2 | 10/2018 | Gazdzinski |
| 10,135,730 B2 | 11/2018 | Chou |
| 10,164,858 B2 | 12/2018 | Gunasekara et al. |
| 10,269,229 B2 | 4/2019 | Stern et al. |
| 10,340,976 B2 | 7/2019 | Kakinada et al. |
| 10,405,192 B2 | 9/2019 | Kakinada et al. |
| 10,452,342 B2 | 10/2019 | Triplett |
| 10,484,876 B2 | 11/2019 | Shah et al. |
| 10,492,204 B2 | 11/2019 | Kakinada et al. |
| 10,499,409 B2 | 12/2019 | Shattil |
| 10,506,456 B2 | 12/2019 | Lou et al. |
| 10,536,859 B2 | 1/2020 | Gunasekara et al. |
| 10,680,883 B2 | 6/2020 | Hall et al. |
| 10,805,562 B2 | 10/2020 | Nakamura et al. |
| 10,885,569 B2 | 1/2021 | Ogaz et al. |
| 10,966,073 B2 | 3/2021 | Petersen |
| 10,979,768 B2 | 4/2021 | Sarosi et al. |
| 10,991,227 B2 | 4/2021 | Stern et al. |
| 11,026,205 B2 | 6/2021 | Hmimy et al. |
| 2003/0158906 A1 | 8/2003 | Hayes |
| 2003/0229899 A1 | 12/2003 | Thompson et al. |
| 2004/0001021 A1 | 1/2004 | Choo et al. |
| 2004/0139177 A1 | 7/2004 | Yook |
| 2006/0188004 A1 | 8/2006 | Kizu et al. |
| 2006/0268676 A1 | 11/2006 | Gore et al. |
| 2007/0022459 A1 | 1/2007 | Gaebel, Jr. et al. |
| 2007/0094691 A1 | 4/2007 | Gazdzinski |
| 2008/0010506 A1 | 1/2008 | Tabei et al. |
| 2008/0097913 A1 | 4/2008 | Dicks et al. |
| 2008/0220786 A1 | 9/2008 | Beacham |
| 2008/0220788 A1 | 9/2008 | Stanwood et al. |
| 2008/0235746 A1 | 9/2008 | Peters et al. |
| 2009/0028182 A1 | 1/2009 | Brooks et al. |
| 2009/0034443 A1 | 2/2009 | Walker et al. |
| 2009/0129273 A1 | 5/2009 | Zou |
| 2009/0163140 A1 | 6/2009 | Packham et al. |
| 2009/0253438 A1 | 10/2009 | Chater-Lea et al. |
| 2010/0035610 A1 | 2/2010 | Narang et al. |
| 2010/0094956 A1 | 4/2010 | Zuckerman et al. |
| 2010/0128608 A1 | 5/2010 | Zou et al. |
| 2010/0202450 A1 | 8/2010 | Ansari et al. |
| 2010/0234042 A1 | 9/2010 | Chan et al. |
| 2010/0309806 A1 | 12/2010 | Wu et al. |
| 2011/0014924 A1 | 1/2011 | Hwang et al. |
| 2011/0210849 A1 | 9/2011 | Howard et al. |
| 2011/0292970 A1 | 12/2011 | Lansford et al. |
| 2012/0079507 A1 | 3/2012 | Agarwal et al. |
| 2013/0191495 A1 | 7/2013 | Almstrand et al. |
| 2013/0258997 A1 | 10/2013 | Chen |
| 2013/0281092 A1 | 10/2013 | Gassend |
| 2013/0288675 A1 | 10/2013 | Gassend |
| 2013/0303145 A1 | 11/2013 | Harrang et al. |
| 2013/0315124 A1 | 11/2013 | Rapaport et al. |
| 2013/0336175 A1 | 12/2013 | Um et al. |
| 2014/0139422 A1 | 5/2014 | Mistry et al. |
| 2014/0194068 A1 | 7/2014 | Coppage et al. |
| 2014/0215457 A1 | 7/2014 | Gava et al. |
| 2014/0241187 A1 | 8/2014 | Barkay et al. |
| 2014/0269526 A1 | 9/2014 | Mitola, III |
| 2014/0308986 A1 | 10/2014 | Yang et al. |
| 2015/0055623 A1 | 2/2015 | Li |
| 2015/0071239 A1 | 3/2015 | Zhang et al. |
| 2015/0120000 A1 | 4/2015 | Coffey et al. |
| 2015/0208262 A1 | 7/2015 | Siomina |
| 2015/0235670 A1 | 8/2015 | Kim et al. |
| 2015/0280847 A1 | 10/2015 | Somasundaram et al. |
| 2015/0334664 A1 | 11/2015 | Sawai et al. |
| 2016/0007147 A1 | 1/2016 | Zhang et al. |
| 2016/0127185 A1 | 5/2016 | Mcallister et al. |
| 2016/0165066 A1 | 6/2016 | Yang et al. |
| 2016/0174043 A1 | 6/2016 | Ko et al. |
| 2016/0174268 A1 | 6/2016 | Hu et al. |
| 2016/0182134 A1 | 6/2016 | Kol et al. |
| 2016/0212031 A1 | 7/2016 | Jain et al. |
| 2016/0234746 A1 | 8/2016 | Gopal et al. |
| 2016/0330743 A1 | 11/2016 | Das et al. |
| 2016/0381600 A1 | 12/2016 | Aksu |
| 2017/0026157 A1 | 1/2017 | Bugenhagen et al. |
| 2017/0104644 A1 | 4/2017 | Ladd et al. |
| 2017/0140286 A1 | 5/2017 | Basu et al. |
| 2017/0155703 A1 | 6/2017 | Hao et al. |
| 2017/0164326 A1 | 6/2017 | Worrall |
| 2017/0187966 A1 | 6/2017 | Oetting |
| 2017/0188241 A1 | 6/2017 | Mueck et al. |
| 2017/0208540 A1 | 7/2017 | Egner et al. |
| 2017/0237767 A1 | 8/2017 | George et al. |
| 2017/0257750 A1 | 9/2017 | Gunasekara et al. |
| 2017/0272955 A1* | 9/2017 | Sadek ............... H04L 1/0001 |
| 2017/0295497 A1 | 10/2017 | Macmullan et al. |
| 2017/0295578 A1 | 10/2017 | Khoshnevisan et al. |
| 2017/0303138 A1 | 10/2017 | Barmettler et al. |
| 2017/0311290 A1 | 10/2017 | Adjakple et al. |
| 2017/0318472 A1 | 11/2017 | Yu et al. |
| 2017/0359731 A1 | 12/2017 | Soldati et al. |
| 2018/0007587 A1 | 1/2018 | Feldman et al. |
| 2018/0034524 A1 | 2/2018 | Pao et al. |
| 2018/0049036 A1 | 2/2018 | Sethi et al. |
| 2018/0063736 A1 | 3/2018 | Sadeghi et al. |
| 2018/0063758 A1 | 3/2018 | Velu |
| 2018/0115903 A1 | 4/2018 | Badic et al. |

(56) References Cited

U.S. PATENT DOCUMENTS

| | | |
|---|---|---|
| 2018/0124613 A1 | 5/2018 | Kang et al. |
| 2018/0132112 A1 | 5/2018 | Khoshnevisan et al. |
| 2018/0146058 A1 | 5/2018 | Somayazulu |
| 2018/0146408 A1 | 5/2018 | Meylan |
| 2018/0167948 A1 | 6/2018 | Egner et al. |
| 2018/0181119 A1 | 6/2018 | Lee et al. |
| 2018/0199214 A1 | 7/2018 | Shen |
| 2018/0234403 A1 | 8/2018 | Casella |
| 2018/0235007 A1 | 8/2018 | Gou |
| 2018/0239425 A1 | 8/2018 | Jang |
| 2018/0242184 A1 | 8/2018 | Yerramalli et al. |
| 2018/0255575 A1 | 9/2018 | Yu |
| 2018/0279212 A1 | 9/2018 | Malik |
| 2018/0300551 A1 | 10/2018 | Luccin et al. |
| 2018/0316563 A1 | 11/2018 | Kumar et al. |
| 2018/0323938 A1 | 11/2018 | Takeda et al. |
| 2018/0351665 A1 | 12/2018 | Fukuta et al. |
| 2018/0352386 A1 | 12/2018 | Gunasekara et al. |
| 2018/0375887 A1 | 12/2018 | Dezent et al. |
| 2019/0021012 A1 | 1/2019 | Beck et al. |
| 2019/0028182 A1 | 1/2019 | Smyth et al. |
| 2019/0037480 A1 | 1/2019 | Sun et al. |
| 2019/0044614 A1 | 2/2019 | Khoshnevisan et al. |
| 2019/0081690 A1 | 3/2019 | Mueck et al. |
| 2019/0082447 A1 | 3/2019 | Harsha et al. |
| 2019/0098510 A1 | 3/2019 | Guo et al. |
| 2019/0098632 A1 | 3/2019 | Martin et al. |
| 2019/0104033 A1 | 4/2019 | Carey |
| 2019/0104551 A1 | 4/2019 | Deenoo |
| 2019/0115950 A1 | 4/2019 | Kakinada et al. |
| 2019/0150182 A1 | 5/2019 | Koorapaty |
| 2019/0182895 A1 | 6/2019 | Di Girolamo |
| 2019/0222266 A1 | 7/2019 | Cui et al. |
| 2019/0239190 A1 | 8/2019 | Patel |
| 2019/0289470 A1 | 9/2019 | Vaidya et al. |
| 2019/0293748 A1 | 9/2019 | Gulati et al. |
| 2019/0296789 A1 | 9/2019 | Yu et al. |
| 2019/0319814 A1 | 10/2019 | Das |
| 2019/0319858 A1 | 10/2019 | Das et al. |
| 2019/0320250 A1 | 10/2019 | Hoole et al. |
| 2019/0320322 A1 | 10/2019 | Jayawardene et al. |
| 2019/0320494 A1 | 10/2019 | Jayawardene et al. |
| 2019/0349848 A1 | 11/2019 | Bali |
| 2019/0364492 A1 | 11/2019 | Azizi et al. |
| 2019/0364565 A1 | 11/2019 | Hmimy et al. |
| 2019/0373615 A1 | 12/2019 | Cimpu |
| 2019/0393926 A1 | 12/2019 | Kakinada et al. |
| 2019/0394790 A1 | 12/2019 | Damnjanovic et al. |
| 2020/0015147 A1 | 1/2020 | Malkamaki et al. |
| 2020/0021689 A1 | 1/2020 | Sultana et al. |
| 2020/0025629 A1 | 1/2020 | Zinger et al. |
| 2020/0053545 A1 | 2/2020 | Wong et al. |
| 2020/0059795 A1 | 2/2020 | Kakinada et al. |
| 2020/0084759 A1 | 3/2020 | Liu et al. |
| 2020/0106678 A1 | 4/2020 | Grill et al. |
| 2020/0126551 A1 | 4/2020 | Xiong et al. |
| 2020/0178237 A1 | 6/2020 | Kakinada et al. |
| 2020/0186378 A1 | 6/2020 | Six et al. |
| 2020/0187150 A1 | 6/2020 | Eisner |
| 2020/0221392 A1 | 7/2020 | Xue et al. |
| 2020/0252933 A1 | 8/2020 | Hmimy et al. |
| 2020/0259896 A1 | 8/2020 | Sachs et al. |
| 2020/0275457 A1 | 8/2020 | Hmimy |
| 2020/0281008 A1 | 9/2020 | Aboul-Magd et al. |
| 2020/0344515 A1 | 10/2020 | Wong et al. |
| 2020/0351989 A1 | 11/2020 | Ahmet et al. |
| 2020/0412565 A1 | 12/2020 | Joshua |
| 2021/0014693 A1 | 1/2021 | Syed et al. |
| 2021/0026711 A1 | 1/2021 | Ovadia et al. |
| 2021/0051653 A1 | 2/2021 | Park |
| 2021/0076424 A1 | 3/2021 | Mukherjee et al. |
| 2021/0084117 A1 | 3/2021 | Ovadia et al. |
| 2021/0105633 A1 | 4/2021 | Vaidya et al. |
| 2021/0120315 A1 | 4/2021 | Makinen et al. |
| 2021/0126662 A1 | 4/2021 | Solichien |
| 2021/0127423 A1 | 4/2021 | Park |
| 2021/0136838 A1 | 5/2021 | Khalid et al. |
| 2021/0204322 A1 | 7/2021 | Damnjanovic |
| 2021/0219143 A1 | 7/2021 | Khalid et al. |
| 2021/0219303 A1 | 7/2021 | Khalid et al. |
| 2021/0227396 A1 | 7/2021 | Khalid et al. |
| 2021/0235495 A1 | 7/2021 | Xu et al. |
| 2021/0258868 A1 | 8/2021 | Wong et al. |
| 2021/0266914 A1 | 8/2021 | Yoo et al. |
| 2021/0274333 A1 | 9/2021 | Petersen |
| 2021/0274499 A1 | 9/2021 | Hmimy et al. |
| 2021/0274506 A1 | 9/2021 | Raghavan et al. |
| 2021/0297979 A1 | 9/2021 | Hmimy et al. |
| 2021/0376905 A1 | 12/2021 | Zhou et al. |
| 2022/0007200 A1 | 1/2022 | Sevindik |
| 2022/0007374 A1 | 1/2022 | Sevindik |
| 2022/0078804 A1 | 3/2022 | Hmimy |
| 2022/0167176 A1 | 5/2022 | Khalid |
| 2022/0183093 A1 | 6/2022 | Sevindik et al. |
| 2022/0191675 A1 | 6/2022 | Mukherjee |

FOREIGN PATENT DOCUMENTS

| | | |
|---|---|---|
| CA | 3097140 A1 | 10/2019 |
| CN | 111989900 A | 11/2020 |
| EP | 1769634 A2 | 4/2007 |
| EP | 2294860 A1 | 3/2011 |
| EP | 3741168 A1 | 11/2020 |
| EP | 3782341 A1 | 2/2021 |
| EP | 3797546 A1 | 3/2021 |
| GB | 2585394 A | 1/2021 |
| JP | 2021510973 A | 4/2021 |
| WO | WO-2005052766 A2 | 6/2005 |
| WO | WO-2013020599 A1 | 2/2013 |
| WO | WO-2017130494 A1 | 8/2017 |
| WO | WO-2017186294 A1 | 11/2017 |
| WO | WO-2019140461 A1 | 7/2019 |
| WO | WO-2019204165 A1 | 10/2019 |
| WO | WO-2019226838 A1 | 11/2019 |
| WO | WO-2020160403 A1 | 8/2020 |
| WO | WO-2021050957 A1 | 3/2021 |
| WO | WO-2021067810 A1 | 4/2021 |
| WO | WO-2021086986 A1 | 5/2021 |

OTHER PUBLICATIONS

Palola M., et al., "Field Trial of the 3.5 GHz Citizens Broadband Radio ServiceGoverned by a Spectrum Access System (SAS)," IEEE International Symposium on Dynamic Spectrum Access Networks, 2017, 9 pages.

Deering et al., Internet Protocol, Version 6 (IPv6) Specification, Dec. 1998, 39 pages.

Internet Protocol DARPA Internet Program Protocol Specification, Sep. 1981, 51 pages.

Signaling Protocols and Procedures for Citizens Broadband Radio Service (CBRS): Spectrum Access System, (SAS)—Citizens Broadband Radio Service Device (CBSD) Interface Technical Specification—Document WINNF-TS-0016, Version V1.2.1, Jan. 3, 2018.

\* cited by examiner

METHODS AND APPARATUS FOR DYNAMIC CONTROL AND UTILIZATION OF QUASI-LICENSED WIRELESS SPECTRUM

PRIORITY

This application is a divisional of and claims priority to co-owned U.S. patent application Ser. No. 15/677,940 filed on Aug. 15, 2017 of the same title, and issuing as U.S. Pat. No. 10,536,859 on Jan. 14, 2020, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of wireless networks and specifically, in one or more exemplary embodiments, to methods and apparatus for dynamically controlling and optimizing utilization of quasi-licensed radio frequency spectrum, such as for example those providing connectivity via Citizens Broadband Radio Service (CBRS) technologies.

2. Description of Related Technology

A multitude of wireless networking technologies, also known as Radio Access Technologies ("RATs"), provide the underlying means of connection for radio-based communication networks to user devices. Such RATs often utilize licensed radio frequency spectrum (i.e., that allocated by the FCC per the Table of Frequency Allocations as codified at Section 2.106 of the Commission's Rules. In the United States, regulatory responsibility for the radio spectrum is divided between the U.S. Federal Communications Commission (FCC) and the National Telecommunications and Information Administration (NTIA). The FCC, which is an independent regulatory agency, administers spectrum for non-Federal use (i.e., state, local government, commercial, private internal business, and personal use) and the NTIA, which is an operating unit of the Department of Commerce, administers spectrum for Federal use (e.g., use by the Army, the FAA, and the FBI). Currently only frequency bands between 9 kHz and 275 GHz have been allocated (i.e., designated for use by one or more terrestrial or space radio communication services or the radio astronomy service under specified conditions). For example, a typical cellular service provider might utilize spectrum for so-called "3G" (third generation) and "4G" (fourth generation) wireless communications as shown in Table 1 below:

TABLE 1

| Technology | Bands |
| --- | --- |
| 3G | 850 MHz Cellular, Band 5 (GSM/GPRS/EDGE). |
| | 1900 MHz PCS, Band 2 (GSM/GPRS/EDGE). |
| | 850 MHz Cellular, Band 5 (UMTS/HSPA+ up to 21 Mbit/s). |
| | 1900 MHz PCS, Band 2 (UMTS/HSPA+ up to 21 Mbit/s). |
| 4G | 700 MHz Lower B/C, Band 12/17 (LTE). |
| | 850 MHz Cellular, Band 5 (LTE). |
| | 1700/2100 MHz AWS, Band 4 (LTE). |
| | 1900 MHz PCS, Band 2 (LTE). |
| | 2300 MHz WCS, Band 30 (LTE). |

Alternatively, unlicensed spectrum may be utilized, such as that within the so-called ISM-bands. The industrial, scientific and medical (ISM) bands are defined by the ITU Radio Regulations (Article 5) in footnotes 5.138, 5.150, and 5.280 of the Radio Regulations. In the United States, uses of the ISM bands are governed by Part 18 of the Federal Communications Commission (FCC) rules, while Part 15 contains the rules for unlicensed communication devices, even those that share ISM frequencies. Table 2 below shows typical ISM frequency allocations:

TABLE 2

| Frequency range | Type | Center frequency | Availability | Licensed users |
| --- | --- | --- | --- | --- |
| 6.765 MHz-6.795 MHz | A | 6.78 MHz | Subject to local acceptance | Fixed service & mobile service |
| 13.553 MHz-13.567 MHz | B | 13.56 MHz | Worldwide | Fixed & mobile services except aeronautical mobile (R) service |
| 26.957 MHz-27.283 MHz | B | 27.12 MHz | Worldwide | Fixed & mobile service except aeronautical mobile service, CB radio |
| 40.66 MHz-40.7 MHz | B | 40.68 MHz | Worldwide | Fixed, mobile services & earth exploration-satellite service |
| 433.05 MHz-434.79 MHz | A | 433.92 MHz | only in Region 1, subject to local acceptance | amateur service & radiolocation service, additional apply the provisions of footnote 5.280 |
| 902 MHz-928 MHz | B | 915 MHz | Region 2 only (with some exceptions) | Fixed, mobile except aeronautical mobile & radiolocation service; in |

TABLE 2-continued

| Frequency range | Type | Center frequency | Availability | Licensed users |
|---|---|---|---|---|
| | | | | Region 2 additional amateur service |
| 2.4 GHz-2.5 GHz | B | 2.45 GHz | Worldwide | Fixed, mobile, radiolocation, amateur & amateur-satellite service |
| 5.725 GHz-5.875 GHz | B | 5.8 GHz | Worldwide | Fixed-satellite, radiolocation, mobile, amateur & amateur-satellite service |
| 24 GHz-24.25 GHz | B | 24.125 GHz | Worldwide | Amateur, amateur-satellite, radiolocation & earth exploration-satellite service (active) |
| 61 GHz-61.5 GHz | A | 61.25 GHz | Subject to local acceptance | Fixed, inter-satellite, mobile & radiolocation service |
| 122 GHz-123 GHz | A | 122.5 GHz | Subject to local acceptance | Earth exploration-satellite (passive), fixed, inter-satellite, mobile, space research (passive) & amateur service |
| 244 GHz-246 GHz | A | 245 GHz | Subject to local acceptance | Radiolocation, radio astronomy, amateur & amateur-satellite service |

ISM bands are also been shared with (non-ISM) license-free communications applications such as wireless sensor networks in the 915 MHz and 2.450 GHz bands, as well as wireless LANs and cordless phones in the 915 MHz, 2.450 GHz, and 5.800 GHz bands.

Additionally, the 5 GHz band has been allocated for use by, e.g., WLAN equipment, as shown in Table 3:

TABLE 3

| Band Name | Frequency Band | Dynamic Freq. Selection Required (DFS)? |
|---|---|---|
| UNII-1 | 5.15 to 5.25 GHz | No |
| UNII-2 | 5.25 to 5.35 GHz | Yes |
| UNII-2 Extended | 5.47 to 5.725 GHz | Yes |
| UNII-3 | 5.725 to 5.825 GHz | No |

User client devices (e.g., smartphone, tablet, phablet, laptop, smartwatch, or other wireless-enabled devices, mobile or otherwise) generally support multiple RATs that enable the devices to connect to one another, or to networks (e.g., the Internet, intranets, or extranets), often including RATs associated with both licensed and unlicensed spectrum. In particular, wireless access to other networks by client devices is made possible by wireless technologies that utilize networked hardware, such as a wireless access point ("WAP" or "AP"), small cells, femtocells, or cellular towers, serviced by a backend or backhaul portion of service provider network (e.g., a cable network). A user may generally access the network at a "hotspot," a physical location at which the user may obtain access by connecting to modems, routers, APs, etc. that are within wireless range.

CBRS—

In 2016, the FCC made available Citizens Broadband Radio Service (CBRS) spectrum in the 3550-3700 MHz (3.5 GHz) band, making 150 MHz of spectrum available for mobile broadband and other commercial users. The CBRS is unique, in that it makes available a comparatively large amount of spectrum (frequency bandwidth) without the need for expensive auctions, and without ties to a particular operator or service provider.

Moreover, the CBRS spectrum is suitable for shared use between government and commercial interests, based on a system of existing "incumbents," including the Department of Defense (DoD) and fixed satellite services. Specifically, a three-tiered access framework for the 3.5 GHz is used; i.e., (i) an Incumbent Access tier 102, (ii) Priority Access tier 104, and (iii) General Authorized Access tier 106. See FIG. 1. The three tiers are coordinated through one or more dynamic Federal Spectrum Access Systems (FSAS) 202 as shown in FIG. 2.

Incumbent Access (existing DOD and satellite) users 102 include authorized federal and grandfathered Fixed Satellite Service (FSS) users currently operating in the 3.5 GHz band shown in FIG. 1. These users will be protected from harmful interference from Priority Access License (PAL) and General Authorized Access (GAA) users. The sensor networks, operated by Environmental Sensing Capability (ESC) operators, make sure that incumbents and others utilizing the spectrum are protected from interference.

The Priority Access tier 104 (including acquisition of spectrum for up to three years through an auction process) consists of Priority Access Licenses (PALs) that will be assigned using competitive bidding within the 3550-3650 MHz portion of the band. Each PAL is defined as a non-renewable authorization to use a 10 MHz channel in a single census tract for three years. Up to seven (7) total PALs may be assigned in any given census tract, with up to four PALs going to any single applicant. Applicants may acquire up to two-consecutive PAL terms in any given license area during the first auction.

The General Authorized Access tier 106 (for any user with an authorized 3.5 GHz device) is licensed-by-rule to permit open, flexible access to the band for the widest possible group of potential users. General Authorized Access users are permitted to use any portion of the 3550-3700 MHz band not assigned to a higher tier user and may also operate opportunistically on unused Priority Access channels. See FIG. 2a.

The FCC's three-tiered spectrum sharing architecture of FIG. 1 utilizes "fast-track" band (3550-3700 MHz) identified by PCAST and NTIA, while Tier 2 and 3 are regulated under a new Citizens Broadband Radio Service (CBRS). CBSDs (Citizens Broadband radio Service Devices—in effect, wireless access points) 206 (FIG. 2) can only operate under authority of a centralized Spectrum Access System (SAS) 202. Rules are optimized for small-cell use, but also accommodate point-to-point and point-to-multipoint, especially in rural areas.

Under the FCC system, the standard FSAS 202 includes the following elements: (1) CBSD registration; (2) interference analysis; (3) incumbent protection; (4) PAL license validation; (5) CBSD channel assignment; (6) CBSD power limits; (7) PAL protection; and (8) FSAS-to-FSAS coordination. As shown in FIG. 2, these functions are provided for by, inter alia, an incumbent detection (i.e., environmental sensing) function 207 configured to detect use by incumbents, and an incumbent information function 209 configured to inform the incumbent when use by another user occurs. An FCC database 211 is also provided, such as for PAL license validation, CBSD registration, and other functions.

An optional Domain Proxy (DP) 208 is also provided for in the FCC architecture. Each DP 208 includes: (1) SAS interface GW including security; (2) directive translation between CBSD 206 and domain commands; (3) bulk CBSD directive processing; and (4) interference contribution reporting to the FSAS.

A domain is defined is any collection of CBSDs 206 that need to be grouped for management; e.g.: large enterprises, venues, stadiums, train stations. Domains can be even larger/broader in scope, such as for example a terrestrial operator network. Moreover, domains may or may not use private addressing. A Domain Proxy (DP) 208 can aggregate control information flows to Commercial SAS (CSAS), not shown, and generate performance reports, channel requests, heartbeats, etc.

CBSDs 206 can generally be categorized as either Category A or Category B. Category A CBSDs have an EIRP or Equivalent Isotropic Radiated Power of 30 dBm (1 Watt)/10 MHz, fixed indoor or outdoor location (with an antenna <6 m in length if outdoor). Category B CBSDs have 47 dBm EIRP (50 Watts)/10 MHz, and fixed outdoor location only. Professional installation of Category B CBSDs is required, and the antenna must be less than 6 m in length. All CBSD's have a vertical positioning accuracy requirement of +/−3 m. Terminals (i.e., user devices akin to UE) have 23 dBm EIRP (0.2 Watts)/10 MHz requirements, and mobility of the terminals is allowed.

In terms of spectral access, CBRS utilizes a time division duplex (TDD) multiple access architecture.

Unlicensed Spectrum Technologies—

Extant wireless technologies intended for use in the unlicensed spectrum (such as Wi-Fi and LTE-U and LTE-LAA) must coexist with other users in those bands, and hence necessarily employ contention management techniques to help optimize performance. For example, Wi-Fi utilizes a back-off mechanism for collision avoidance known as carrier-sense multiple access with collision avoidance ("CSMA/CA"). In particular, when a first network node or station receives a packet to be sent to another node or station, Wi-Fi (according to, e.g., the prevailing 802.11 standard under which the system operates) initiates physical carrier sensing and virtual carrier sensing mechanisms to determine whether the medium (e.g., a channel and/or frequency used by the Wi-Fi transceiver) is busy or occupied by other transmissions (physical and virtual carrier sensing). In addition to the conditions set by physical carrier sensing and virtual carrier sensing, the Wi-Fi CSMA/CA may impose further checks by a node to ensure that the channel on which the packet is to be sent is clear.

Likewise, LTE-U collision avoidance mechanisms (at least in theory) attempt to choose a free or idle channel (i.e., not in use) in which no other LTE-U node or Wi-Fi AP is operating; if a free channel is not found, the LTE-U node should apply duty cycle procedures that allow the node to share a channel with Wi-Fi and other LTE-U signals. In some circumstances, duty cycling parameters may be adapted to usage of other signals, e.g., in response to Wi-Fi usage.

However, even with such mechanisms, increasing numbers of users (whether users of wireless interfaces of the aforementioned standards, or others) invariably lead to "crowding" of the spectrum, including interference. Interference may also exist from non-user sources such as solar radiation, electrical equipment, military uses, etc. In effect, a given amount of spectrum has physical limitations on the amount of bandwidth it can provide, and as more users are added in parallel, each user potentially experiences more interference and degradation of performance. Simply stated, contention management has limits on the benefits it can provide.

Moreover, technologies such as Wi-Fi have limited range (due in part to the unlicensed spectral power mask imposed in those bands), and may suffer from spatial propagation variations (especially inside structures such as buildings) and deployment density issues. Wi-Fi has become so ubiquitous that, especially in high-density scenarios such as hospitality units (e.g., hotels), enterprises, crowded venues, and the like, the contention issues may be unmanageable, even with a plethora of Wi-Fi APs installed to compensate. Yet further, there is generally no coordination between such APs, each in effect contending for bandwidth on its backhaul with others.

Additionally, lack of integration with other services provided by e.g., a managed network operator, typically exists with unlicensed technology such as Wi-Fi. Wi-Fi typically acts as a "data pipe" opaquely carried by the network operator/service provider.

Whether individually or collectively, the foregoing factors can result in less-than-optimal user experience, since the coverage, reliability, and data throughput associated with the unlicensed technology may vary significantly as a function of time, location, and application, and opportunities for integration with other services or functionality of the network operator are lost.

Something Else Needed—

In sum, despite the foregoing plethora of different wireless access solutions, each currently has significant restrictions, especially for an integrated network services provider such as a cable or satellite (or terrestrial) MSO. Acquisition of licensed spectrum is very costly, competitive, and time consuming. Conversely, existing ISM and other unlicensed band solutions such as LTE-U and Wi-Fi, while avoiding many of the aforementioned pitfalls of licensed spectrum use, may suffer from their own set of disabilities as noted above.

Extant CBRS architectures, while promising from the standpoint of reduced contention for spectrum, currently lack such network-wide coordination and integration, as well as implementation details enabling optimization of user experience, especially for users of a multi-mode content distribution network such as that of a cable, satellite, or terrestrial service operator.

SUMMARY

The present disclosure addresses the foregoing needs by providing, inter alia, methods and apparatus for dynamically controlling access to and utilization of quasi-licensed spectrum (such as for example that of CBRS).

In one aspect of the disclosure, a method for enhancing wireless connectivity for at least one mobile client device is described. In one embodiment, the device includes first and second wireless interfaces configured to use first and second wireless protocols, respectively, and the method includes: receiving indication that operation of the client device using the first wireless interface within a first frequency band is below a prescribed level of performance; evaluating available spectrum within a second frequency band utilized by the second wireless interface; based at least one the evaluating, causing the client device to transition from the first wireless interface to the second wireless interface. In one variant, the first frequency band comprises an unlicensed band, and the second frequency band comprises a quasi-licensed band.

In one implementation, the first wireless interface comprises a wireless LAN (WLAN) interface; the second wireless interface comprises a wireless interface compliant with a Long Term Evolution (LTE)-based standard; the first frequency band comprises an ISM band; the second frequency band comprises a CBRS band between 3.550 and 3.700 GHz; and the evaluating available spectrum comprises determining a loading or use factor for the CBRS band. For example, the LTE standard may comprise at least one of (i) LTE/LTE-A ("standard" LTE); (ii) LTE-U (Long Term Evolution in unlicensed spectrum), and/or (iii) LTE-LAA (Long Term Evolution, Licensed Assisted Access).

In another implementation, the method further includes transmitting data to a domain proxy (DP), the DP configured to communicate at least a portion of the data to a Spectrum Access System (SAS) to obtain access to the CBRS band.

In another variant, the receiving indication comprises receiving data indicative of multiple failed connection attempts by the client device to connect to a wireless access point using the first wireless interface. For example, the data indicative of multiple failed connection attempts by the client device to connect to a wireless access point can be issued by the access point, the access point in data communication with a controller process, the controller process configured to perform at least the evaluating.

In another variant, causing the client device to transition from the first wireless interface to the second wireless interface comprises transmitting via the first wireless interface data to a computer application program operative to run on the client device, the data comprising data enabling the client device to utilize the second wireless interface, and the data enabling the client device to utilize the second wireless interface comprises at least data indicating one or more CBRS bands to be utilized by the second wireless interface.

In yet another variant, the receiving indication comprises receiving data issued by a wireless access point with which the first wireless interface is in data communication, the wireless access point in data communication with a controller process, the controller process configured to perform at least the evaluating; and the method further includes: causing, based at least on the receiving indication, at least one of (i) the client device, and/or (ii) the wireless access point, to implement one or more configuration changes to increase the performance; and based on the implemented one or more configuration changes not increasing the performance to or above the prescribed level, performing the evaluating.

In still a further variant, the evaluating available spectrum within a second frequency band utilized by the second wireless interface comprises using a radio transceiver of a CBSD access node to provide interference data for the second frequency band to a network controller, the controller causing the client device to transition from the first wireless interface to the second wireless interface based on the evaluating of the interference data indicating an acceptable level of interference.

In another aspect of the disclosure, a controller apparatus for use within a managed content delivery network is described. In one embodiment, the controller apparatus is configured to manage CBRS (Citizens Broadband Radio Service) wireless connectivity to one or more wireless-enabled devices utilized within a prescribed venue, and includes: a processor apparatus; and a storage apparatus in data communication with the processor apparatus and having a non-transitory computer-readable storage medium, the storage medium comprising at least one computer program having a plurality of instructions stored thereon. In one variant, the plurality of instructions are configured to, when executed by the processor apparatus, cause the controller apparatus to: detect congestion within an unlicensed frequency band utilized by the one or more wireless-enabled devices within the venue; based on the detection, obtain access for the one or more wireless-enabled devices to a quasi-licensed frequency band; and cause transmission of data allocating at least a portion of the quasi-licensed frequency band to the one or more wireless-enabled devices, the data enabling the one or more wireless-enabled devices to utilize the at least a portion of the quasi-licensed frequency band.

In one implementation, the one or more wireless-enabled devices comprise a plurality of multi-RAT capable wireless-enabled devices of respective ones of subscribers of a network operator, and the allocating at least a portion of the quasi-licensed frequency band to the one or more wireless-enabled devices comprises allocating a plurality of sub-bands within the quasi-licensed frequency band to respective ones of the plurality of multi-RAT capable wireless-enabled devices of respective ones of subscribers of the network operator only.

In another implementation, the one or more wireless-enabled devices comprise a plurality of multi-RAT (Radio Area Technology) capable wireless-enabled devices of respective ones of subscribers of a network operator, and the allocating at least a portion of the quasi-licensed frequency band to the one or more wireless-enabled devices comprises causing the respective ones of the plurality of multi-RAT capable wireless-enabled devices of respective ones of subscribers of the network operator to utilize a contention management protocol associate with one RAT to obtain access to a respective portion of the quasi-licensed frequency band; e.g., at least a portion of one or more of LTE bands 42 or 43. The one RAT can include for instance an LTE/LTE-A technology. Alternatively, an LTE-U (Long Term Evolution in unlicensed spectrum), and/or LTE-LAA (Long Term Evolution, Licensed Assisted Access) RAT can be used, and implement a listen-before-talk (LBT) contention management protocol.

In another implementation, the detection of congestion within an unlicensed frequency band utilized by the one or more wireless-enabled devices within the venue comprises detection of reduced radio link performance associated with a first data session established using a first wireless interface of at least one of the one or more wireless enabled devices; and the data enabling the one or more wireless-enabled devices to utilize the at least a portion of the quasi-licensed frequency band comprises data enabling the at least one wireless enabled device to utilize the quasi-licensed frequency band via a second wireless interface, the utilization of the second wireless interface comprising maintaining the first data session via at least one layer above a PHY layer.

In a further aspect of the disclosure, a networked system configured to provide quasi-licensed wireless connectivity to a plurality of wireless-enabled user devices located within a venue is disclosed. In one embodiment, the system includes: wireless access node apparatus, the wireless access node apparatus disposed at least partly within the venue and comprising a first wireless interface capable of (i) utilizing at least a portion of quasi-licensed radio frequency (RF) spectrum for data communications between the plurality of user devices and a network entity, and (ii) generating data relating to signal interference within the at least a portion of quasi-licensed radio frequency (RF) spectrum; and a controller apparatus in data communication with the access node apparatus, the controller apparatus comprising a wireless access management process. In one variant, the controller apparatus is configured to: obtain the data relating to signal interference within the at least a portion of quasi-licensed radio frequency (RF) spectrum; evaluate the obtained data to identify one or more sub-bands of interest; cause generation of a message to request allocation of the one or more sub-bands; receive one or more messages responsive to the request message, the one or more received messages indicative of allocation of at least one of the one or more sub-bands; and cause allocation of a plurality of carriers within the allocated one or more sub-bands to respective ones of the plurality of user devices.

In one implementation, the evaluation of the obtained data to identify one or more sub-bands of interest includes: generating an interference versus frequency analysis; and identifying the one or more sub-bands of interest based on lower levels of interference in the one or more sub-bands of interest as compared to one or more other sub-bands. In another implementation, the allocation of a plurality of carriers within the allocated one or more sub-bands to respective ones of the plurality of user devices includes: accessing a subscriber database to identify two or more of the plurality of user devices associated with subscribers of the network operator; and preferentially allocating the plurality of carriers first to the identified two or more plurality of user devices before further allocation is conducted.

In a further implementation, the system includes user device provisioning apparatus, the provisioning apparatus in data communication with the controller apparatus and configured to at least provision ones of the plurality of user devices that are associated with subscribers of the network operator, the provisioning comprising providing downloadable software for installation on the plurality of user devices associated with subscribers of the network operator such that communication between the software and the controller apparatus is enabled.

In another aspect, methods for user access to CBRS services via a managed content distribution network are disclosed. In one embodiment, the methods include evaluating user network access requests, and allocating available (e.g., SAS-allocated) resources within a quasi-licensed band so as to mitigate resource contention.

In an additional aspect of the disclosure, computer readable apparatus is described. In one embodiment, the apparatus includes a storage medium configured to store one or more computer programs. In one embodiment, the apparatus comprises a program memory or HDD or SDD on a computerized controller device. In another embodiment, the apparatus comprises a program memory, HDD or SSD on a computerized access node (e.g., CBSD). In yet another embodiment, the apparatus comprises a program memory, HDD or SSD on a wireless-enabled mobile user device.

In another aspect of the disclosure, methods for user experience optimization are disclosed.

In an additional aspect of the disclosure, methods for network operator management of loss of WLAN service are disclosed.

In a further aspect of the present disclosure, business methods for enabling an alternative type of wireless connectivity to one or more user devices are provided.

In a further aspect of the present disclosure, business methods for collecting data usage information via wireless connectivity provided to one or more user devices are provided.

In another aspect of the invention, apparatus for optimizing RAT usage and selection for users of a given venue or area is disclosed. In one embodiment, the apparatus includes both WLAN and CBRS-LTE stacks and interfaces, and is controlled by logic in order to optimize performance via selection of one or the other interface based on operational or other considerations. In one implementation, the logic is implemented by an MSO controller co-located at least in part with one or more CBSDs within the venue.

In yet another aspect of the disclosure, a method of managing withdrawal of one or more frequency bands from use by a plurality of access nodes is disclosed. In one embodiment, the plurality of nodes comprises a cluster of small cells, and the method includes withdrawal of the one or more bands in orderly manner across the cluster based on a plurality of operational considerations. In one variant, the considerations include: (i) a number of UEs connected to individual cells, (ii) a possibility of moving the UEs to one or more neighbor cells in the cluster, and (iii) an amount of data passing through different access band/technologies.

In one implementation, an iterative or progressive approach is utilized wherein a cell with more connected UEs will be offered to hand over its UEs to the one or more neighbor cells in a prescribed order until all the required small cells are compliant with the required change. This approach advantageously mitigates disruptions caused by channel withdrawal, and optimizes the network across multiple bands and access technologies.

In another implementation, the inter-cell handovers are conducted in order to maintain QoS (quality of service) requirements for users applications (or QoS policy invoked by the network operator), and to minimize the disruption to the relevant MNO operator network cores.

These and other aspects shall become apparent when considered in light of the disclosure provided herein.

BRIEF DESCRIPTION OF THE DRAWINGS

FIG. 4a-1 is a graphical representation of a first exemplary embodiment of a software architecture useful with the architecture of FIG. 4a.

FIG. 4b-1 is a graphical representation of a first exemplary embodiment of a software architecture useful with the architecture of FIG. 4b.

Figure 1:
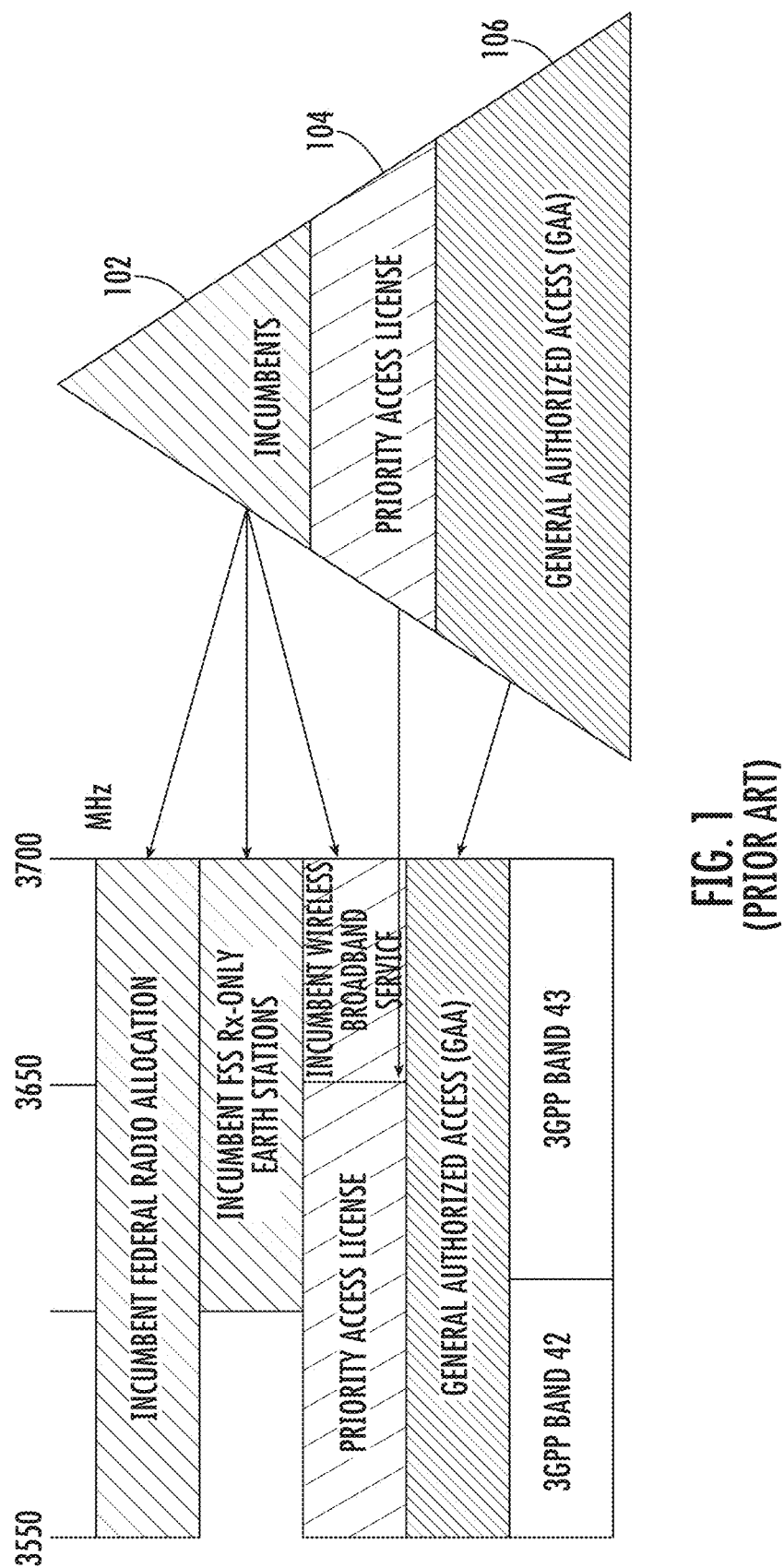
FIG. 1 is a graphical illustration of prior art CBRS (Citizens Broadband Radio Service) users and their relationship to allocated frequency spectrum in the 3.550 to 3.700 GHz band.
Figure 2:
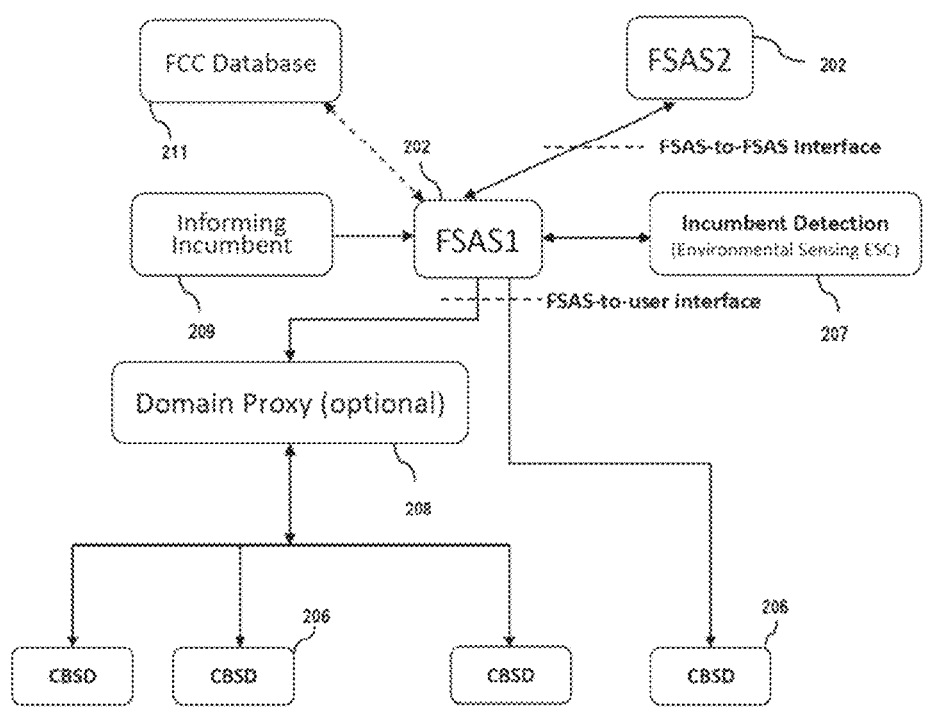
FIG. 2 is a block diagram illustrating a general architecture for the CBRS system of the prior art.
Figure 2A:
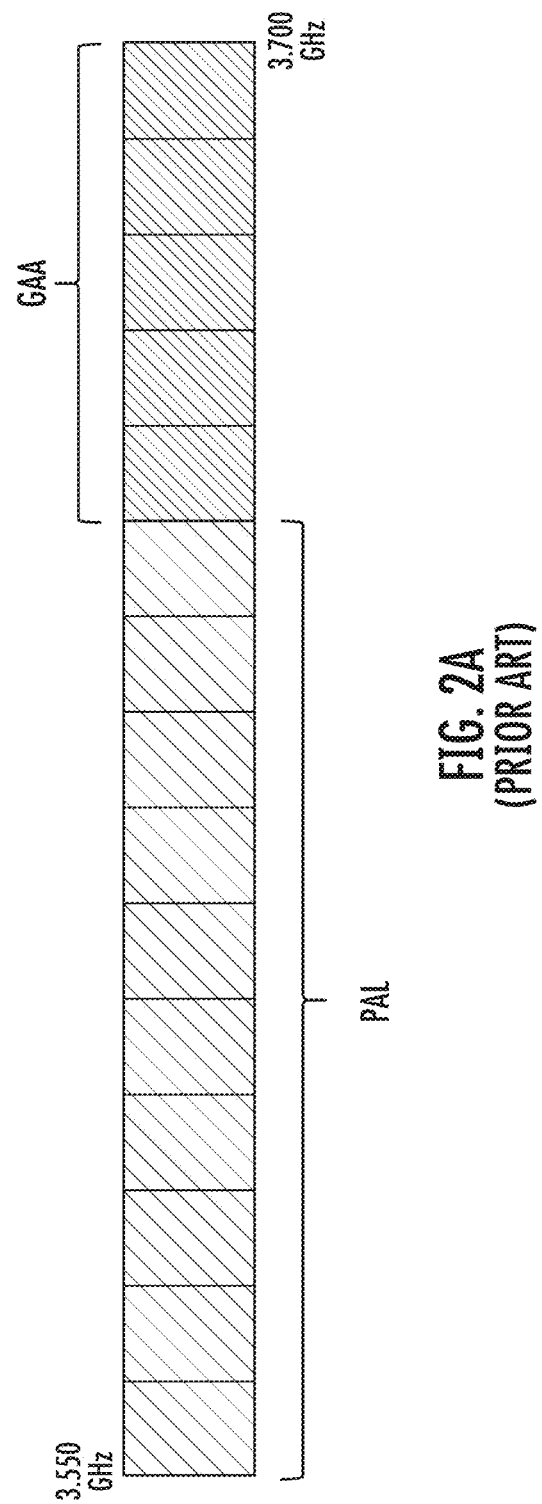
FIG. 2a is a graphical representation of allocations for PAL versus GAA users within the frequency band of FIG. 2.

All figures © Copyright 2017 Charter Communications Operating, LLC. All rights reserved.

DETAILED DESCRIPTION

Reference is now made to the drawings wherein like numerals refer to like parts throughout.

As used herein, the term "access node" refers generally and without limitation to a network node which enables communication between a user or client device and another entity within a network, such as for example a CBRS CBSD, a Wi-Fi AP, or a Wi-Fi-Direct enabled client or other device acting as a Group Owner (GO).

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the terms "client device" or "user device" or "UE" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smartphones, and vehicle infotainment systems or portions thereof.

As used herein, the term "codec" refers to a video, audio, or other data coding and/or decoding algorithm, process or apparatus including, without limitation, those of the MPEG (e.g., MPEG-1, MPEG-2, MPEG-4/H.264, H.265, etc.), Real (RealVideo, etc.), AC-3 (audio), DiVX, XViD/ViDX, Windows Media Video (e.g., WMV 7, 8, 9, 10, or 11), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "DOCSIS" refers to any of the existing or planned variants of the Data Over Cable Services Interface Specification, including for example DOCSIS versions 1.0, 1.1, 2.0, 3.0 and 3.1.

As used herein, the term "headend" or "backend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, over-the-top services, streaming services, and the Internet.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), 4G LTE, WiMAX, and other wireless data standards, including GSM, UMTS, CDMA2000, etc. (as applicable). As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), 3D memory, and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB 2.0, 3.0. OTG), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), LTE/LTE-A, Wi-Fi (802.11), WiMAX (802.16), Z-wave, PAN (e.g., 802.15), or power line carrier (PLC) families.

As used herein, the term "QAM" refers to modulation schemes used for sending signals over e.g., cable or other networks. Such modulation scheme might use any constellation level (e.g. QPSK, 16-QAM, 64-QAM, 256-QAM, etc.) depending on details of a network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "Wi-Fi" refers to, without limitation and as applicable, any of the variants of IEEE Std. 802.11 or related standards including 802.11 a/b/g/n/s/v/ac or 802.11-2012/2013, as well as Wi-Fi Direct (including inter alia, the "Wi-Fi Peer-to-Peer (P2P) Specification", incorporated herein by reference in its entirety).

As used herein, the term "wireless" means any wireless signal, data, communication, or other interface including without limitation Wi-Fi, Bluetooth/BLE, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A/LTE-U/LTE-LAA, analog cellular, CDPD, satellite systems, millimeter wave or microwave systems, acoustic, and infrared (i.e., IrDA).

Overview

In one exemplary aspect, the present disclosure provides improved methods and apparatus for wireless network access using, for example, "quasi-licensed" spectrum such as that provided by the recent CBRS technology initiatives. In an exemplary implementation, a network architecture is provided which leverages an MSO's extant distribution and backhaul capability to collect and exchange metrics between SAS, access networks (comprising of CBRS and other bands), access technologies such as LTE and Wi-Fi), DOCSIS and core networks, and execute a control and optimization function to enhance performance and user experience to its subscribers (and even non-subscriber "ad hoc" users), or otherwise provide wireless coverage where it would be otherwise not available.

In one implementation, extant TD-LTE (Long Term Evolution) technology is leveraged within the available CBRS band(s) for improved venue (e.g., in-building) coverage and capacity augmentation for other unlicensed systems operating in other bands such as Wi-Fi. This provides the network operator (e.g., MSO) and its users with a number of benefits, including inter alia: (i) obviating any need to adopt custom technology (e.g., a new air interface, and the new user mobile devices and MSO infrastructure that are necessitated thereby); (ii) reduced interference (and hence better user experience) due to less "crowding" in the lightly used CBRS quasi-licensed bands; (iii) a complementary or "fallback" capability to the MSO's extant WLAN services (e.g., when CBRS provides better user experience than Wi-Fi, or Wi-Fi infrastructure is over-taxed or cannot meet service demands in certain areas or venues); and (iv) a more "Wi-Fi-like" business model (i.e., as compared to traditional cellular/licensed spectrum options).

The ability for the MSO to acquire 'temporary' licenses also provides for new use cases not currently available to the MSO; for example, event-driven capacity and coverage augmentation when the MSO is to host venues (e.g., arenas, conference complexes), or supports industries where location-specific services are provided, such as e.g., the hospitality industry.

Specifically, in one embodiment, the present disclosure provides methods and corresponding architecture to combine CBRS SAS channel allocations across a cluster (two or more) of CBRS small-cells to optimize resource allocations across the MSO network core and RANs (including Wi-Fi and CBRS RANs). In some implementations thereof, so-called "SON" or Self-Organizing Network functions are leveraged to enhance the resource allocations, and provide other desirable functionality such as automated and dynamic self-healing in cases of loss of connectivity by MSO users or subscribers.

Similarly, the present disclosure provides mechanisms to minimize disruptions across CBRS channel changes and/or channel withdrawals by SAS (such as via DoD assets requiring use of the spectrum), including in one implementation a "look ahead" or channel planning function which constantly evaluates available spectral assets in case a frequency change/withdrawal is encountered.

Detailed Description of Exemplary Embodiments

Exemplary embodiments of the apparatus and methods of the present disclosure are now described in detail. While these exemplary embodiments are described in the context of the previously mentioned wireless access points (e.g., CBSDs and WLAN APs) associated with a managed network (e.g., hybrid fiber coax (HFC) cable architecture having a multiple systems operator (MSO), digital networking capability, IP delivery capability, and a plurality of client devices), the general principles and advantages of the disclosure may be extended to other types of radio access technologies ("RATs"), networks and architectures that are configured to deliver digital data (e.g., text, images, games, software applications, video and/or audio). Such other networks or architectures may be broadband, narrowband, or otherwise, the following therefore being merely exemplary in nature.

It will also be appreciated that while described generally in the context of a network providing service to a customer or consumer or end user (i.e., within a prescribed venue, or other type of premises), the present disclosure may be readily adapted to other types of environments including, e.g., outdoors, commercial/retail, or enterprise domain (e.g., businesses), or even governmental uses, such as those outside the proscribed "incumbent" users such as U.S. DoD and the like. Yet other applications are possible. Also, while certain aspects are described primarily in the context of the well-known Internet Protocol (described in, inter alia, *Internet Protocol DARPA Internet Program Protocol Specification*, IETF RCF 791 (September 1981) and Deering et al., *Internet Protocol, Version 6 (IPv6) Specification*, IETF RFC 2460 (December 1998), each of which is incorporated herein by reference in its entirety), it will be appreciated that the present disclosure may utilize other types of protocols (and in fact bearer networks to include other internets and intranets) to implement the described functionality.

Moreover, while the current SAS framework is configured to allocate spectrum in the 3.5 GHz band (specifically 3,550 to 3,700 MHz), it will be appreciated by those of ordinary skill when provided the present disclosure that the methods and apparatus described herein may be configured to utilize other "quasi licensed" or other spectrum, including without limitations above 4.0 GHz (e.g., currently proposed allocations up to 4.2 GHz).

Other features and advantages of the present disclosure will immediately be recognized by persons of ordinary skill in the art with reference to the attached drawings and detailed description of exemplary embodiments as given below.

Service Provider Network—

Figure 3A:
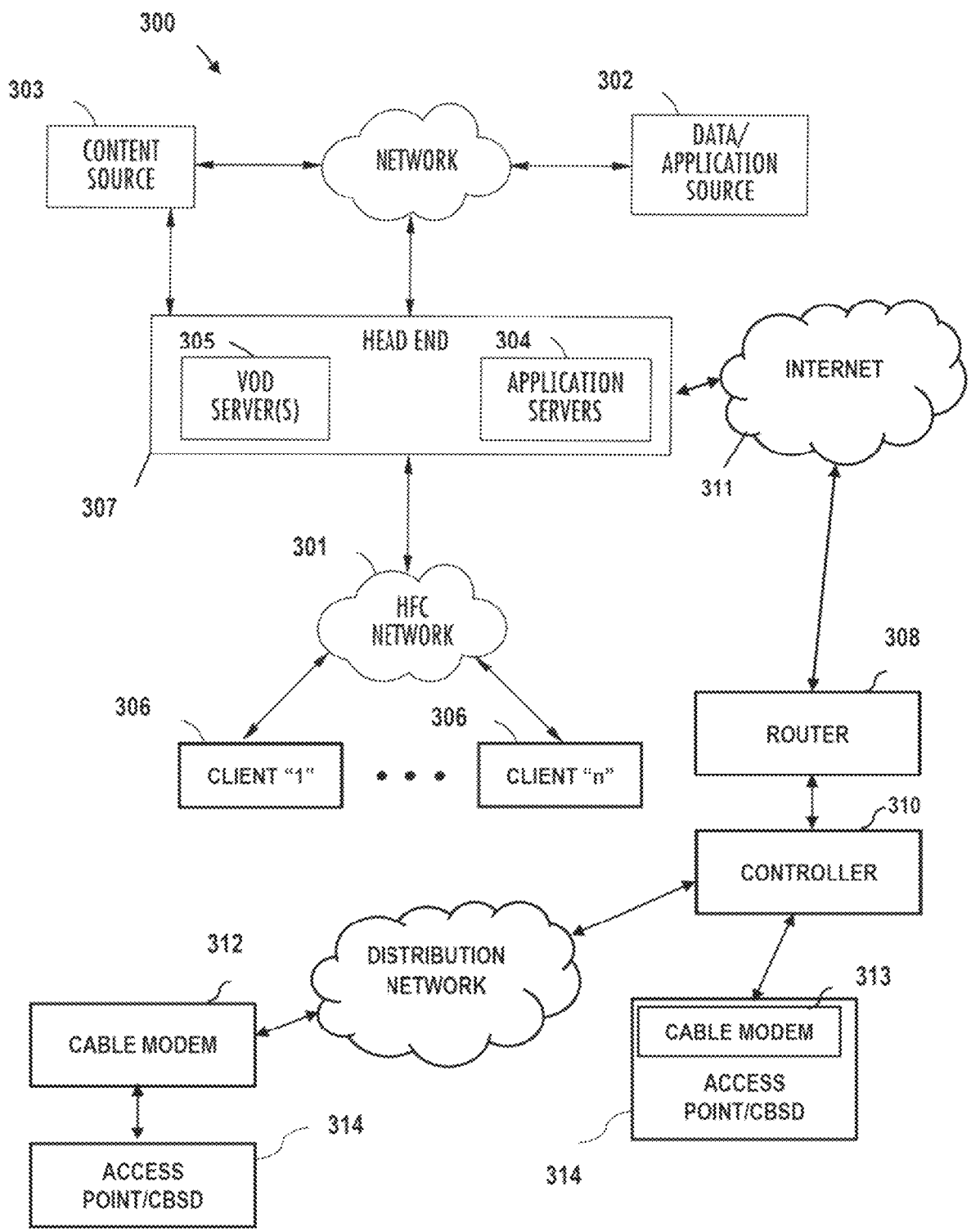
FIG. 3a is a functional block diagram illustrating an exemplary hybrid fiber network configuration useful with various aspects of the present disclosure.

FIG. 3a illustrates a typical service provider network configuration useful with the features of the CBRS-based wireless network(s) described herein. This service provider network 300 is used in one embodiment of the disclosure to provide backbone and Internet access from the service provider's wireless access nodes (e.g., CBSDs, Wi-Fi APs or base stations 314 operated or maintained by the service provider or its customers/subscribers), one or more stand-alone or embedded cable modems (CMs) 312, 313 in data communication therewith, or even third party access points accessible to the service provider via, e.g., an interposed network such as the Internet 311 (e.g., with appropriate permissions from the access node owner/operator/user).

As described in greater detail subsequently herein with respect to FIG. 4a, one or more controllers 310 are utilized for, inter alia, control of the wireless network access nodes 314 at least partly by the MSO. As opposed to an unmanaged network, the managed service-provider network 300 of FIG. 3a advantageously allows, inter alia, control and management of a given user's access (such user which may be a network subscriber, or merely an incidental/opportunistic user of the service) via the wireless access node(s) 314, including imposition and/or reconfiguration of various access "rules" or other configurations applied to the wireless access nodes. For example, the service provider network 300 allows components at an indoor venue of interest (e.g., CBSDs, Wi-Fi APs and any supporting infrastructure such as routers, switches, etc.) to be remotely reconfigured by the network MSO, based on e.g., prevailing operational conditions in the network, changes in user population and/or makeup of users at the venue, business models (e.g., to maximize profitability or provide other benefits such as enhanced user experience, as described infra), spectrum channel changes or withdrawals, or even simply to enhance user experience using one RAT (e.g., CBRS) when another RAT (e.g., WLAN is sub-optimal for whatever reason).

In certain embodiments, the service provider network 300 also advantageously permits the aggregation and/or analysis of subscriber- or account-specific data (including inter alia, particular mobile devices associated with such subscriber or accounts) as part of the provision of services to users under the exemplary delivery models described herein. As but one example, device-specific IDs (e.g., MAC address or the like) can be cross-correlated to MSO subscriber data maintained at e.g., the network head end(s) 307 so as to permit or at least facilitate, among other things, (i) user authentication; (ii) correlation of aspects of the event or venue to particular subscriber demographics, such as for delivery of targeted advertising; and (iii) determination of subscription level, and hence subscriber privileges and access to content/features. Moreover, device profiles for particular user devices can be maintained by the MSO, such that the MSO (or its automated proxy processes) can model the user device for wireless capabilities.

The wireless access nodes 314 disposed at the service location(s) (e.g., venue(s) of interest) can be coupled to the bearer managed network 300 (FIG. 3a) via, e.g., a cable modem termination system (CMTS) and associated local DOCSIS cable modem (CM) 312, 313, a wireless bearer medium (e.g., an 802.16 WiMAX or millimeter wave system—not shown), a fiber-based system such as FiOS or similar, a third-party medium which the managed network operator has access to (which may include any of the foregoing), or yet other means.

The various components of the exemplary embodiment of the network 300 generally include (i) one or more data and application origination sources 302; (ii) one or more content sources 303, (iii) one or more application distribution servers 304; (iv) one or more video-on-demand (VOD) servers 305, (v) client devices 306, (vi) one or more routers 308, (vii) one or more wireless access node controllers 310 (may be placed more locally as shown or in the headend or "core" portion of network), (viii) one or more cable modems 312, 313, and/or (ix) one or more access nodes 314. The application server(s) 304, VOD servers 305 and client device(s) 306 are connected via a bearer (e.g., HFC) network 301. A simple architecture comprising one of each of certain components 302, 303, 304, 305, 308, 310 is shown in FIG. 3a for simplicity, although it will be recognized that comparable architectures with multiple origination sources, distribution servers, VOD servers, controllers, and/or client devices (as well as different network topologies) may be utilized consistent with the present disclosure.

It is also noted that cable network architecture is typically a "tree-and-branch" structure, and hence multiple tiered access nodes 314 (and other components) may be linked to each other or cascaded via such structure.

Figure 3B:
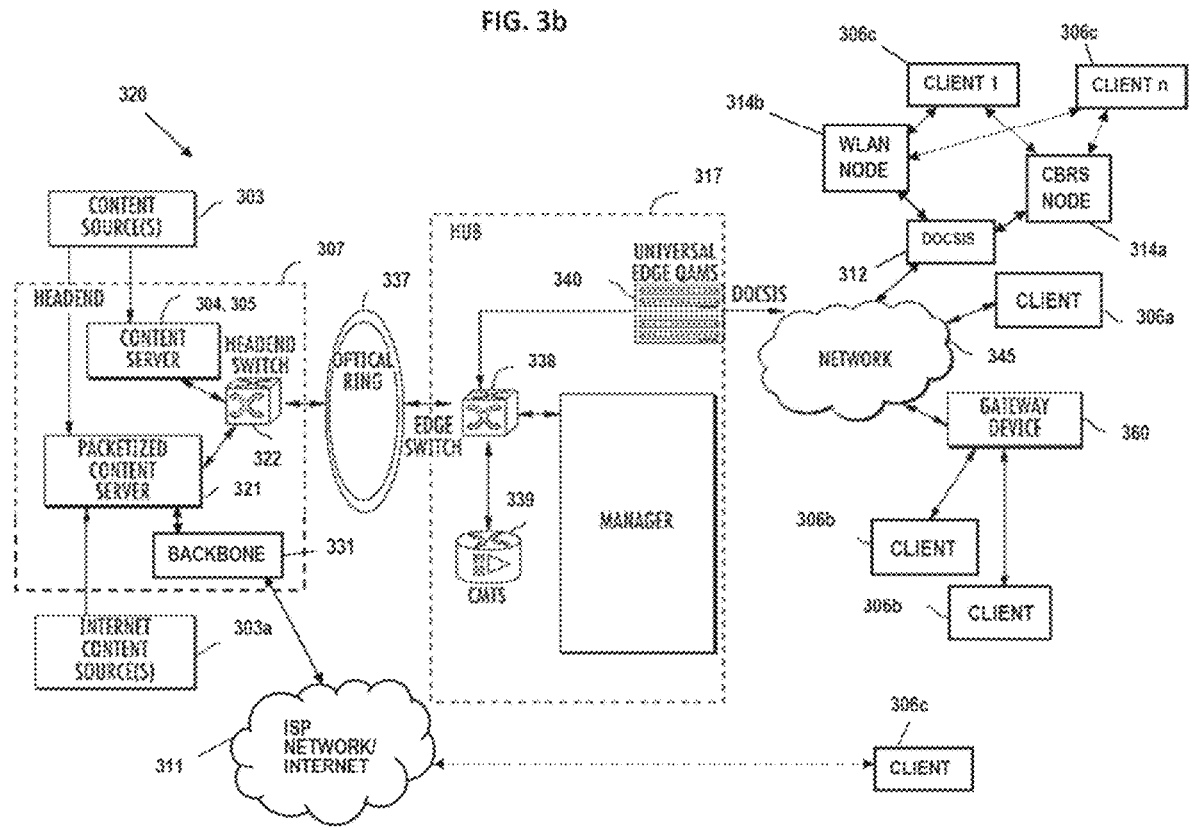
FIG. 3b is a functional block diagram of an exemplary packetized content network architecture useful in conjunction with various principles described herein.

FIG. 3b illustrates an exemplary high-level MSO network architecture for the delivery of packetized content (e.g., encoded digital content carried within a packet or frame structure or protocol) that may be useful with the various aspects of the present disclosure. In addition to on-demand and broadcast content (e.g., live video programming), the system of FIG. 3b may deliver Internet data and OTT (over-the-top) services to the end users (including those of the access nodes 314) via the Internet protocol (IP) and TCP, although other protocols and transport mechanisms of the type well known in the digital communication art may be substituted.

The network architecture 320 of FIG. 3b generally comprises one or more headends 307 in communication with at least one hub 317 via an optical ring 337. The distribution hub 317 is able to provide content to various user/client devices 306, and gateway devices 360 as applicable, via an interposed network infrastructure 345.

As described in greater detail below, various content sources 303, 303a are used to provide content to content servers 304, 305 and origin servers 321. For example, content may be received from a local, regional, or network content library as discussed in co-owned U.S. Pat. No. 8,997,136 entitled "APPARATUS AND METHODS FOR PACKETIZED CONTENT DELIVERY OVER A BANDWIDTH-EFFICIENT NETWORK", which is incorporated herein by reference in its entirety. Alternatively, content may be received from linear analog or digital feeds, as well as third party content sources. Internet content sources 303a (such as e.g., a web server) provide Internet content to a packetized content origin server(s) 321. Other IP content may also be received at the origin server(s) 321, such as voice over IP (VoIP) and/or IPTV content. Content may also be received from subscriber and non-subscriber devices (e.g., a PC or smartphone-originated user made video).

The centralized media server(s) 321, 304 located in the headend 307 may also be replaced with or used in tandem with (e.g., as a backup) to hub media servers (not shown) in one alternative configuration. By distributing the servers to the hub stations 317, the size of the fiber transport network associated with delivering VOD services from the central headend media server is advantageously reduced. Multiple paths and channels are available for content and data distribution to each user, assuring high system reliability and enhanced asset availability. Substantial cost benefits are derived from the reduced need for a large content distribution network, and the reduced storage capacity requirements for hub servers (by virtue of the hub servers having to store and distribute less content).

It will also be recognized that a heterogeneous or mixed server approach may be utilized consistent with the disclosure. For example, one server configuration or architecture may be used for servicing cable, satellite, etc., subscriber CPE-based session requests (e.g., from a user's DSTB or the like), while a different configuration or architecture may be used for servicing mobile client requests. Similarly, the content servers 321, 304 may either be single-purpose/dedicated (e.g., where a given server is dedicated only to servicing certain types of requests), or alternatively multi-purpose (e.g., where a given server is capable of servicing requests from different sources).

The network architecture 320 of FIG. 3b may further include a legacy multiplexer/encrypter/modulator (MEM; not shown). In the present context, the content server 304 and packetized content server 321 may be coupled via a LAN to a headend switching device 322 such as an 802.3z Gigabit Ethernet (or "10G") device. For downstream delivery via the MSO infrastructure (i.e., QAMs), video and audio content is multiplexed at the headend 307 and transmitted to the edge switch device 338 (which may also comprise an 802.3z Gigabit Ethernet device) via the optical ring 337.

In one exemplary content delivery paradigm, MPEG-based video content (e.g., MPEG-2, H.264/AVC) may be delivered to user IP-based client devices over the relevant physical transport (e.g., DOCSIS channels); that is as MPEG-over-IP-over-MPEG. Specifically, the higher layer MPEG or other encoded content may be encapsulated using an IP network-layer protocol, which then utilizes an MPEG packetization/container format of the type well known in the art for delivery over the RF channels or other transport, such as via a multiplexed transport stream (MPTS). In this fashion, a parallel delivery mode to the normal broadcast delivery exists; e.g., in the cable paradigm, delivery of video content both over traditional downstream QAMs to the tuner of the user's DSTB or other receiver device for viewing on the television, and also as packetized IP data over the DOCSIS QAMs to the user's PC or other IP-enabled device via the user's cable modem 312 (including to end users of the access node 314). Delivery in such packetized modes may be unicast, multicast, or broadcast.

Delivery of the IP-encapsulated data may also occur over the non-DOCSIS QAMs, such as via IPTV or similar models with QoS applied.

Individual client devices such as cable modems 312 and associated end-user devices 306a, 306b of the implementation of FIG. 3b may be configured to monitor the particular assigned RF channel (such as via a port or socket ID/address, or other such mechanism) for IP packets intended for the subscriber premises/address that they serve. The IP packets associated with Internet services are received by edge switch, and forwarded to the cable modem termination system (CMTS) 339. The CMTS examines the packets, and forwards packets intended for the local network to the edge switch. Other packets are in one variant discarded or routed to another component.

The edge switch forwards the packets receive from the CMTS to the QAM modulator, which transmits the packets on one or more physical (QAM-modulated RF) channels to the client devices. The IP packets are typically transmitted on RF channels that are different than the "in band" RF channels used for the broadcast video and audio programming, although this is not a requirement. As noted above, the premises devices such as cable modems 312 are each configured to monitor the particular assigned RF channel (such as via a port or socket ID/address, or other such mechanism) for IP packets intended for the subscriber premises/address that they serve.

In one embodiment, both IP data content and IP-packetized audio/video content is delivered to a user via one or more universal edge QAM devices 340. According to this embodiment, all of the content is delivered on DOCSIS channels, which are received by a premises gateway 360 or cable modem 312, and distributed to one or more respective client devices/UEs 306a, 306b, 306c in communication therewith.

In one implementation, the CM 312 shown in FIG. 3b services a venue, such as a conference center or hospitality structure (e.g., hotel), which includes a CBRS node 314a for CBRS-band (3.5 GHz) access, and a WLAN (e.g., Wi-Fi) node 314b for WLAN access (e.g., within 2.4 GHz ISM band). Notably, the client devices 306c communicating with the access nodes 314a, 314b, as described in greater detail subsequently herein, can utilize either RAT (CBRS or WLAN) depending on, inter alia, directives received from the MSO controller 310 (FIG. 3a) via one access node 314 or the other, or even indigenous logic on the client device 306c enabling it to selectively access one RAT or the other. Feasibly, both RATs could operate in tandem, since they utilize different frequencies, modulation techniques, interference mitigation techniques, Tx power, etc.

In parallel with (or in place of) the foregoing delivery mechanisms, the MSO backbone 331 and other network components can be used to deliver packetized content to the user's mobile client device 306c via non-MSO networks. For example, so-called "OTT" content (whether tightly coupled or otherwise) can be ingested, stored within the MSO's network infrastructure, and delivered to the user's mobile device via an interposed ISP (Internet Service Provider) network and public Internet 311 (e.g., at a local coffee shop, via a Wi-Fi AP connected to the coffee shop's ISP via a modem, with the user's IP-enabled end-user device 306c utilizing an Internet browser or MSO/third-party app to stream content according to an HTTP-based approach).

Wireless Services Architecture—

Figure 4A:
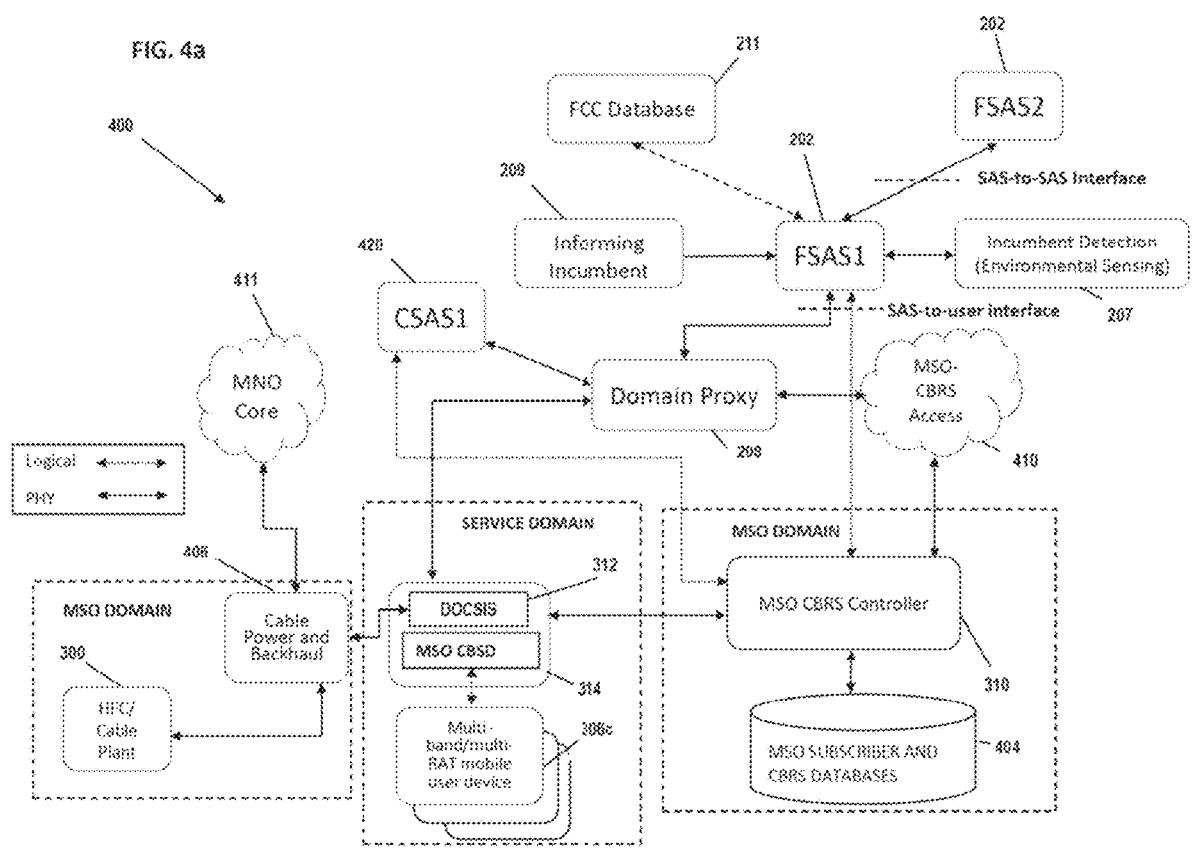
FIG. 4a is a functional block diagram of a first exemplary embodiment of a wireless network infrastructure useful with various aspects of the present disclosure.
Figures 1, 4A:
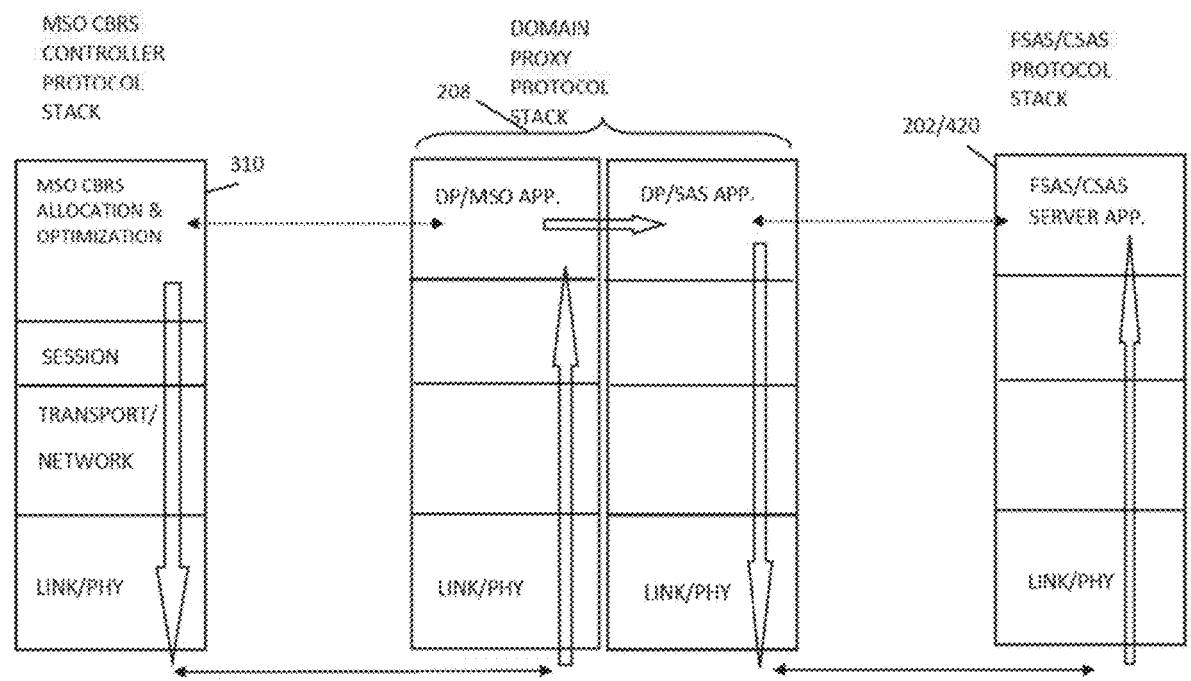

FIG. 4a illustrates an exemplary embodiment of a network architecture 400 useful in implementing the CBRS-based wireless RAT access and co-existence methods of the present disclosure. As used in the present context, the term "users" may include without limitation end users (e.g., individuals, whether subscribers of the MSO network or not), venue operators, third party service providers, or even entities within the MSO itself (e.g., a particular department, system or processing entity).

As shown, the architecture generally includes an MSO-maintained CBRS controller 310 (which may be disposed remotely at the backend or headend of the system within the MSO domain as shown or at the served venue, or at an intermediary site), an MSO-maintained subscriber and CBRS database 404, one or more CBSD access nodes 314 in data communication with the CBRS controller 310 (e.g., via existing network architectures including any wired or wireless connection), as well as any number of client devices 306c (smartphones, laptops, tablets, watches, vehicles, etc.). The CBSD 314 includes in the illustrated embodiment an embedded cable modem 312 used for communication with a corresponding CMTS 339 (FIG. 3b) within the MSO's (e.g., cable) plant 300 via cable power and backhaul infrastructure 406, including high-data bandwidth connections to the MSO's backbone 331, and electrical power for the CBSD A MNO (mobile network operator) network 411 also communicates with the MSO network via the backhaul 406, such as for inter-operator communications regarding common users/subscribers.

In operation, the Domain Proxy (DP) 208 is in logical communication with the CBSD disposed at the venue (either directly, as shown, or via MSO backend network infrastructure) and the MSO CBRS controller 310. The DP 208 provides, inter alia, FSAS interface for the CBSD, including directive translation between CBSD 314 and FSAS commands, bulk CBSD directive processing, and interference contribution reporting to the FSAS (i.e., to help an SAS tune or update its predictive propagation models and detect realistic interference issues once CBSDs are deployed, the CBSDs can provide signal strength and interference level measurements).

The MSO controller 310 in the illustrated embodiment communicates with the DP 208 via an MSO CBRS access network 410, which may be a public internetwork (e.g., the Internet), private network, or other, depending on any security and reliability requirements mandated by the MSO and/or SAS.

As previously noted, a CBRS "domain" is defined is any collection of CBSDs 314 that need to be grouped for management; e.g.: large enterprises, venues, etc. The DP 208 aggregate control information flows to the FSAS1 202 and/or any participating Commercial SAS (CSAS) 420, and generate performance reports, channel requests, heartbeats, and other types of data. In the illustrated embodiment, the DP 208 is operated by a third-party service provider, although it will be appreciated that the MSO may operate and maintain the DP 208, and or operate/maintain its own internal DP (as in FIG. 4b), such as for channel request processing, aggregation, reporting, and other of the above-listed functions for the MSO's internal CBRS domains, for interface with an external DP 208.

The MSO controller 310 communicates logically with the protocol stack and "server" process of the FSAS1 202 via the DP stack(s), as shown in FIG. 4a-1. In one embodiment, the DP stack provides protocol translation and other functions required by the FSAS 202 (and optionally by the CSAS 420) for the MSO request and report datagrams transmitted by the controller 310, and conversely from communications transmitted from within the FSAS/CSAS domains to MSO-domain protocols. In one implementation, the DP 208 utilizes and publishes a "closed" API for access by various MSO (and other) designated users, such that the MSO spectrum requests and interference reports are submitted via API "calls" to a prescribed URL or other network address.

The MSO subscriber and CBRS database 404 includes several types of data useful in operation of the system 400. As part thereof, a client device database not shown is also provided, wherein the MSO CBRS controller 310 can access and store data relating to, inter alia: (i) individual client devices, such as MAC address or other specific identifying information, (ii) any associated subscriber accounts or records, (iii) the LTE (and optionally WLAN) configuration of the client, supported LTE/Wi-Fi variants, MCS, MIMO capability, etc.

The client database may also optionally include the multi-RAT provisioning status of the particular client (e.g., whether the client has had a connection manager (CM) application installed, status of "pushed" configuration data to the installed CM, etc. As described in greater detail below with respect to FIG. 4b, one implementation of the CBRS system of the present disclosure utilizes MSO-provisioned client device CM apps which enable the client device to configure and manage its various air interfaces (including WLAN, CBRS-LTE, and non-CBRS LTE).

The MSO database 404 also includes a CBRS database, which in the illustrated embodiment retains data relating to, among other things: (i) CBSD identification (e.g., MAC), (ii) CBSD location, (iii) association with parent or child nodes or networks (if any), and (iv) CBRS configuration and capabilities data. The CBRS database 404 may also include MSO-maintained data on spectrum usage and historical patterns, channel withdrawals, and other data which enable the MSO to proactively "plan" channel usage and allocation within the venue(s) of interest where the CBSD(s) 314 operate.

The MSO CBRS controller 310 includes, inter alia, optimization functions which take into consideration network state and topology, (e.g., for access networks spanning across multiple access bands and technologies, cable backhaul and the core network, such as where a 2.4 GHz Wi-Fi access network together with 2.5 GHZ and 3.5 Ghz LTE network, cable backhaul and MSO (cable) core together can be optimized), loading, and user requirements, and generate standardized requests to the FSAS1 202 or CSAS1 420 services via the DP 208. The controller 310 also "tunes" the response from FSAS/CSAS before sending it to the CBSDs 314. Specifically, in one particular implementation, mobility optimization is performed by the controller 310 by taking FSAS/CSAS channel change, withdrawal, and power change, and other self-optimizing network (SON) functions into account, as described in greater detail subsequently herein. The FSAS/CSAS response is first analyzed by the controller logic as to the number of affected downstream devices (e.g., how many small cells or other CBSDs are affected), and the instructions sent to the individual CBSDs in phases/groups, or according to some other scheme so as to mitigate the impact on the UEs (yet consistent with FSAS/CSAS and CBRS system requirements). In this fashion, an individual UE can be "moved around" to other CBSDs and/or frequency bands to the extent possible, and user experience preserved (i.e., little or no discontinuity in service is perceived).

In certain embodiments, each CBSD 314 is located within and/or services one or more areas within one or more venues (e.g., a building, room, or plaza for commercial, corporate, academic purposes, and/or any other space suitable for wireless access). Each CBSD 314 is configured to provide wireless network coverage within its coverage or connectivity range. For example, a venue may have a wireless modem installed within the entrance thereof for prospective customers to connect to, including those in the parking lot via inter alia, their LTE-enabled vehicles or personal devices of operators thereof. Notably, different classes of CBSD 314 (e.g., eNB) may be utilized. For instance, Class A eNBs can transmit up 30 dbm (1 watt), while Class-B eNBs can transmit up to 50 dbm, so the average area can vary widely. In practical terms, a Class-A device may have a working range on the order of hundreds of feet, while a Class B device may operate out to thousands of feet or more, the propagation and working range dictated by a number of factors, including the presence of RF or other interferers, physical topology of the venue/area, energy detection or sensitivity of the receiver, etc.

In one implementation, the system and methods of the present disclosure include determining a desired or optimal installation configuration for one or more wireless interface devices (e.g., CBSDs 314) within a premises or venue, such as for example using the methods and apparatus described in co-owned and co-pending U.S. patent application Ser. No. 14/534,067 filed Nov. 5, 2014 and entitled "METHODS AND APPARATUS FOR DETERMINING AN OPTIMIZED WIRELESS INTERFACE INSTALLATION CONFIGURATION". As disclosed therein, a network entity collects information relating to the type of services required, and generates a customer profile. The customer profile is then used to determine a number and type of wireless interface devices required. In one variant, a device chart is generated, which lists a plurality of combinations of categories of service and a respective plurality of device combinations needed to provide optimal (or at least to the desired level of) service thereto. The device chart is consulted to arrive at an appropriate installation work order, which is submitted for premises installation.

In the exemplary embodiment, one or more CBSDs 314 may be indirectly controlled by the CBRS controller 310 (i.e., via infrastructure of the MSO network), or directly controlled by a local or "client" CBRS controller disposed at the venue (not shown). Various combinations of the foregoing direct and indirect control may be implemented within the architecture 400 of FIG. 4a as desired. The controller 310 is implemented in this instance as a substantially unified logical and physical apparatus maintained within the MSO domain, such as at an MSO headend or hubsite. In the embodiment of FIG. 4a, the controller 310 is configured to at least: (i) dynamically monitor RF conditions and performance information in the hosting environment via use of the CBSDs 314a; (ii) cause issuance of interference reports based on the data of (i) for transmission to the DP 208 (and forwarding to the FSAS/CSAS) (iii) cause issuance of spectrum requests to the DP 208 (for forwarding to the cognizant FSAS 202 or CSAS 420). As used herein, the term "forwarding" includes any necessary intermediary protocol translation, processing, repackaging, etc. as necessitated by the receiving FSAS/CSAS domain.

Most notably, the controller 310 includes algorithms to optimize operation of the "local" CBRS network maintained by the MSO, such as within a target venue or area. These optimizations may include for example: (a) utilization of the environmental interference data of (i) above to characterize the CBRS band(s) of the venue/area; (b) use the characterization of (a) to structure requests for spectrum allocation within the CBRS band(s) to the DP/SAS (e.g., which will mitigate interference or contention within the venue/are in those bands); (c) use the interference data of (i) above, and other relevant data (e.g., attendance, time, interference/signal as a function of CBSD location, etc.) to build historical profiles of spectrum use a function of various variables, including profiles particular to the venue/area itself, as described in co-pending U.S. patent application Ser. No. 15/612,630 filed Jun. 2, 2017 entitled "APPARATUS AND METHODS FOR PROVIDING WIRELESS SERVICE IN A VENUE," incorporated herein by reference in its entirety; (d) utilize data regarding spectrum availability withdrawals (e.g., where DoD assets require use of a previously allocated band) and other events to generate predictive or speculative models on CBRS band utilization as a function of time.

In addition to the foregoing, the controller 310 may be configured to actively or passively coordinate MSO user/ subscriber RAT and band allocations between CBSDs (using CBRS allocated spectrum at approximately 3.5 GHz) and e.g., Wi-Fi use of 2.4 or 5 GHz bands of ISM, so as to optimize user experience, as described in greater detail below with respect to FIG. 4c. For example, in one implementation, computerized optimization functions in the controller 310 take multiple variables into consideration (e.g., network state, current topology, load, and user bandwidth requirements) as part of generating its request to SAS (via the DP 208). These variables may also be utilized in generating the internal (i.e., internal to MSO network) allocations to individual CBSDs within the venue area.

Figure 4B:
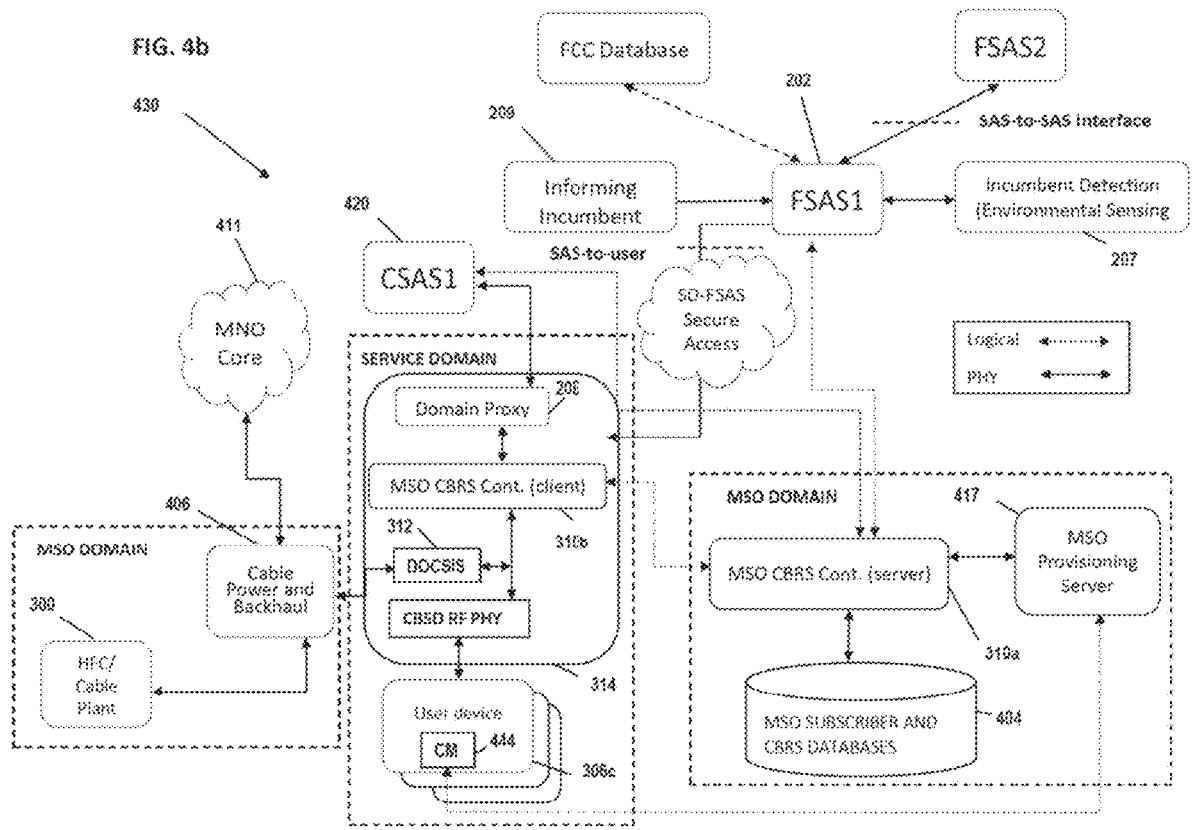
FIG. 4b is a functional block diagram of a second exemplary embodiment of a wireless network infrastructure including distributed controller functionality and client provisioning, useful with various aspects of the present disclosure.
Figures 1, 4B:
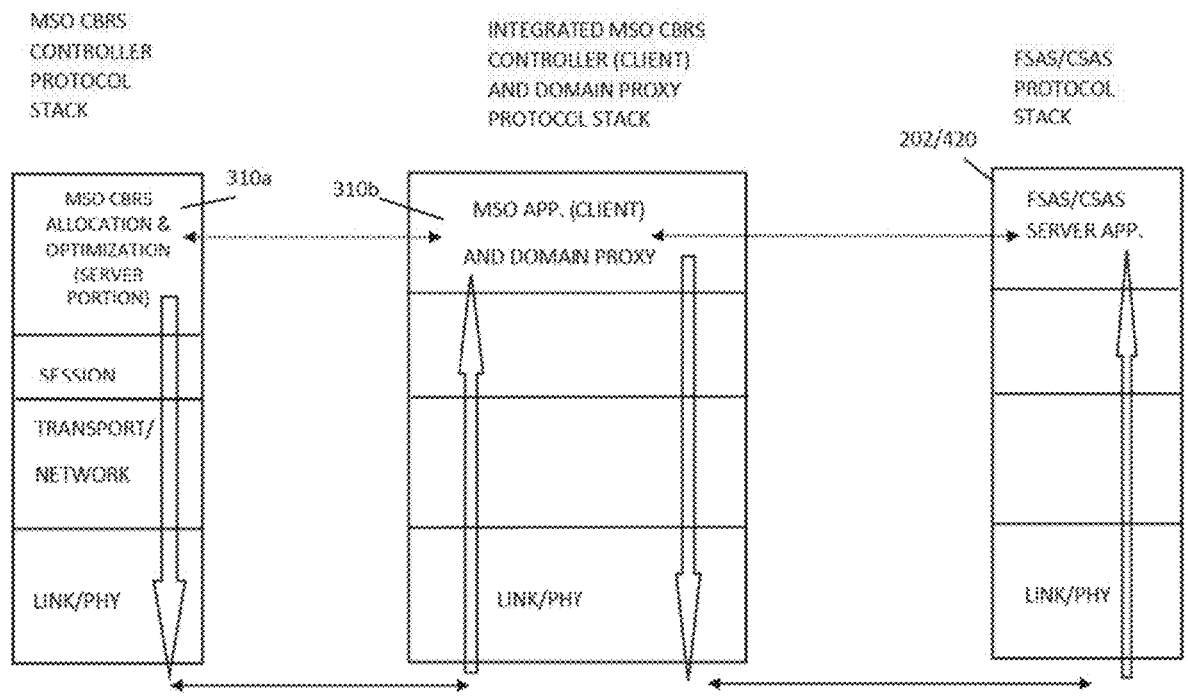

Referring now to FIG. 4b, a second embodiment of a network architecture 430 useful in implementing the CBRS-based wireless RAT access and co-existence methods of the present disclosure. In this embodiment, a distributed architecture for the MSO controller 310 is utilized, and the domain proxy 208 is maintained by the MSO as part of the MSO connection manager "client" disposed at the venue or area of interest ("service domain").

Moreover, in one implementation, the client devices 306c each include a connection manager (CM) application computer program 444 operative to run on the client and, inter alia, enable the host client device to operate in a multi-RAT environment (e.g., WLAN, CBRS-LTE, and non-CBRS LTE). As an aside, downloadable application or "app" may be available to client devices of subscribers of an MSO or cable network (and/or the general public), where the app allows users to connect to or obtain MSO-provided services. Application program interfaces (APIs) may be included in an MSO-provided applications, installed with other proprietary software that comes prepackaged with the client device, or natively available on the CC or other controller apparatus. Such APIs may include common network protocols or programming languages configured to enable communication with other network entities as well as receipt and transmit signals that may be interpreted by a receiving device (e.g., client device).

Figure 4C:
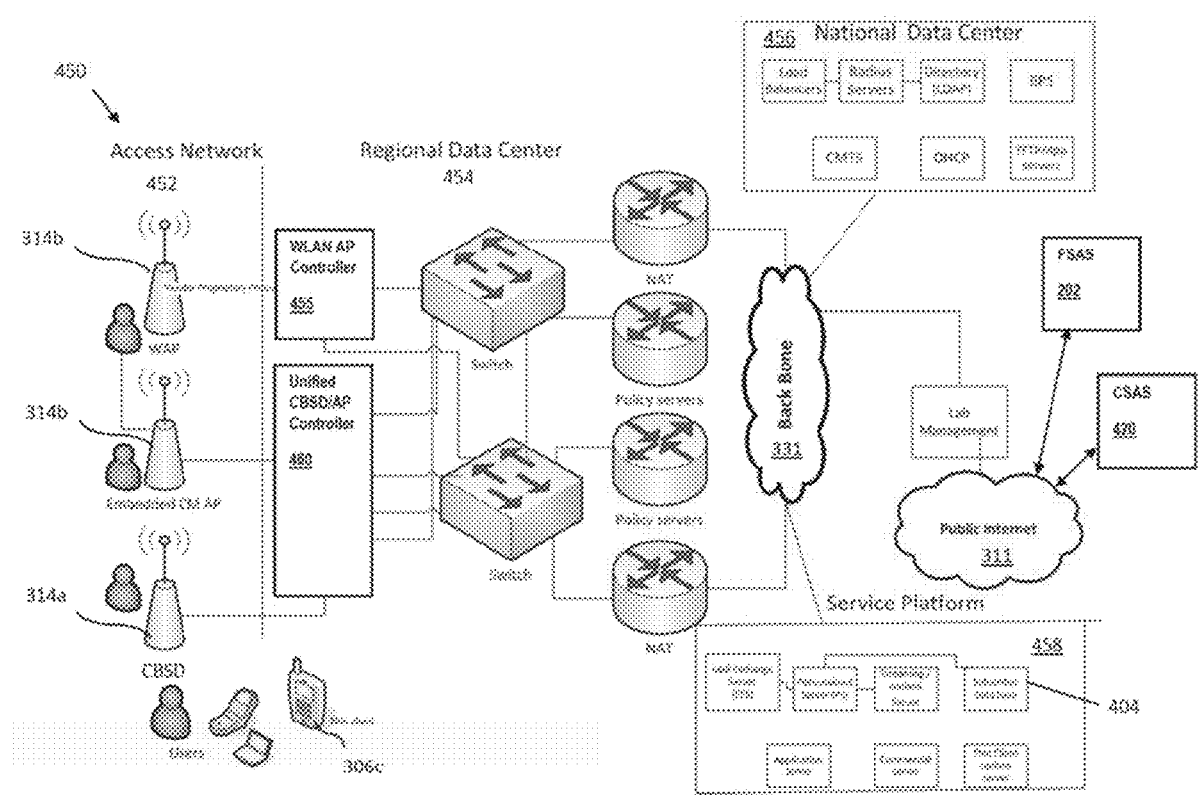
FIG. 4c is a functional block diagram of a third exemplary embodiment of a wireless network infrastructure including unified CBRS and WLAN control, useful with various aspects of the present disclosure.

FIG. 4c illustrates another exemplary cable network architecture for providing quasi-licensed CBRS and unlicensed WLAN services within, e.g., a venue or other premises, which extends from user client devices. In this architecture 450, WLAN and CBRS services are managed collectively (at least in part) by a unified CBSD/AP controller 460, which coordinates activity and allocations of users so as to minimize spectral contention and/or optimize user experience within the venue.

As shown in FIG. 4c, the architecture 450 is divided into four main logical groups: an access network 452, a regional data center 454, a national data center 456, and a service platform 458. The access network 452 includes one or more APs (e.g., WLAN APs 314b) disposed within the venue, and end user devices 306c connected thereto. The regional data center 454 assists in providing services to the end users by receiving, transmitting, and processing data between the access network 452 and the backbone 331 of the cable network. In one embodiment, the regional data center 454 is a local infrastructure that includes controllers (e.g., AP and unified CBSD/AP controllers), switches, policy servers and network address translators (NATs) in communication with the backbone 311. The regional data center 454 may be, for example, an intermediate data center on premises disposed away from the local access nodes and user premises (venue), and disposed within a larger infrastructure.

In the exemplary embodiment, the backbone 331 of the network enables data communication and services between the regional data center 454 and the national data center 456 via backhaul, and/or connection to the (public) Internet 311. In one implementation, the national data center 456 provides further top-level provisioning services to the regional data center 454 (e.g., load balancing, support of Trivial File Transfer Protocols (TFTP), Lightweight Directory Access Protocols (LDAP), and Dynamic Host Configuration Protocols (DHCP)), as well as providing the same to other data centers and/or access networks which may be part of the network operator's (e.g., MSO's) national-level architecture. The national data center 456 also houses in one embodiment more advanced backend apparatus (e.g., CMTS 339, AP/CBSD controllers, Layer 3 switches, and servers for the provisioning services). In one embodiment, a separate service platform 458 may provide auxiliary services to the end users within the venue and subscribed to the MSO network provider, including access to mail exchange servers, remote storage, etc. Thus, it can be appreciated that myriad network nodes and entities, as well as connections there between, enable client devices (and ultimately end user devices 306c) to maintain end-to-end connectivity across the network.

In one or more embodiments, the CBRS controller 460 may also provide various information via an open-access network such as a wireless local area network (WLAN), such as that described in co-owned and co-pending U.S. patent application Ser. No. 15/063,314 filed Mar. 7, 2016 and entitled "APPARATUS AND METHODS FOR DYNAMIC OPEN-ACCESS NETWORKS", incorporated by reference in its entirety. In one embodiment, the information provided is contextually relevant to locations of respective users or devices receiving the information. As but one example, the information provided may relate to the availability of wireless performance enhancement via use of an API; i.e., advertising to the client (via its indigenous WLAN protocol stack or communications capabilities), the ability to obtain better wireless performance within inter alia, the venue or service area by accessing the designated API to obtain information or cause connection to the CBRS-LTE interface of the CBSD 314 (and the client's indigenous LTE stack).

In one implementation, the information is provisioned by a network entity (for example, from a service provider network operator) and provided to one or more access points (APs) 314b of the service provider network. The information is bit-stuffed into Wi-Fi beacon frames or other data structures that are broadcast by the APs to nearby client devices. A receiving client device extracts the information using a protocol embodied in the OS or extant software of the client, and may also initiate a dedicated wireless connection with the AP for e.g., transmission of the CM app as a download, or a URL or other network address where the client can obtain the CM app from e.g., a provisioning server of the MSO or third party.

Alternatively, if the CM has already been installed on the given client device, the installed CM 444 can be used to extract data from the "stuffed" beacons relating to other functions of interest to the user.

Methods—

Figure 5:
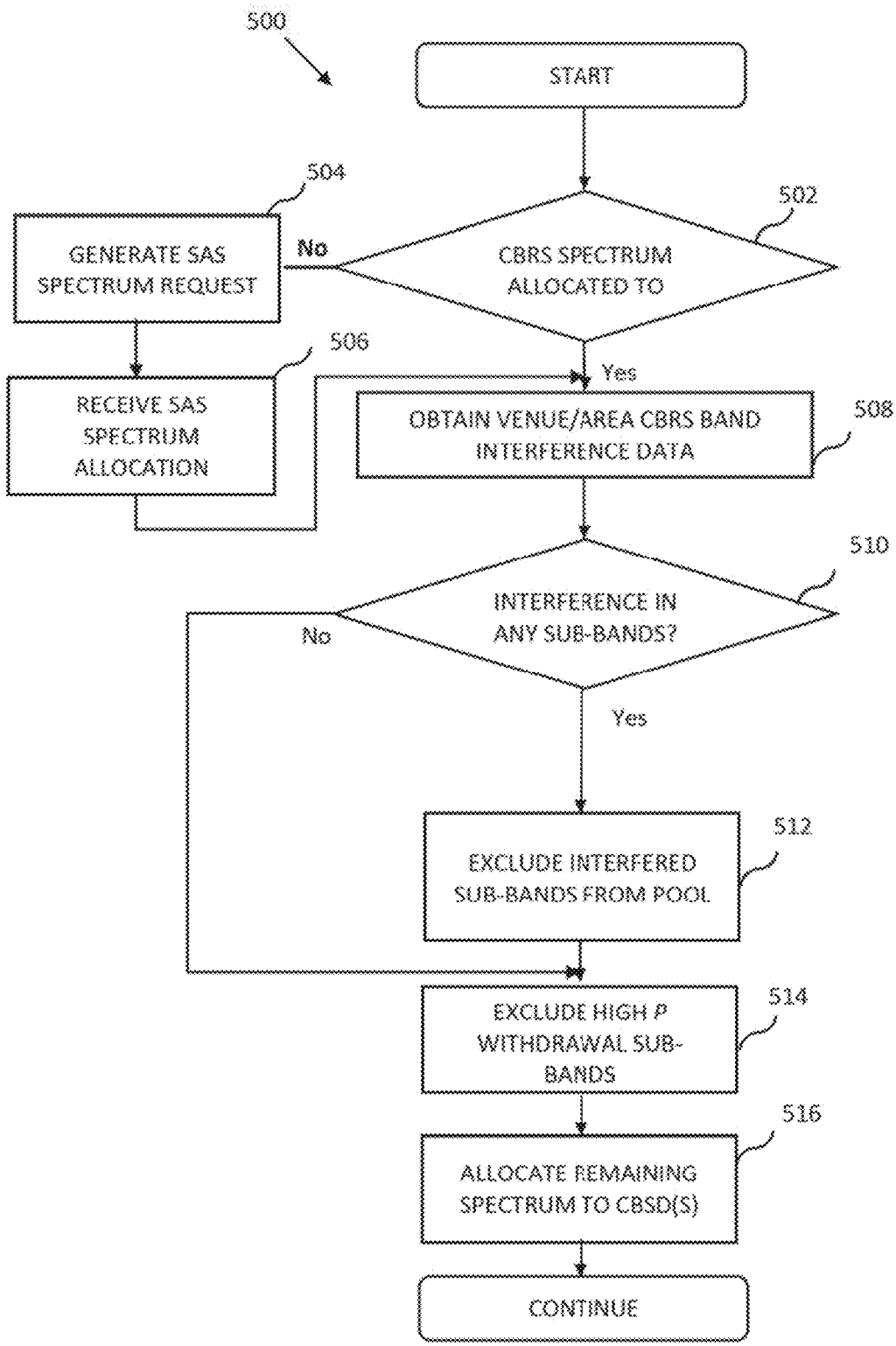
FIG. 5 is logical flow diagram of an exemplary method for enabling connectivity via a quasi-licensed band (e.g., CBRS) according to the present disclosure.
Figure 6A:
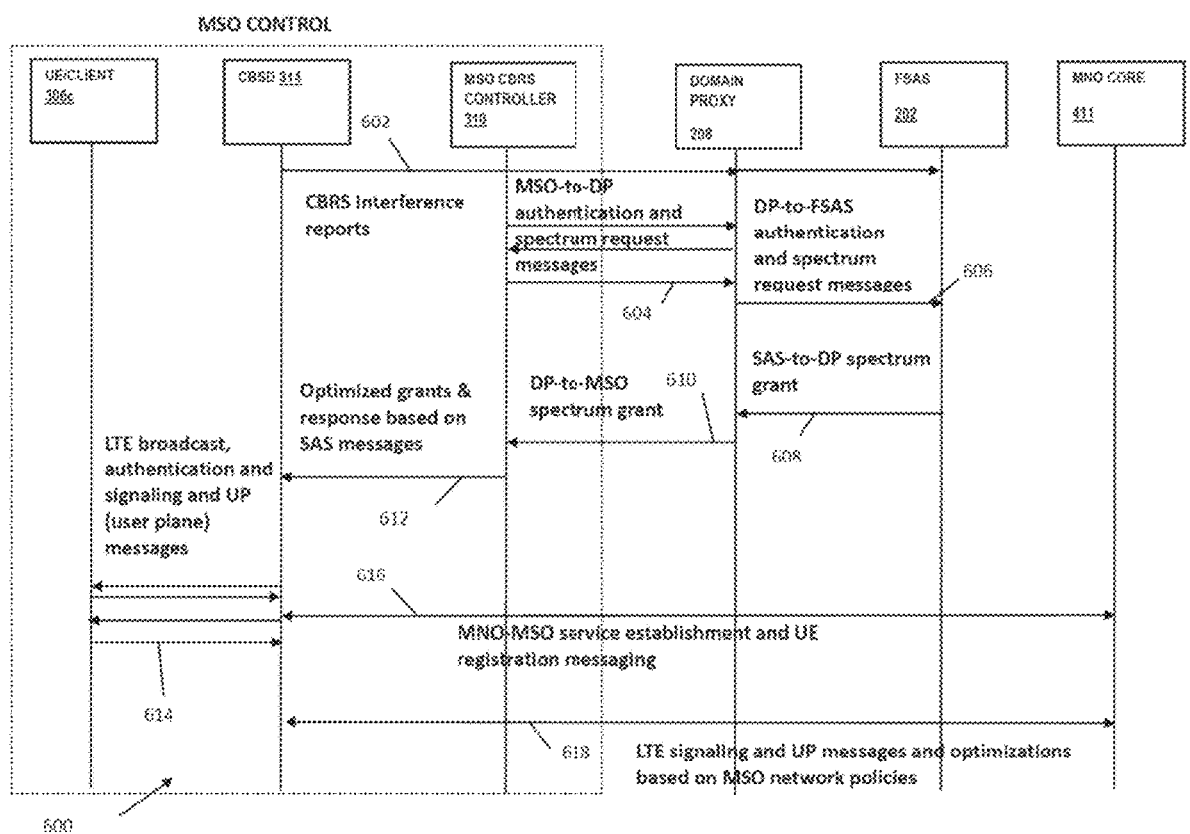
FIG. 6a is a ladder diagram illustrating a first embodiment of a communication flow for establishing quasi-licensed band communication in accordance with the methods of the present disclosure.
Figure 6B:
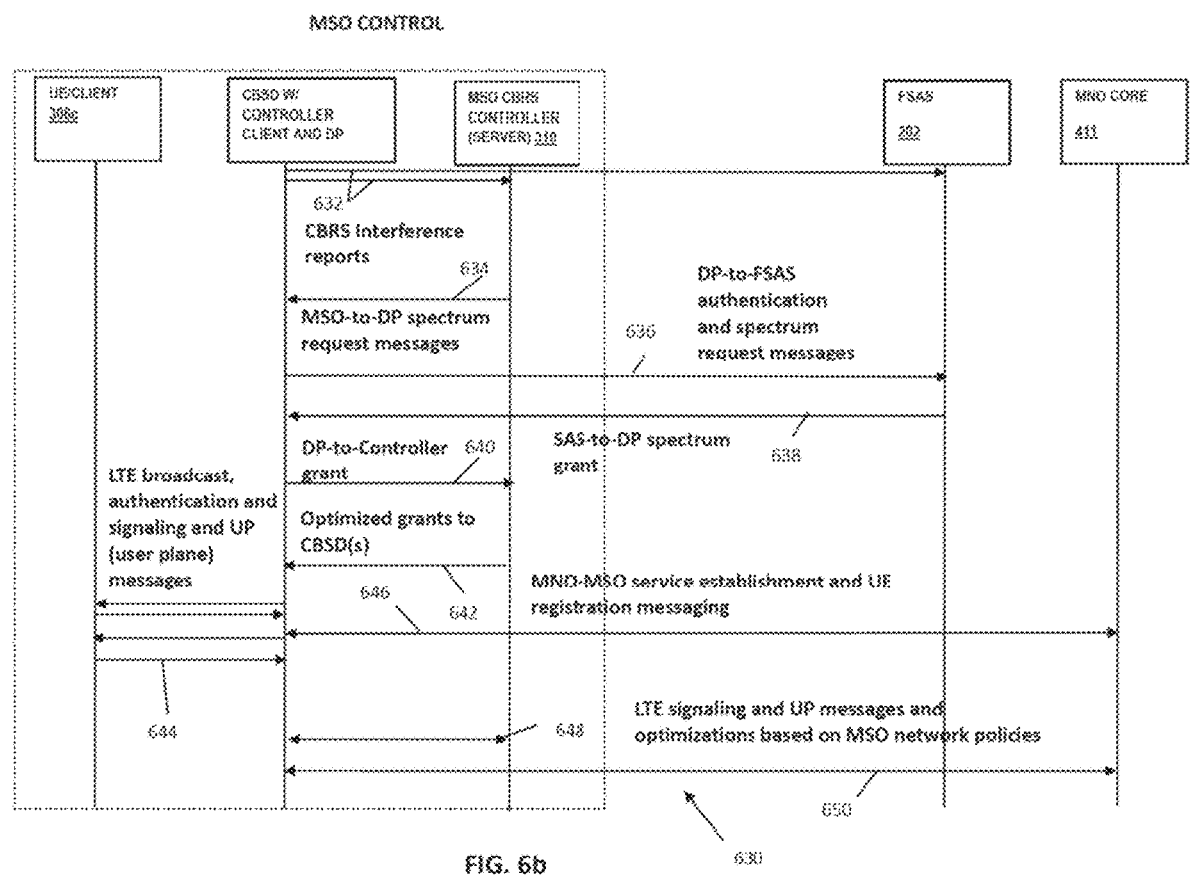
FIG. 6b is a ladder diagram illustrating a second embodiment of a communication flow for establishing quasi-licensed band communication in accordance with the methods of the present disclosure.
Figure 6C:
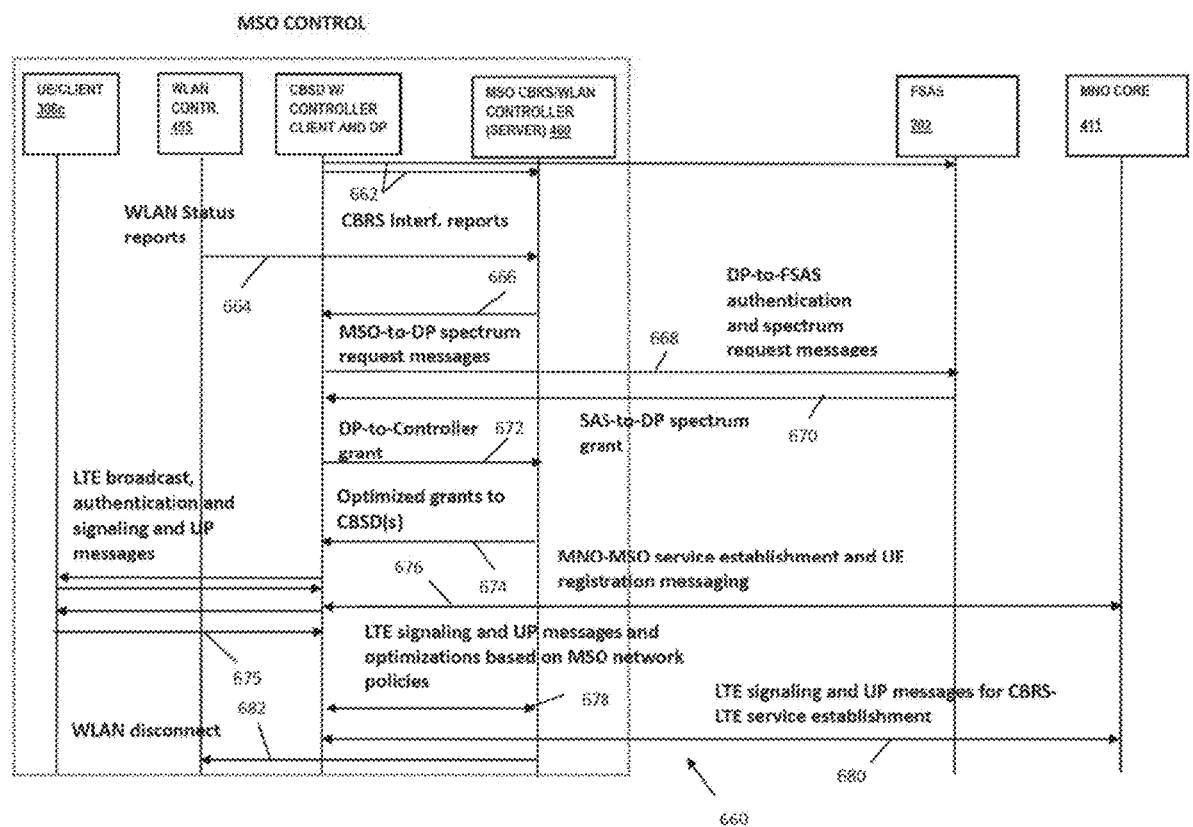
FIG. 6c is a ladder diagram illustrating a third embodiment of a communication flow for establishing quasi-licensed band communication in accordance with the methods of the present disclosure.

Various methods and embodiments thereof for controlling wireless networks according to the present disclosure are now described with respect to FIGS. 5-6c.

FIG. 5 illustrates an exemplary embodiment of a method 500 implemented by the system architecture (e.g., the system 400 as discussed above with respect to FIG. 4a) to enable connectivity to a quasi-licensed wireless network (e.g., CBRS network) by a client device. The wireless network useful with method 500 is not limited to those embodied in FIGS. 3-4c herein, and may be used with any wireless-enabled client device and any architecture utilizing data communication among nodes (including those with multiple coexisting networks).

At step 502, the controller 310 identifies whether any CBRS spectrum has been allocated to the MSO. For instance, at startup of a venue/area system, no spectrum may yet be obtained from the SAS. If no spectrum has been allocated to the MSO for this venue/area, then per steps 504 and 506, the controller 310 generates a spectrum request to be sent to the FSAS 202 (or CSAS), and ultimately receives an allocation within one or more sub-bands of the CBRS 3.550-3.700 GHz spectrum.

Once spectrum is obtained/identified, the controller 310 obtains interference or environmental data relating to the target venue or coverage area per step 508. This may comprise current measurements by a CBSD 314 within the venue, historical data, or combinations of the foregoing. Per step 510, the obtained data is evaluated for potentially deleterious interference within any of the allocated sub-bands, and any allocated sub-bands with significant interference (or prospective interference) are removed from the available pool of sub-bands for use by the CBSD(s) 314 per step 512.

Any number of "interference" measurement techniques or metrics can feasibly be used consistent with the characterization of the CBRS allocated spectrum in the present disclosure, including e.g., SINR, RSSI, RSRP, and RSRQ. SINR is defined by Eqn. (1) below:

$$SINR=S/(I+N) \qquad (1)$$

where:
- S is the power of measured usable signals, such as reference signals (RS) and physical downlink shared channels (PDSCHs);
- I is the average interference power; the power of measured signals or channel interference signals from e.g., other cells; and
- N is background noise, which can be correlated to measurement bandwidth and receiver noise coefficient(s).

In Eqn. (1), all quantities are generally measured over the same frequency bandwidth and normalized to one sub-carrier bandwidth. SINR is generally used as a measure of signal quality (and data throughput), but it is not defined in the 3GPP standards (and hence is not required to be reported to the network infrastructure; however, UE's 306c typically use SINR to calculate the CQI (Channel Quality Indicator) which they do report to the network.

RSRP is defined, per 3GPP, as the linear average over the power contributions (in W) of the resource elements (REs) that carry cell-specific reference signals within the considered measurement frequency bandwidth. The reference point for the RSRP determination is the antenna connector of the UE.

RSRP measurement, normally expressed in dBm, is utilized for ranking different candidate cells in accordance with their perceived signal strength.

Hence, by analogy, SINR and/or RSRP can be determined by the CBSDs 314, obtaining RSRP measurements for any (one or more) from e.g., interfering base stations within range, such as those operating in Band 42 or 43. With SINR/RSRP values within the prescribed ranges, the presence of one or more potentially interfering LTE base stations operating within the designated sub-bands of the CBRS spectrum allocation can be at least assumed.

Alternatively (or in conjunction with the foregoing), Received Signal Strength Index (RSSI) and/or Reference Signal Received Quality (RSRQ) may be utilized for sub-band interferer detection. RSRQ is another signal quality metric, considering also RSSI and the number of used Resource Blocks (N); specifically:

$$RSRQ=(N*RSRP)/RSSI \text{ (measured over the same bandwidth)} \qquad (2)$$

RSSI is a measure of the average total received power observed only in OFDM symbols containing reference symbols for antenna port 0 (e.g., OFDM symbol 0 and 4 in a slot) in the measurement bandwidth over N resource blocks.

It is noted that the total received power of the carrier RSSI includes the power from common channel serving and non-serving cells, adjacent channel interference, thermal noise, and other sources. Hence, it is less specific than the above-described metrics.

Hence, in one implementation, one or more of the foregoing parameters are measured by the CBSD(s) 314 in the region or venue of interest, within the target frequency band (e.g., in or around 3.55-3.7 GHz), and these values are compared to historical data within the database and reflective of an operating LTE system (such as for example at a prior time when an LTE base station was communicating with a prescribed or even indeterminate number of LTE UE's). As noted above, the historical data may also be represented as one or more parametric ranges, such that if the measured signals have values falling within the historical ranges, the presence of an LTE interferer is assumed.

Returning again to FIG. 5, at step 514, the MSO database on the remaining sub-bands within the pool is consulted to identify those having a high probability (P) of withdraw from use by the SAS (e.g., those which are frequently withdrawn by DoD asset use, etc.). This analysis may be based on general data irrespective of particular geographic area or venue, or specific thereto. For example, an MSO-serviced hospitality complex far inland from the ocean may never experience withdrawals in certain sub-bands since the DoD ship-borne radar used in those sub-bands does not operate/propagate that far inland, whereas a similar facility operated near the coast might have frequent DoD-based withdrawals in the same sub-band.

Per step 516, at least a portion of the remaining (non-excluded) sub-bands within the pool are allocated to one or more of the CBSDs associated with the target area or venue. It is noted that this allocation of step 516 may be (i) an explicit allocation, such as where CBSD "A" is allocated a first range of frequencies, and CBSD "B" is allocated a second range of frequencies, with no contention therebetween; or (ii) a generalized allocation, such as where the controller 310 allocates both CBSD A and B to operate within a common band, thereby allowing the indigenous contention management protocols (e.g., LBT) of the underlying LTE standards (e.g., LTE/LTE-A/LTE-U/LTE-LAA) to sort out the specifics of carrier utilization. Hence, in one model, the controller 310 is configured to "pack" the allocated CBRS spectrum using non-overlapping (or at least non-interfering) sub-band assignments to different CBSDs until such scheme is exhausted (e.g., such discrete CBSDs allocations cannot be supported), at which point the controller allows two or more of the CBSDs to utilize the contention management protocols within a common band to determine carrier utilization (which may be wholly dynamic as a function of users and time).

Figure 5A:
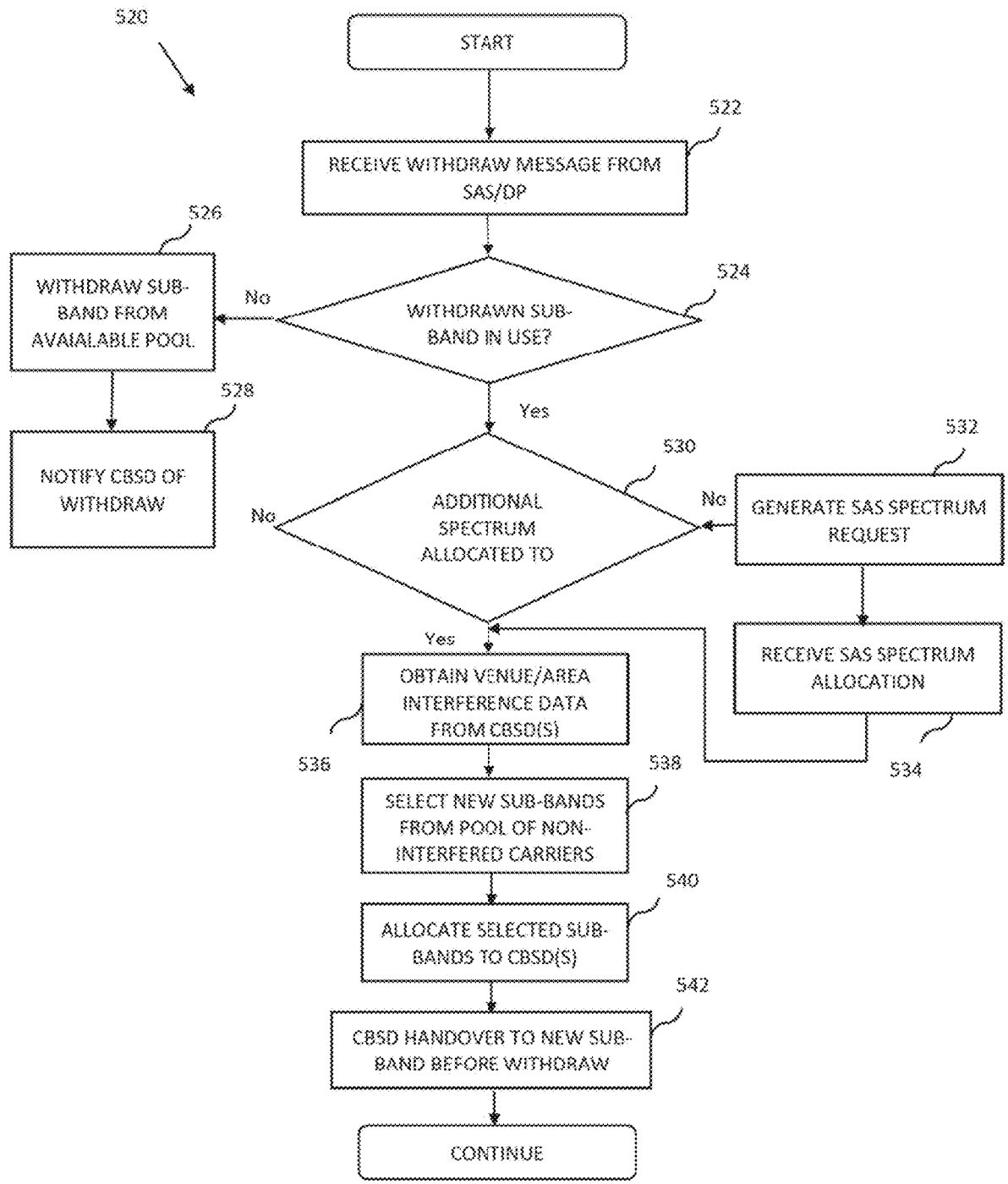
FIG. 5a is logical flow diagram of an exemplary implementation of a method for compensating for CBRS band withdrawal by a SAS.

FIG. 5a is logical flow diagram of an exemplary implementation of a method for compensating for CBRS band withdrawal by a SAS. As shown, the method 520 begins with receipt of a SAS-initiated withdraw message (e.g., from the DP 208) delineating one or more spectral sub-bands to be withdrawn. It will be appreciated that while the method 530 is described with respect to incipient (i.e., future) withdrawal, the method may be adapted by one of ordinary skill given the present disclosure to compensate for post facto withdrawals as well.

As shown in FIG. 5a, the method 520 continues with an evaluation (e.g., by the controller 310) of whether the "withdrawn" sub-band(s) are currently in use by the MSO infrastructure; e.g., via messaging to one or more CBSDs within the affected area(s) or venues per step 524. As discussed above, allocation and grant of a CBRS channel is typically based on the geographic location, not only for reasons of maximum practical range of the CBRS wireless signals, but also based on expected "incumbency" within those areas. For example, coastal areas and major ports with large DoD presence may have greater possibility of allocated channels being needed by those DoD assets, and as incumbent with highest priority vacating other users within those bands on short notice. This factor can be considered in the controller's mobility optimization, including when initially allocating the CBRS bands for use by certain MSO CBSDs. For example, the controller logic can be configured to, based on e.g., (i) a presumed maximal range of the CBSD in serving users, and (ii) the probability of one or more bands being withdrawn by such DoD assets on short notice, implement its spectrum/geographic allocation "map" so as to reduce the likelihood that a given user (or group of users) will be "stranded." For instance, consider the scenario where the MSO has installed three (3) CBSDs within a venue such as a concert hall. These three CBSDs are placed within the venue to provide optimal (including overlapping) coverage so that regardless of where the user is located/seated, they will have adequate CBRS signal strength in the then-allocated band(s). However, if all three CBSDs utilize the same frequency band (e.g., Band X), and that band is withdrawn, the users attached to those CBSDs will all need to be migrated to one or more new bands, which may, depending on FSAS/CSAS and other response delays, may result in temporary loss of service. Conversely, if the MSO allocation plan identifies Band X as a likely withdraw candidate based on the venue's location in a port city (e.g., San Diego) and common DoD asset use of that band (e.g., it correlates to a radar or communication system frequently used by the DoD asset), the controller logic can schedule the three CBSDs in the venue so as to mitigate a common withdrawal scenarios as described above; e.g., by allocating users onto less "withdrawal-prone" CBRS spectrum anticipatorily. Hence, the controller 310 of the present disclosure can advantageously be configured to perform geography-based "withdrawal" assessment and planning; e.g., modeling use within a prescribed area or venue to mitigate anticipated withdrawals of spectrum so as to, inter alia, preserve user experience.

If not in use, then per steps 526 and 528, the controller 310 withdraws the sub-bands from the pool, and notifies the affected CBSDs 314. If in use per step 524, then the controller 310 consults its local or internal current CBRS band allocations (e.g., maintained in the MSO database 404 of FIG. 4a) at step 530 to determine whether there is additional spectrum already allocated to the MSO for use by the controller 310. If not, then per steps 532 and 534, a spectrum request message is generated and transmitted to the SAS via the DP 208, and a spectrum allocation to the MSO subsequently received by the controller 310.

If extant spectrum is identified by the controller at step 530, then the venue-specific interference data is obtained from the relevant CBSDs 314 per step 536, and new sub-band(s) selected from the available pool that mitigate or avoid any salient interference identified at the venue per step 538. The selected sub-band(s) is/are then allocated to the CBSD(s) 314 by the controller for use with e.g., MSO users or clients, per step 540.

Figure 5B:
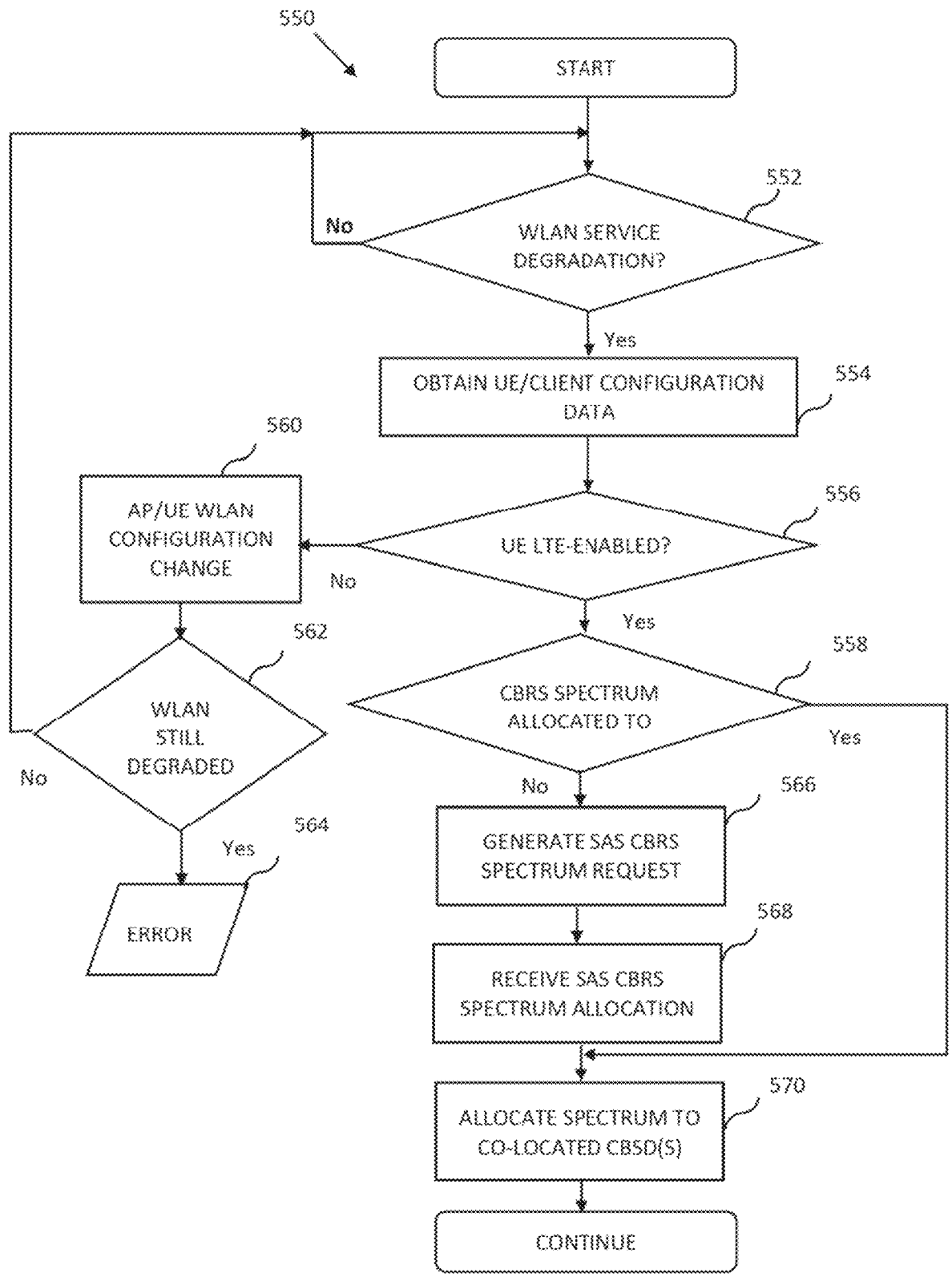
FIG. 5b is logical flow diagram of an exemplary implementation of a method for enabling connectivity of CBRS spectrum in a WLAN/CBRS co-existence environment.

FIG. 5b is logical flow diagram of an exemplary implementation of a method for enabling connectivity of CBRS spectrum in a WLAN/CBRS co-existence environment. As shown, the method 550 includes first detecting or receiving indication (e.g., whether by passive monitoring of the WLAN bands within the target venue/area, monitoring WLAN connection performance for one or more users or APs within the venue, or other) of WLAN degradation per step 552. For instance, an extant MSO WLAN user within the venue may roam out of a coverage area for one or more APs 314b within the venue, and hence his/her connection degrades or is completely lost. In one implementation the AP (or its "back end" controller), upon N unsuccessful reconnection attempts, generates a message and transmits it to the CBRS controller 310, thereby alerting the latter that WLAN degradation exists. The controller 310, upon receiving the message from the AP/AP controller, may optionally obtain client device wireless configuration data from the MSO database 404 (e.g., by MAC address or other device-specific ID or parameter forwarded to the controller 310 by the AP/AP controller) per step 554 to determine whether the affected device has CBRS (e.g., LTE Band 42 or 43) capability. The MSO may also contact an MNO 411 to obtain capability and/or subscription information as needed. Per step 556, if the UE (client) is LTE-enabled, and CBRS spectrum is allocated to the MSO per step 558, then relevant CBSDs 314 are allocated spectrum per step 570. Otherwise, a request/grant procedure is implemented per steps 566 and 568.

If, per step 556, the optional check of the UE configuration indicates that it is not LTE-capable, then co-existence compensation mechanisms for the AP and/or client (UE) are invoked per step 560. In one implementation, these mechanisms include one or more of those described in co-owned and co-pending U.S. patent application Ser. No. 15/615,686 filed Jun. 6, 2017 entitled "METHODS AND APPARATUS FOR DYNAMIC CONTROL OF CONNECTIONS TO CO-EXISTING RADIO ACCESS NETWORKS" incorporated by reference herein in its entirety, such as e.g., reduction of client WLAN interface ED threshold, increase in AP Tx power, increased beamforming by the AP, or yet others. If such compensation mechanisms do not restore the connection sufficiently per step 562, then an error code is generated per step 564.

Figure 5C:
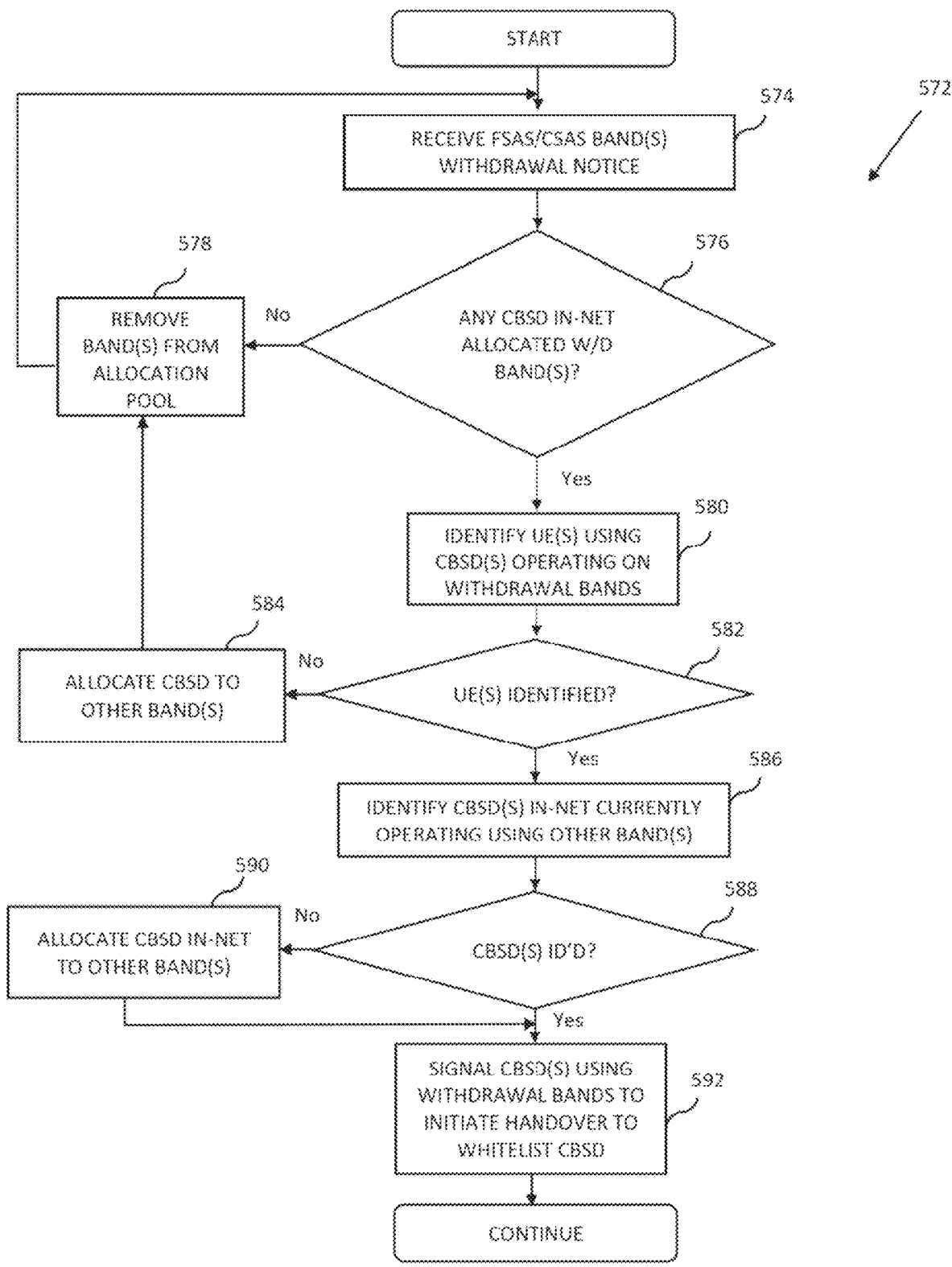
FIG. 5c is a logical flow diagram of an exemplary implementation of a method of client device management within a multi-node wireless network according to the present disclosure.

FIG. 5c is a logical flow diagram of an exemplary implementation of a method of client device management within a multi-node wireless network according to the present disclosure. As shown in the Figure, the method 572 includes first receiving a withdrawal "notice" (e.g., data communication) generated by an FSAS or CSAS 202, 420 per step 574. As previously described, the MSO controller 310 may directly receive the data communication(s) from the FSAS/CSAS, or they may be routed from another intermediary entity, whether within or external to the MSO infrastructure. The data communication(s) in one embodiment indicate one or more frequency bands within the CBRS spectrum (i.e., between 3.550 and 3.700 GHz) which require withdrawal. In some cases, the data communications may include other data, such as other requirements to be obeyed in the withdrawal of the designated band(s) including for instance temporal requirements for the withdrawal, bandwidth of the designated band(s), and/or geographic or other identifiers (indicating the scope of the withdrawal).

Per step 576, the controller 310 determines, based on the data in the communications issued by the FSAS/CSAS, whether any of the designated bands are allocated to one or more CBSDs 314 within the MSO network. Depending on the type of withdrawal, the controller 310 may conduct other analyses. For instance, if the withdrawal requirement is specific to a prescribed geographic area only, the controller 310 may only evaluate data associated with CBSDs in that area (e.g., current configuration files for the CBSDs indicating their current frequency band allocations for operation). If the withdrawal is "blanket" (i.e., no quasi-licensed use for any reason), then the controller 310 may query its entire CBSD pool.

If per step 576 no operating CBSDs 314 within the CBSD pool are allocated or utilizing the withdrawal bands, then per step 578, the controller causes the designated band(s) to be removed from the pool of available spectrum for use by the MSO (which again, may be on a network-wide or limited geographic region basis).

Alternatively, if one or more CBSDs 314 within the affected region using the withdrawal band(s) is/are identified, at step 580, the controller 310 then identifies one or more user devices (e.g., UEs) using the identified CBSDs for data or other sessions. This identification may be obtained in one implementation by querying the identified CBSD(s) to report UEs with which the CBSD maintains ongoing association (e.g., mobile device IDs associated with the cell ID for the CBSD).

Per step 582, if no UEs associated with the affected CBSD(s) is/are identified, no current users are affected by the withdrawal, and the controller 310 re-allocates the affected CBSD(s) to one or more non-withdrawn frequency bands from the available pool, per step 584, so as to avoid future use of the withdrawn band(s) by those CBSDs when communicating with UEs.

Per step 582, if one or more UEs associated with the affected CBSD(s) is/are identified, the controller 310 attempts to identify one or more handover candidate CBSDs within the affected region (i.e., CBSDs using one or more bands that are not part of the band withdrawal received from the FSAS/CSAS), per step 586. In one LTE-based implementation, this identification is conducted by the controller 310 obtaining data from the affected CBSD 314, which has been generated by one or more associated UEs and returned to the CBSD. For example, Per 3GPP TS 36.331 (e.g., Release 8 version 8.20.0 dated July 2010 and later), incorporated herein by reference in its entirety, UEs may be directed via the RRCConnectionReconfiguration message to implement a number if IEs (information elements) relating to UE measurements, such as the MeasConfig IE. Measurement objects, rules, and parameters can be specified for a given UE by its parent eNodeB (or here, CBSD "small cell" or femtocell) relating to RF environment measurements for other cells, including at other frequencies and/or RATs (i.e., inter-frequency and inter-RAT); the UE then reports this data to the parent node via established reporting mechanisms within TS 36.331. In one embodiment of the present method 572, a "whitelist" is generated by the controller 310 and passed down to the CBSD 314; this whitelist contains one or more frequency bands which are not otherwise withdrawn (or soon to be withdrawn) by the FSAS/CSAS, and hence safe for possible selection as a handover or target cell (see step 592). Alternatively, the UE may be instructed to monitor all proximate cells (i.e., according to otherwise unchanged MeasConfig parameters specified by the CBSD), and return such data to the controller 310 via the CBSD backhaul link, wherein the controller 310 may utilize the data to select the appropriate cell for target handover, and send the selection to the affected CBSD.

It will be appreciated that inter-cell handovers within the exemplary LTE RAT are generally "hard" (versus traditionally "soft" handovers in other RATs), and hence the affected eNodeB (e.g., CBSD) can in one embodiment merely instruct the UE to drop its session with that CBSD, and to establish a new one with the target cell. Accordingly, the higher layer processes of the UE (e.g., the media player, browser, MSO app, or other process transacting the user's data session) may be configured to buffer or otherwise ameliorate the "hard" handover so as to maintain good user experience. For instance, in one variant, the higher layer process may buffer a prescribed temporal duration ahead within a streaming media stream (or alternatively proactively request retransmission) so as to mitigate perceived discontinuity on the inter-cell handover.

Per step 588, if no "clean" or whitelisted CBSDs are located by the controller 310, the controller then allocates clean spectrum to one or more CBSDs within the affected region (i.e., which are within suitable range of the UE to render service).

FIG. 6a is a ladder diagram illustrating an exemplary communications flow 600 for configuring and controlling CBRS connectivity within a venue.

At step 602a of the exemplary embodiment, a CBSD 314 sends an interference report to the designated DP 208. Data of these reports are forwarded to the cognizant FSAS(s) 202 by the DP 208 according to the proper FSAS protocol. The reports may contain information related to, e.g., transmit power of nearby access points and nodes, number of users, channels used, data transmission rates, beamforming settings, modulation/coding scheme (MCS), or other statistics associated with signals propagating within the venue, e.g., signals related to CBRS sub-bands in the 3.550-3.700 GHz range. Per step 604, the MSO controller 310 decides it needs CBRS spectrum allocated (for whatever reason; e.g., in response to any number of scenarios such as those of FIGS. 5-5b discussed above), and invokes a communication protocol with the DP 208. Such protocol may include for example an authentication (e.g., challenge-response) of the MSO controller 310 by the DP, and conversely authentication of the DP 208 by the MSO controller 310 or its security proxy, so as to e.g., mitigate spoofing or MITM attacks.

Once the DP/controller are mutually authenticated, the DP 208 generates a spectrum request message on behalf of the controller 310 for transmission to the FSAS 202 per step 606. Per step 608, the FSAS 202 responds to the DP 208 with a spectrum grant (or rejection), which is then symmetrically sent to the MSO controller 310 per step 610 using the appropriate MSO/DP protocols (which may differ from those of the FSAS).

Per step 612, the MSO controller 310, after evaluating and conducting optimization of spectrum sub-band allocations to the various CBSDs within a given venue/area (and optionally other venues/areas, depending on coverage), issues its optimized allocations of the sub-bands to the CBSDs 314 of the one or more venues. At this point, the CBSDs configure for operation in the allocated sub-bands (e.g., LTE band 43), and broadcast on their DL channels to advertise their availability to any client/UE within range of the CBSD(s).

Specifically, as is known, LTE systems utilize OFDM on their DL (base to UE), and SC-FDMA on their UL (UE to base), and further employ a number of shared/control channels for a variety of control, signaling, and other functions. These channels exist in both DL and UL directions, and include the: (i) physical downlink control channel (PDCCH); (ii) physical uplink control channel (PUCCH); (iii) physical downlink shared channel (PDSCH); and (iv) physical uplink shared channel (PUSCH). These channels can be decoded by the UE and used to establish communication with the CBSD 314.

In operation, the LTE UE will report its CSI (channel state information, including CQI or channel quality index) via one of the UL channels; i.e., PUSCH or PUCCH, thereby characterizing the RF receiving environment for each reporting UE. The eNodeB takes the reported CSI information to develop a schedule for transmission to the UE(s) via the PDSCH, and DL resource allocation is made via the PDCCH. UL grants (for UE traffic operations such as when no PUSCH is available) are also made by the eNodeB via the PDCCH, based on requests sent via the PUCCH.

Hence, per step 614, the UE(s) receive the broadcast channels, synchronize and determine timing (e.g., via CAZAC sequence analysis), and then establish UL communication with the CBSD (operating effectively as an eNodeB) within the sub-bands of interest, including authentication and sign-on of the UE to the MNO network. The latter is facilitated in one implementation via one or more service establishment requests to the MNO's designated EUTRAN entity per step 616; e.g., to validate the UE's mobile ID and other subscription information, and enabling transaction of UP (user plane) data between the client device and the eNodeB. In this implementation, the MSO infrastructure acts effectively as a conduit or extension of the MNO network, with the MNO core 411 conducing all of the relevant communications operations to establish the UE/eNB session per the LTE standards, with the CBSD(s) 314 acting as its proxy within the MSO network.

Per step 618, the CBSD, the session is optionally configured according to one or more MSO policies as dictated by the controller 310; i.e., according to e.g., previously agreed-upon policies between the MSO and MNO 411, and these policies for the particular session are then communicated to the MNO.

FIG. 6b is a ladder diagram illustrating a second embodiment of a communication flow for establishing quasi-licensed band communication in accordance with the methods of the present disclosure. In this method 630, the MSO controller 310 includes server and client controller portions 310a, 310b as in the embodiment of FIG. 4b. Moreover, the DP 208 is integrated with MSO infrastructure (e.g., as part of the CBSD 314) as shown.

Per step 632, CBRS interference reports of the type previously described are sent to the MSO controller (server) 310a from the CBSD 314, as well as to the cognizant FSAS 202 as may be required under the Federal standards. Per step 634, the controller 310a determines its need for CBRS spectrum (again, for whatever reason), and issues a request to the DP 208 (residing within the CBSD at the service domain). The DP 208 formats the request according to the appropriate FSAS protocol and transmits the request per step 636; a spectrum grant/denial is subsequently received per step 638 at the DP 208.

Per step 640, the DP 208 (via the controller client 310b) informs the controller server 310a of the results (assume here a "grant" of spectrum), and accordingly the server 310a utilizes the grant sub-band allocation information, along with the interference data of step 632, to optimize the CBRS spectrum allocations for the CBSDs. Note that in this implementation, while the DP 208 and controller client 310b are co-located with the CBSD, the logic does not "short circuit" the grant directly to the CBSD 314, but rather waits for the server portion 310 of the controller to optimize the allocation and pass the optimized allocation to the CBSD(s) 314 itself.

Per steps 644 and 646, the CBSD broadcasts on the allocated sub-bands, and establishes a session with the relevant UE(s) 306c as previously described. Once the session is established, the session is optionally configured according to one or more MSO policies as dictated by the controller server portion 310a; i.e., per step 648, the controller 310a configures the CBSD(s) 314 (now operating as eNodeBs) according to e.g., previously agreed-upon policies between the MSO and MNO 411. These policies for the particular session are then communicated to the MNO per step 650.

FIG. 6c is a ladder diagram illustrating a third embodiment of a communication flow for establishing quasi-licensed band communication in accordance with the methods of the present disclosure. In this method 660, one or more WLAN AP controllers 455 are in data communication with the unified WLAN/CBRS controller 460 as shown.

Per step 662, the CBRS interference reports are sent to the controller 460 and the FSAS 202 as previously described. Additionally, per step 664, the WLAN AP controller(s) 455 generates and sends a WLAN status report, including data relevant to assessment of the operation of the WLAN APs with the target venue/area. For example, measured interference levels, SINR, RSSI, data throughput rates, connection drop frequency, etc. may be included with the periodic or aperiodic (e.g., event driven) reports transmitted to the MSO unified controller 460.

Per step 666, the controller 460 determines its need for CBRS spectrum (again, for whatever reason; in this case which may include e.g., evaluation of the WLAN data reporting indicating a sustained or impending loss of WLAN service to the UE within the venue/area), and issues a request to the DP 208 (residing within the CBSD at the service domain). The DP 208 formats the request according to the appropriate FSAS protocol and transmits the request per step 668; a spectrum grant/denial is subsequently received per step 670 at the DP 208.

Per step 672, the DP 208 (via the controller client 310b) informs the unified controller server 460 of the results (assume here a "grant" of spectrum), and accordingly the unified controller 460 utilizes the grant sub-band allocation information, along with the interference data of step 674, to optimize the CBRS spectrum allocations for the CBSDs. As in the embodiment of FIG. 6b, while the DP 208 and controller client 310b are co-located with the CBSD, the logic does not "short circuit" the grant directly to the CBSD 314.

Per steps 675 and 676, the CBSD broadcasts on the allocated sub-bands, and establishes a session with the relevant UE(s) 306c as previously described. Once the session is established, the session is optionally configured according to one or more MSO policies as dictated by the controller server portion 310a; i.e., per step 678, the controller 460 configures the CBSD(s) 314 (now operating as eNodeBs) according to e.g., previously agreed-upon policies between the MSO and MNO 411. These policies for the particular session are then communicated to the MNO per step 680.

Lastly, the controller 460 may cause one or more of the WLAN APs 314b within the venue to terminate or disconnect any ongoing sessions (including on a UE-specific basis)

and "forget" the UEs such that in order to re-establish WLAN communications, the UEs much basically start from the beginning of the WLAN/AP connection protocol (thereby assuring no concurrent communications on WLAN and CBRS are conducted by the same client 306c). It will be appreciated, however, that there may be scenarios where the controller 460 logic may decide to maintain concurrent WLAN and CBRS communications. For instance, in one implementation, the air interfaces may be "aggregated" (i.e., split across a common higher layer process, such as a media streaming/player app. requiring significant bandwidth). The higher layer process may be configured to view the two PHY air interfaces and supporting stacks as two lower layer "ports" (e.g., via with which it can transact packets independently, and hence divide the load of the streaming app across these two interfaces, assembling the packets once received into the temporal stream as indicated by the higher layer network streaming protocol (e.g., RTP/RTCP over UDP or TCP, or the like). For instance, one embodiment of such an app may run RTP over UDP as the network/transport layer protocols which provides a "best efforts" delivery over the two interfaces, yet with no QoS.

CBRS Controller Apparatus—

Figure 7A:
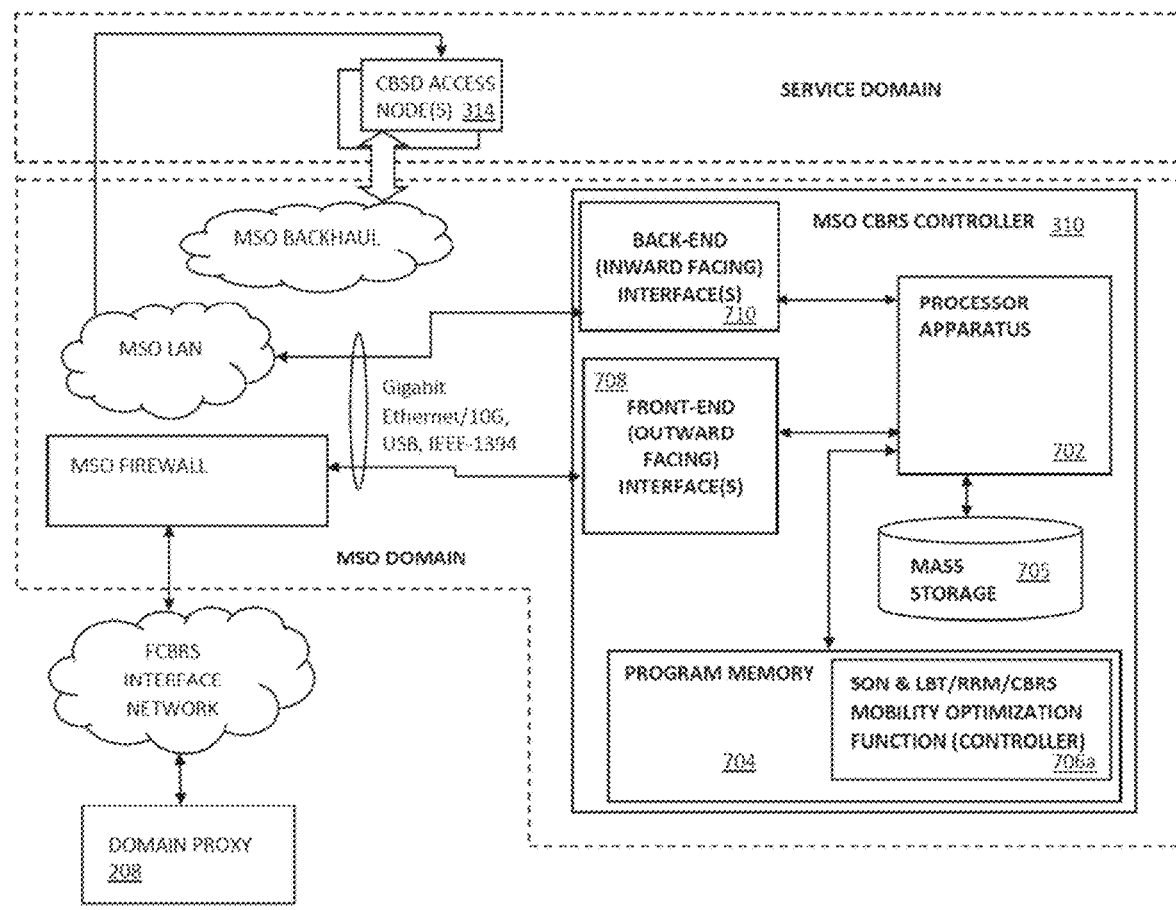
FIG. 7a is a functional block diagram illustrating a first exemplary embodiment of an MSO CBRS controller apparatus useful with various embodiments of the present disclosure.

FIG. 7a illustrates a block diagram of exemplary hardware and architecture of a controller apparatus, e.g., the CBRS controller 310 of FIG. 4a, useful for operation in accordance with the present disclosure.

In one exemplary embodiment as shown, the controller 310 includes, inter alia, a processor apparatus or subsystem 702, a program memory module 704, a connectivity manager module 706a (here implemented as software or firmware operative to execute on the processor 702), a back-end (inward-facing) network interface 710 for internal MSO communications and control data communication with the relevant CBSD(s) 314, and a front-end or outward-facing network interface 708 for communication with the DP 208 (and ultimately the FSAS 202 via a Federal secure interface network, or CSAS 420) via an MSO-maintained firewall or other security architecture. Since CBRS controllers could feasibly be employed for surreptitious activity, each should be secure from, inter alia, intrusive attacks or other such events originating from the public Internet/ISP network 311 (FIG. 3a) or other sources.

Accordingly, in one exemplary embodiment, the controllers 310 are each configured to utilize a non-public IP address within a CBRS "DMZ" of the MSO network. As a brief aside, so-called DMZs (demilitarized zones) within a network are physical or logical sub-networks that separate an internal LAN, WAN, PAN, or other such network from other untrusted networks, usually the Internet. External-facing servers, resources and services are disposed within the DMZ so they are accessible from the Internet (and hence e.g., DPs 208 responding to MSO-initiated CBRS spectrum allocation requests), but the rest of the internal MSO infrastructure remains unreachable or partitioned. This provides an additional layer of security to the internal infrastructure, as it restricts the ability of surreptitious entities or processes to directly access internal MSO servers and data via the untrusted network, such as via a DP "spoof" or MITM attack.

In addition, the controller 310 of the exemplary implementation is configured to only respond to a restricted set of protocol functions; i.e., authentication challenges from a valid DP 208 or SAS 202 (i.e., those on a "white list" maintained by the MSO), requests for interference monitoring data from a DP or SAS, resource allocation ACKs, etc.

Although the exemplary controller 310 may be used as described within the present disclosure, those of ordinary skill in the related arts will readily appreciate, given the present disclosure, that the controller apparatus may be virtualized and/or distributed within other network or service domain entities (as in the distributed controller architecture of FIGS. 4b and 7b described below), and hence the foregoing apparatus 310 is purely illustrative.

More particularly, the exemplary controller apparatus 310 can be physically located near or within the centralized operator network (e.g., MSO network); within or co-located with a CBSD (as in the embodiment of FIG. 4b); within an intermediate entity, e.g., within a data center, such as a WLAN AP controller (see FIG. 4c; and/or within "cloud" entities or other portions of the infrastructure of which the rest of the wireless network (as discussed supra) is a part, whether owned/operated by the MSO or otherwise. In some embodiments, the CBRS controller 310 may be one of several controllers, each having equivalent effectiveness or different levels of use, e.g., within a hierarchy (e.g., the controller 310 may be under a "parent" controller that manages multiple slave or subordinate controllers, with each of the "slaves" for example being designated to control functions within their own respective venue(s)).

In one embodiment, the processor apparatus 702 may include one or more of a digital signal processor, microprocessor, field-programmable gate array, or plurality of processing components mounted on one or more substrates. The processor apparatus 702 may also comprise an internal cache memory. The processing subsystem is in communication with a program memory module or subsystem 704, where the latter may include memory which may comprise, e.g., SRAM, flash and/or SDRAM components. The memory module 704 may implement one or more of direct memory access (DMA) type hardware, so as to facilitate data accesses as is well known in the art. The memory module of the exemplary embodiment contains one or more computer-executable instructions that are executable by the processor apparatus 702. A mass storage device (e.g., HDD or SSD, or even NAND flash or the like) is also provided as shown.

The processor apparatus 702 is configured to execute at least one computer program stored in memory 704 (e.g., the logic of the CBRS controller in the form of software or firmware that implements the various controller functions described herein with respect to CBRS spectrum allocation, CBSD environmental monitoring, etc.). Other embodiments may implement such functionality within dedicated hardware, logic, and/or specialized co-processors (not shown).

In one embodiment, the mobility optimization manager 706a is further configured to register known downstream devices (e.g., access nodes including CBSDs and WLAN APs), other backend devices, and wireless client devices (remotely located or otherwise), and centrally control the broader wireless network (and any constituent peer-to-peer sub-networks). Such configuration include, e.g., providing network identification (e.g., to CBSDs, APs, client devices, and other devices, or to upstream devices), identifying network congestion, Self Optimization (SO) functions, and managing capabilities supported by the wireless network. In one implementation, one or more primary factors is/are used as a basis to structure the optimization to maximize or optimize the primary factor(s). For example, if the goal at given instance is to push a larger amount of data (i.e., throughput) such as in the downlink direction (DL), the UEs or devices with better signaling may be chosen by the optimization logic to transact more data in an efficient manner (effectively "path of least resistance" logic). This can also be applied to for instance a higher subscriber service tier vs. a lower subscriber tier; the higher tier may be allocated available bandwidth (at least to a prescribed degree or value) before bandwidth is allocated to the lower tier, so as to ensure the user experience for the higher tier is sufficient. Alternatively, the goal may be more equitable distribution of resources (i.e., radio/backhaul/core resources) among different users, access networks, partners and/or different types of services (e.g., voice versus data, QoS versus non-QoS, etc.), logic to balance the resources across the different user, etc. may be employed. See, e.g., U.S. Pat. No. 9,730,143 to Gormley, et al. issued Aug. 8, 2017 and entitled "Method and apparatus for self organizing networks;" U.S. Pat. No. 9,591,491 to Tapia issued Mar. 7, 2017 entitled "Self-organizing wireless backhaul among cellular access points;" and U.S. Pat. No. 9,730,135 to Rahman issued Aug. 8, 2017, entitled "Radio access network resource configuration for groups of mobile devices," each of the foregoing incorporated herein by reference in its entirety, for exemplary SON implementations useful with various aspects of the present disclosure.

In some embodiments, the mobility optimization manager 706a may also be capable of obtaining data, and even use M2M learning or other logic to identify and learn patterns among detected RF signals (e.g., CBSD allocations and/or withdrawals occur at certain times of day or locations, or how often a particular CBSD 314 needs to implement re-allocation of CBRS spectrum). Patterns may be derived from, for example, analysis of historical data collected from the reports from the LTE radio suite 809 (FIG. 8a), the MSO database 404, or other sources over time.

In one embodiment, the mobility optimization manager 706a accesses the mass storage 705 (or the CBRS DB 404) to retrieve stored data. The data or information may relate to reports or configuration files as noted above. Such reports or files may be accessible by the mobility optimization manager 706a and/or processor 702, as well as other network entities, e.g., a CM 444 provisioning server 417 (FIG. 4b) or wireless nodes (CBSDs 314a or APs 314b).

In other embodiments, application program interfaces (APIs) such as those included in an MSO-provided applications, installed with other proprietary software, or natively available on the controller apparatus (e.g., as part of the computer program noted supra or exclusively internal to the mobility optimization manager 706a) may also reside in the internal cache or other memory 704. Such APIs may include common network protocols or programming languages configured to enable communication with other network entities as well as receipt and transmit signals that a receiving device (e.g., CBSD, WLAN AP, client device) may interpret.

In another embodiment, the mobility optimization manager 706 is further configured to communicate with one or more authentication, authorization, and accounting (AAA) servers of the network. The AAA servers are configured to provide services for, e.g., authorization and/or control of network subscribers for controlling access and enforcing policies related thereto with respect to computer resources, enforcing policies, auditing usage, and providing the information necessary to bill for services. AAA servers may further be useful for providing subscriber-exclusive features or content via, e.g., downloadable MSO-provided applications.

In some variants, authentication processes are configured to identify a CBSD 314 or an AP 314b, a client device 306c, or an end user, such as by having the client device identify or end user enter valid credentials (e.g., user name and password, or Globally Unique Identifier (GUID)) before network access or other services provided by the operator may be granted to the client device and its user. Following authentication, the AAA servers may grant authorization to a subscriber user for certain features, functions, and/or tasks, including access to MSO-provided email account, cloud storage account, streaming content, billing information, exclusive media content, etc. Authentication processes may be configured to identify or estimate which of the known CBSDs 314a serviced by the CBRS controller 310 tend to serve users or client devices that subscribe to the MSO's services, thereby providing additional insights with respect to how a particular CBSD may be treated. For example, if a first CBSD serves many clients relative to another CBSD or AP, the controller 310 may favor the first CBSD by, e.g., allocating CBRS sub-bands preferentially or in greater number/bandwidth, resulting in a better or additional end-user experiences for subscribers using that first CBSD.

Returning to the exemplary embodiment as shown in FIG. 7a, one or more network "front-end" or outward-facing interfaces 708 are utilized in the illustrated embodiment for communication with external (non-MSO) network entities, e.g., DPs 208, via, e.g., Ethernet or other wired and/or wireless data network protocols.

In the exemplary embodiment, one or more backend interfaces 710 are configured to transact one or more network address packets with other MSO networked devices, particularly backend apparatus such as the MSO-operated CBSDs 314a and WLAN APs 314b (FIG. 7b) within the target venue/area. Other MSO entities such as the MSO CMTS, Layer 3 switch, network monitoring center, AAA server, etc. may also be in communication with the controller 310 according to a network protocol. Common examples of network routing protocols include for example: Internet Protocol (IP), Internetwork Packet Exchange (IPX), and Open Systems Interconnection (OSI) based network technologies (e.g., Asynchronous Transfer Mode (ATM), Synchronous Optical Networking (SONET), Synchronous Digital Hierarchy (SDH), Frame Relay). In one embodiment, the backend network interface(s) 710 operate(s) in signal communication with the backbone of the content delivery network (CDN), such as that of FIGS. 3-4c. These interfaces might comprise, for instance, GbE (Gigabit Ethernet) or other interfaces of suitable bandwidth capability.

It will also be appreciated that the two interfaces 708, 710 may be aggregated together and/or shared with other extant data interfaces, such as in cases where a controller function is virtualized within another component, such as an MSO network server performing that function.

Figure 7B:
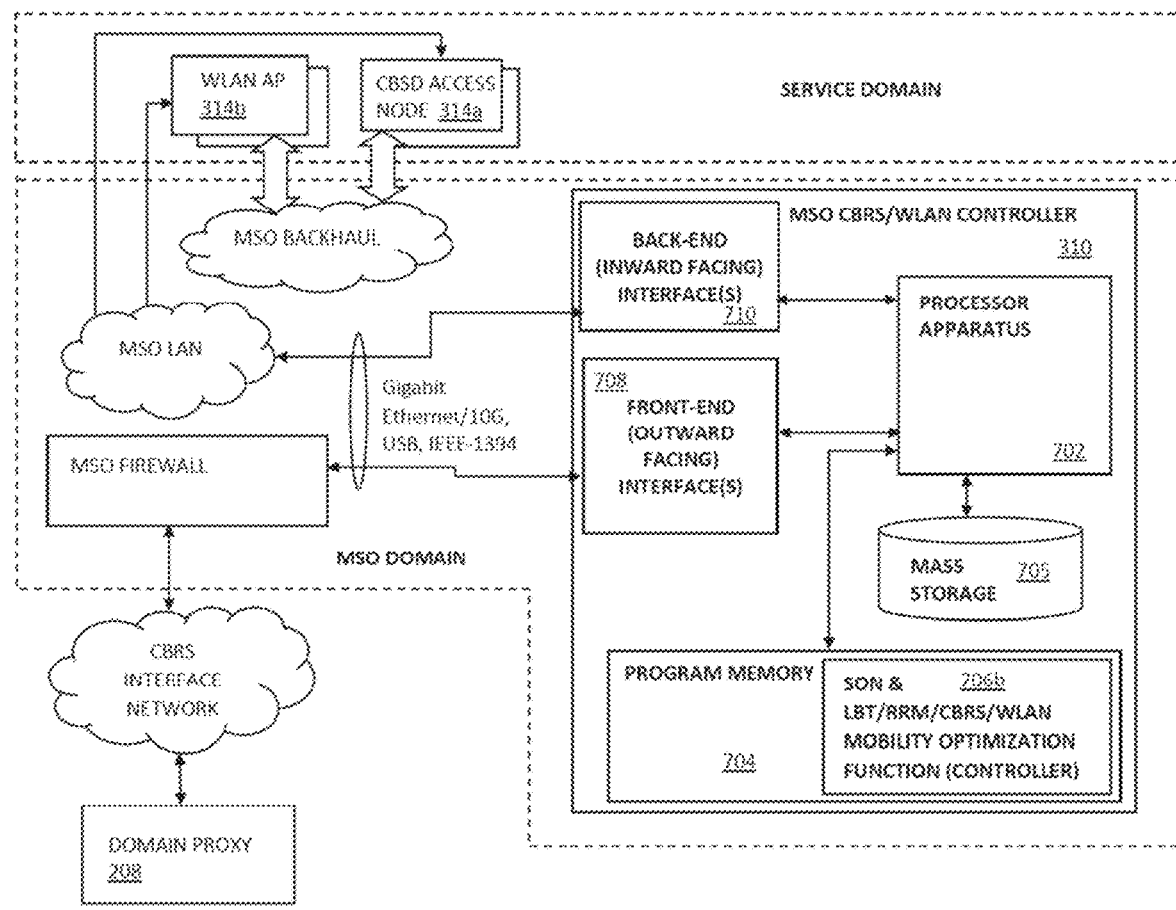
FIG. 7b is a functional block diagram illustrating a second exemplary embodiment of an MSO CBRS controller apparatus useful with various embodiments of the present disclosure.

FIG. 7b is a functional block diagram illustrating a second exemplary embodiment of an MSO CBRS controller apparatus. In the embodiment of FIG. 7b, the controller 310 is configured to interface with one or more WLAN APs 314b within the venue/area (in addition to the CBSDs 314a), and includes a mobility and optimization function 706b that considers data relating to both WLAN and CBSD functions, and optimizes MSO user or subscriber experience for both collectively. For example, in one implementation, the logic of the controller function 706b obtains WLAN AP performance data relating to one or more MSO users or subscribers in the venue (including e.g., data throughput; frequency of dropped connections, other sensed interferers in the WLAN frequency band), and utilizes such data to (i) allocate CBRS spectrum to any users experiencing WLAN degradation (and whose client devices include the appropriate RAT technology for the co-located CBSDs; e.g., LTE, and (ii) cause request for spectrum within the CBRS band(s) from the relevant SAS function if not already allocated to the venue. Moreover, the controller function 706b can provide the aforementioned CBRS interference reporting functions (as may be mandated by the FSAS or CSAS), and manage frequency band migration within the CBRS bands in the case of spectrum withdrawal by the cognizant SAS.

Figure 7C:
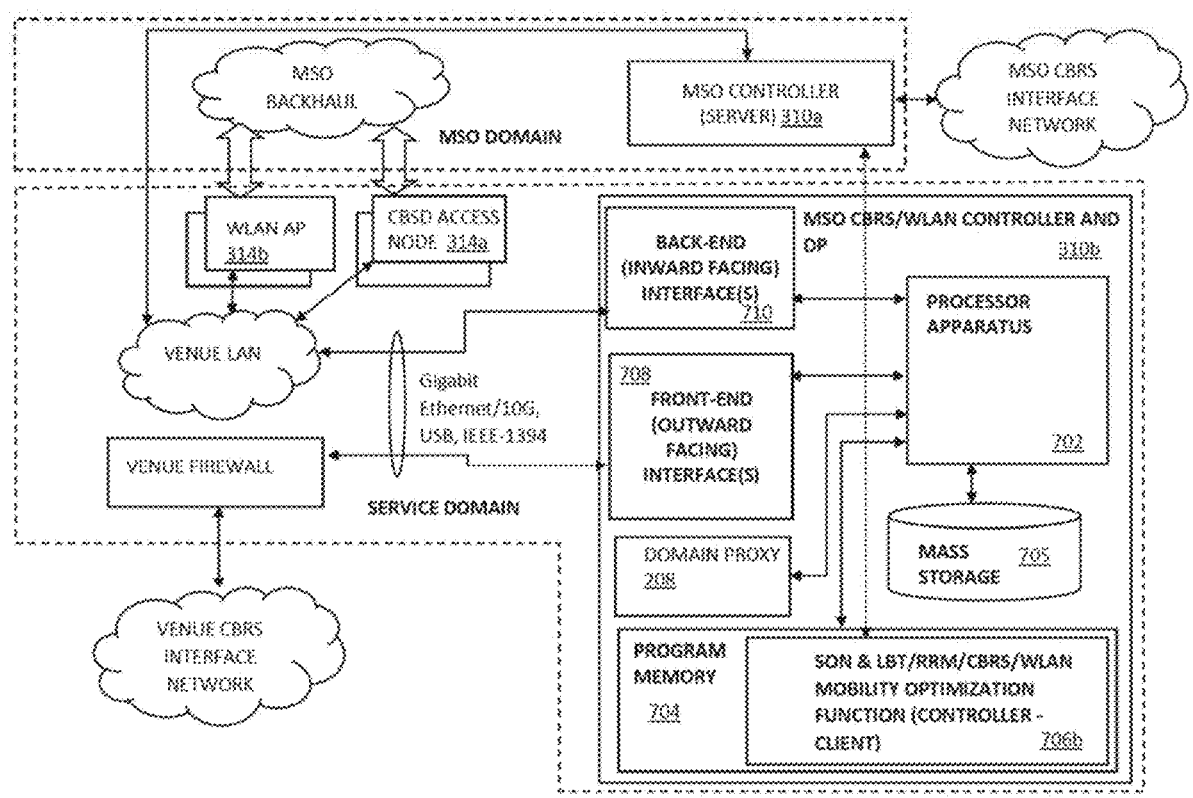
FIG. 7c is a functional block diagram illustrating a third exemplary embodiment of an MSO CBRS controller apparatus useful with various embodiments of the present disclosure.

FIG. 7c is a functional block diagram illustrating a third exemplary embodiment of an MSO CBRS controller apparatus. In this embodiment, the controller 310 (client portion in the form of the mobility optimization process 706b), CBSDs 314a, WLAN APs 314b, and DP 208 are integrated into the controller apparatus 310b disposed within the target service domain. The WLAN AP and CBSD utilize the MSO backhaul 311 as the high-speed "data pipe" for WLAN and CBRS communications within the venue, and the CBSD and WLAN AP are connected for control functions to the controller 310b via a local venue LAN. Logical communication is maintained between the server and client controller portions 310, 310b via the LAN or other means. The server portion 310a can communicate via its own CBRS access network to the FSAS 202 or CSAS 420 (e.g., via an external DP, not shown), as can the venue system. In this manner, at least some communications such as CBSD environment reporting to the FSAS 202 can be conducted independently of the MSO if desired, and likewise the MSO server portion 310b can access data and make spectrum allocation requests (e.g., for other venues) independently of the local controller 310b or venue system.

CBSD Apparatus—

Figure 8A:
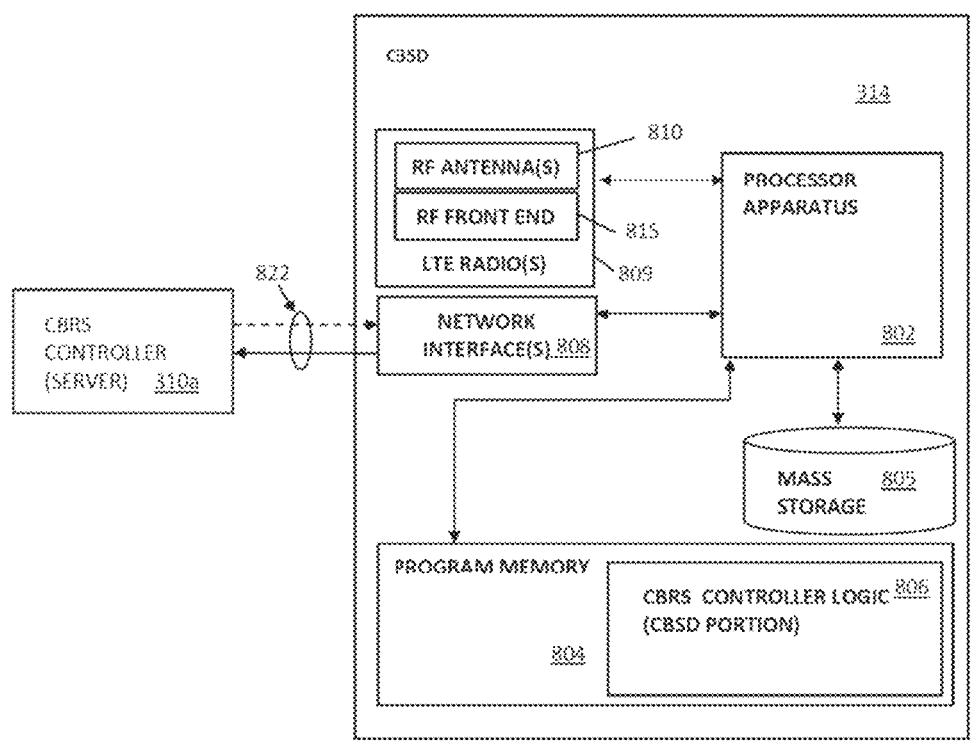
FIG. 8a is a functional block diagram illustrating an exemplary Citizens Broadband radio Service Device (CBSD) useful with various embodiments of the present disclosure.

FIG. 8a illustrates an exemplary CBSD access node 314 according to the present disclosure. As shown, the CBSD 314 includes, inter alia, a processor apparatus or subsystem 802, a program memory module 804, mass storage 805, a CBRS client or local portion 806, one or more network (e.g., controller server portion 310a and LAN) interfaces 808, as well as one or more radio frequency (RF) devices 809 having, inter alia, antenna(e) 810 and one or more RF tuners 815.

In the exemplary embodiment, the processor 802 may include one or more of a digital signal processor, microprocessor, field-programmable gate array, or plurality of processing components mounted on one or more substrates. The processor 802 may also comprise an internal cache memory, and is in communication with a memory subsystem 804, which can comprise, e.g., SRAM, flash and/or SDRAM components. The memory subsystem may implement one or more of DMA type hardware, so as to facilitate data accesses as is well known in the art. The memory subsystem of the exemplary embodiment contains computer-executable instructions which are executable by the processor 802.

The RF antenna(s) 810 are configured to detect signals from radio access technologies (RATs) in the venue. For example, Wi-Fi signals and LTE (including, e.g., LTE, LTE-A, LTE-U, LTE-LAA) signals may be detected, along with networking information such as number and type of RATs (e.g., Wi-Fi, LTE, LTE-A, LTE-U, LTE-LAA), frequency bands used (e.g., 2.4 or 5.0 GHz among others), channels the signals are occupying, number of connections, etc.

The tuner 815 in one embodiment comprises a digitally controlled RF tuner capable of reception of signals via the RF front end (receive chain) of the radio 809 in the aforementioned bands, including simultaneous reception (e.g., both 2.4 and 5.0 GHz band at the same time), and has sufficient reception bandwidth to identify emitters that are significantly below or above the above-listed nominal frequencies, yet still within the relevant operating band restrictions (e.g., within the relevant CBRS band).

The processing apparatus 802 is configured to execute at least one computer program stored in memory 804 (e.g., a non-transitory computer readable storage medium); in the illustrated embodiment, such programs include a scanner portion of the CM application 806. Other embodiments may implement such functionality within dedicated hardware, logic, and/or specialized co-processors (not shown).

Figure 8B:
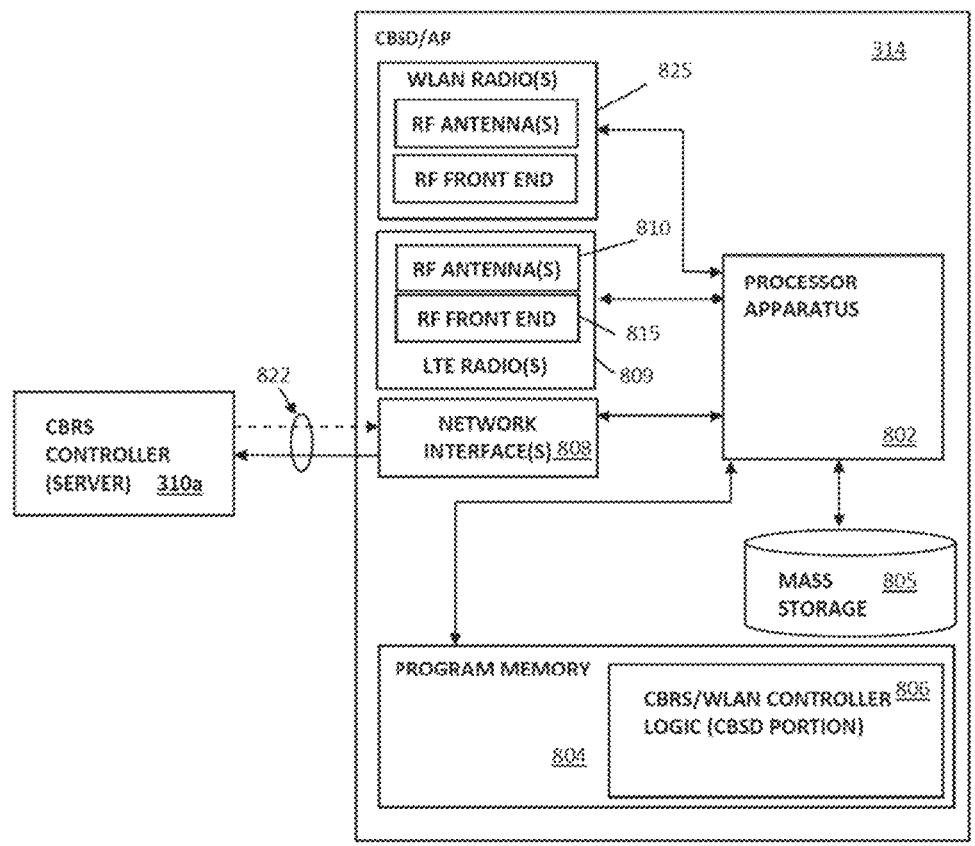
FIG. 8b is a functional block diagram illustrating another embodiment of an exemplary Citizens Broadband radio Service Device (CBSD) including WLAN AP functionality, useful with various embodiments of the present disclosure.

FIG. 8b is a functional block diagram illustrating another embodiment of an exemplary Citizens Broadband radio Service Device (CBSD) including WLAN AP functionality.

Business Methods—

The foregoing examples and embodiments may be utilized for methods directed to furthering business operations of service providers (e.g., cable operators).

As one example, data services provided by an MSO (e.g., cable operator) via its Wi-Fi infrastructure may also be delivered to subscribers (and potential customers) via the CBRS infrastructure, whether as an elective option or by "seamless" decision of the MSO (e.g., when WLAN coverage is spotty or limited in bandwidth, when cost or user-experience considerations dictate, etc.). By increasing the availability of a complementary service to extant Wi-Fi, subscribers are given more options for connecting to the network (e.g., the Internet), including in venues or areas where Wi-Fi coverage may not be optimal. Given their different development philosophies and technical considerations, IEEE Std. 802.11 technology arguably has certain strengths and weaknesses as compared to LTE-based solutions. One salient issue with LTE, as previously described, has been the requirement for use with licensed spectrum and an MNO. The present disclosure couples the prior realization that LTE can be utilized with unlicensed spectrum (i.e., per LTE/LTE-A, LTE-LAA or LTE-U) and its inherent advantage in range over, inter alia, WLAN technologies such as Wi-Fi (802.11), with some of the stronger attributes of the "Wi-Fi" model (i.e., easy and free access, ubiquity, comparatively good performance), to provide MSO users and subscribers with an optimal user experience. Users may feel that the services they have subscribed to (or have utilized on a trial or incidental without being a subscriber) are highly accessible (i.e., good network coverage), thus improving customer experience and satisfaction, for example as compared to competing service providers. This is especially true where the service is branded by the MSO; i.e., associated directly with the MSO as opposed to the venue.

For instance, a Charter Communications-sponsored event at a venue may, as part of its available services, have Wi-Fi "stuffed beacons" as previously described herein advertising the availability of Charter CBRS at the event. Non-subscriber users who have their Wi-Fi enabled can receive the information via the stuffed beacons (e.g., as a small pop-up or textual/ticker notification), and enabling the notified user to merely click on a link to access the appropriate URL for further information or facilitating use of the CBRS services, rather than utilize e.g., their non-CBRS LTE interface (i.e., used of licensed spectrum via their MNO). Assuming the provided CBRS services (e.g., connectivity/persistence, data rate, etc.) to be comparatively good with respect to other RATs such as WLAN, then user will be favorably impressed with the performance level and ease of connection.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

APPENDIX I

LTE frequency bands - TS 36.101 (Rel. 14 Jun. 2017)

| Band | Name | Downlink (MHz) Low | Middle EARFCN[1] | High | Bandwidth DL/UL (MHz) | Uplink (MHz) Low | Middle EARFCN | High | Duplex spacing (MHz) | Equivalent UMTS band |
|---|---|---|---|---|---|---|---|---|---|---|
| 1 | 2100 | 2110 | 2140 | 2170 | 60 | 1920 | 1950 | 1980 | 190 | 1 |
|   |   | 0 | 300 | 599 |   | 18000 | 18300 | 18599 |   |   |
| 2 | 1900 PCS | 1930 | 1960 | 1990 | 60 | 1850 | 1880 | 1910 | 80 | 2 |
|   |   | 600 | 900 | 1199 |   | 18600 | 18900 | 19199 |   |   |
| 3 | 1800+ | 1805 | 1842.5 | 1880 | 75 | 1710 | 1747.5 | 1785 | 95 | 3 |
|   |   | 1200 | 1575 | 1949 |   | 19200 | 19575 | 19949 |   |   |
| 4 | AWS-1 | 2110 | 2132.5 | 2155 | 45 | 1710 | 1732.5 | 1755 | 400 | 4 |
|   |   | 1950 | 2175 | 2399 |   | 19950 | 20175 | 20399 |   |   |
| 5 | 850 | 869 | 881.5 | 894 | 25 | 824 | 836.5 | 849 | 45 | 5 |
|   |   | 2400 | 2525 | 2649 |   | 20400 | 20525 | 20649 |   |   |
| 6 | UMTS only | 875 | 880 | 885 | 10 | 830 | 835 | 840 | 45 | 6 |
|   |   | 2650 | 2700 | 2749 |   | 20650 | 20700 | 20749 |   |   |
| 7 | 2600 | 2620 | 2655 | 2690 | 70 | 2500 | 2535 | 2570 | 120 | 7 |
|   |   | 2750 | 3100 | 3449 |   | 20750 | 21100 | 21449 |   |   |
| 8 | 900 GSM | 925 | 942.5 | 960 | 35 | 880 | 897.5 | 915 | 45 | 8 |
|   |   | 3450 | 3625 | 3799 |   | 21450 | 21625 | 21799 |   |   |
| 9 | 1800 | 1844.9 | 1862.4 | 1879.9 | 35 | 1749.9 | 1767.4 | 1784.9 | 95 | 9 |
|   |   | 3800 | 3975 | 4149 |   | 21800 | 21975 | 22149 |   |   |
| 10 | AWS-1+ | 2110 | 2140 | 2170 | 60 | 1710 | 1740 | 1770 | 400 | 10 |
|   |   | 4150 | 4450 | 4749 |   | 22150 | 22450 | 22749 |   |   |
| 11 | 1500 Lower | 1475.9 | 1485.9 | 1495.9 | 20 | 1427.9 | 1437.9 | 1447.9 | 48 | 11 |
|   |   | 4750 | 4850 | 4949 |   | 22750 | 22850 | 22949 |   |   |
| 12 | 700 a | 729 | 737.5 | 746 | 17 | 699 | 707.5 | 716 | 30 | 12 |
|   |   | 5010 | 5095 | 5179 |   | 23010 | 23095 | 23179 |   |   |
| 13 | 700 c | 746 | 751 | 756 | 10 | 777 | 782 | 787 | -31 | 13 |
|   |   | 5180 | 5230 | 5279 |   | 23180 | 23230 | 23279 |   |   |
| 14 | 700 PS | 758 | 763 | 768 | 10 | 788 | 793 | 798 | -30 | 14 |
|   |   | 5280 | 5330 | 5379 |   | 23280 | 23330 | 23379 |   |   |
| 17 | 700 b | 734 | 740 | 746 | 12 | 704 | 710 | 716 | 30 |   |
|   |   | 5730 | 5790 | 5849 |   | 23730 | 23790 | 23849 |   |   |
| 18 | 800 Lower | 860 | 867.5 | 875 | 15 | 815 | 822.5 | 830 | 45 |   |
|   |   | 5850 | 5925 | 5999 |   | 23850 | 23925 | 23999 |   |   |
| 19 | 800 Upper | 875 | 882.5 | 890 | 15 | 830 | 837.5 | 845 | 45 | 19 |
|   |   | 6000 | 6075 | 6149 |   | 24000 | 24075 | 24149 |   |   |
| 20 | 800 DD | 791 | 806 | 821 | 30 | 832 | 847 | 862 | -41 | 20 |
|   |   | 6150 | 6300 | 6449 |   | 24150 | 24300 | 24449 |   |   |
| 21 | 1500 Upper | 1495.9 | 1503.4 | 1510.9 | 15 | 1447.9 | 1455.4 | 1462.9 | 48 | 21 |
|   |   | 6450 | 6525 | 6599 |   | 24450 | 24525 | 24599 |   |   |
| 22 | 3500 | 3510 | 3550 | 3590 | 80 | 3410 | 3450 | 3490 | 100 | 22 |
|   |   | 6600 | 7000 | 7399 |   | 24600 | 25000 | 25399 |   |   |
| 23 | 2000 S-band | 2180 | 2190 | 2200 | 20 | 2000 | 2010 | 2020 | 180 |   |
|   |   | 7500 | 7600 | 7699 |   | 25500 | 25600 | 25699 |   |   |
| 24 | 1600 L-band | 1525 | 1542 | 1559 | 34 | 1626.5 | 1643.5 | 1660.5 | -101.5 |   |
|   |   | 7700 | 7870 | 8039 |   | 25700 | 25870 | 26039 |   |   |
| 25 | 1900+ | 1930 | 1962.5 | 1995 | 65 | 1850 | 1882.5 | 1915 | 80 | 25 |
|   |   | 8040 | 8365 | 8689 |   | 26040 | 26365 | 26689 |   |   |
| 26 | 850+ | 859 | 876.5 | 894 | 35 | 814 | 831.5 | 849 | 45 | 26 |
|   |   | 8690 | 8865 | 9039 |   | 26690 | 26865 | 27039 |   |   |
| 27 | 800 SMR | 852 | 860.5 | 869 | 17 | 807 | 815.5 | 824 | 45 |   |
|   |   | 9040 | 9125 | 9209 |   | 27040 | 27125 | 27209 |   |   |

APPENDIX I-continued

LTE frequency bands - TS 36.101 (Rel. 14 Jun. 2017)

| Band | Name | Downlink (MHz) Low | Downlink (MHz) Middle EARFCN[1] | Downlink (MHz) High | Bandwidth DL/UL (MHz) | Uplink (MHz) Low | Uplink (MHz) Middle EARFCN | Uplink (MHz) High | Duplex spacing (MHz) | Equivalent UMTS band |
|---|---|---|---|---|---|---|---|---|---|---|
| 28 | 700 APT | 758 | 780.5 | 803 | 45 | 703 | 725.5 | 748 | 55 | |
| | | 9210 | 9435 | 9659 | | 27210 | 27435 | 27659 | | |
| 29 | 700 d | 717 | 722.5 | 728 | 11 | Downlink only | | | | |
| | | 9660 | 9715 | 9769 | | | | | | |
| 30 | 2300 WCS | 2350 | 2355 | 2360 | 10 | 2305 | 2310 | 2315 | 45 | |
| | | 9770 | 9820 | 9869 | | 27660 | 27710 | 27759 | | |
| 31 | 450 | 462.5 | 465 | 467.5 | 5 | 452.5 | 455 | 457.5 | 10 | |
| | | 9870 | 9895 | 9919 | | 27760 | 27785 | 27809 | | |
| 32 | 1500 L-band | 1452 | 1474 | 1496 | 44 | Downlink only | | | | 32 |
| | | 9920 | 10140 | 10359 | | | | | | |
| 65 | 2100+ | 2110 | 2155 | 2200 | 90 | 1920 | 1965 | 2010 | 190 | |
| | | 65536 | 65986 | 66435 | | 131072 | 131522 | 131971 | | |
| 66 | AWS-3 | 2110 | 2155 | 2200 | 90/70 | 1710 | 1745 | 1780 | 400 | |
| | | 66436 | 66886 | 67335 | | 131972 | 132322 | 132671 | | |
| 67 | 700 EU | 738 | 748 | 758 | 20 | Downlink only | | | | |
| | | 67336 | 67436 | 67535 | | | | | | |
| 68 | 700 ME | 753 | 768 | 783 | 30 | 698 | 713 | 728 | 55 | |
| | | 67536 | 67686 | 67835 | | 132672 | 132822 | 132971 | | |
| 69 | 2500 | 2570 | 2595 | 2620 | 50 | Downlink only | | | | |
| | | 67836 | 68086 | 68335 | | | | | | |
| 70 | AWS-4 | 1995 | 2007.5 | 2020 | 25/15 | 1695 | 1702.5 | 1710 | 300 | |
| | | 68336 | 68461 | 68585 | | 132972 | 133047 | 133121 | | |
| 252 | Unlicensed NII-1 | 5150 | 5200 | 5250 | 100 | Downlink only | | | | |
| | | 255144 | 255644 | 256143 | | | | | | |
| 255 | Unlicensed NII-3 | 5725 | 5787.5 | 5850 | 125 | Downlink only | | | | |
| | | 260894 | 261519 | 262143 | | | | | | |
| | | | | | TDD | | | | | |
| 33 | TD 1900 | 1900 | 1910 | 1920 | 20 | | | | | A(lo) |
| | | 36000 | 36100 | 36199 | | | | | | |
| 34 | TD 2000 | 2010 | 2017.5 | 2025 | 15 | | | | | A(hi) |
| | | 36200 | 36275 | 36349 | | | | | | |
| 35 | TD PCS Lower | 1850 | 1880 | 1910 | 60 | | | | | B(lo) |
| | | 36350 | 36650 | 36949 | | | | | | |
| 36 | TD PCS Upper | 1930 | 1960 | 1990 | 60 | | | | | B(hi) |
| | | 36950 | 37250 | 37549 | | | | | | |
| 37 | TD PCS Center gap | 1910 | 1920 | 1930 | 20 | | | | | C |
| | | 37550 | 37650 | 37749 | | | | | | |
| 38 | TD 2600 | 2570 | 2595 | 2620 | 50 | | | | | D |
| | | 37750 | 38000 | 38249 | | | | | | |
| 39 | TD 1900+ | 1880 | 1900 | 1920 | 40 | | | | | F |
| | | 38250 | 38450 | 38649 | | | | | | |
| 40 | TD 2300 | 2300 | 2350 | 2400 | 100 | | | | | E |
| | | 38650 | 39150 | 39649 | | | | | | |
| 41 | TD 2500 | 2496 | 2593 | 2690 | 194 | | | | | |
| | | 39650 | 40620 | 41589 | | | | | | |
| 42 | TD 3500 | 3400 | 3500 | 3600 | 200 | | | | | |
| | | 41590 | 42590 | 43589 | | | | | | |
| 43 | TD 3700 | 3600 | 3700 | 3800 | 200 | | | | | |
| | | 43590 | 44590 | 45589 | | | | | | |
| 44 | TD 700 | 703 | 753 | 803 | 100 | | | | | |
| | | 45590 | 46090 | 46589 | | | | | | |
| 45 | TD 1500 | 1447 | 1457 | 1467 | 20 | | | | | |
| | | 46590 | 46690 | 46789 | | | | | | |
| 46 | TD Unlicensed | 5150 | 5537.5 | 5925 | 775 | | | | | |
| | | 46790 | 50665 | 54539 | | | | | | |
| 47 | TD V2X | 5855 | 5890 | 5925 | 70 | | | | | |
| | | 54540 | 54890 | 55239 | | | | | | |
| 48 | TD 3600 | 3550 | 3625 | 3700 | 150 | | | | | |
| | | 55240 | 55990 | 56739 | | | | | | |

[1]EUTRA Absolute RF Channel Number

What is claimed is:

1. Computerized controller apparatus for use within a managed content delivery network, the computerized controller apparatus being configured to manage wireless connectivity to one or more wireless-enabled devices utilized within a prescribed premises, the computerized controller apparatus comprising:
processor apparatus; and
storage apparatus in data communication with the processor apparatus and having a non-transitory computer-readable storage medium, the non-transitory computer-readable storage medium comprising at least one computer program having a plurality of instructions stored thereon, the plurality of instructions configured to, when executed by the processor apparatus, cause the computerized controller apparatus to:
detect congestion within an unlicensed frequency band utilized by the one or more wireless-enabled devices within the prescribed premises;
based at least on the detection, obtain access for the one or more wireless-enabled devices to a quasi-licensed frequency band; and
cause transmission of data, the transmitted data configured to (i) cause allocation of at least a portion of the quasi-licensed frequency band to the one or more wireless-enabled devices, and (ii) enable the one or more wireless-enabled devices to utilize at least the portion of the quasi-licensed frequency band.

2. The computerized controller apparatus of claim 1, wherein:
the one or more wireless-enabled devices comprise a plurality of multi-RAT (Radio Access Technology) capable wireless-enabled devices of respective subscribers of the managed content delivery network; and
the allocation of at least the portion of the quasi-licensed frequency band to the plurality of multi-RAT capable wireless-enabled devices comprises allocation of a plurality of sub-bands within the quasi-licensed frequency band to respective ones of the plurality of multi-RAT capable wireless-enabled devices of the respective subscribers only.

3. The computerized controller apparatus of claim 1, wherein:
the one or more wireless-enabled devices comprise a plurality of multi-RAT (Radio Access Technology) capable wireless-enabled devices of respective subscribers of the managed content delivery network; and
the allocation of at least the portion of the quasi-licensed frequency band to the plurality of multi-RAT capable wireless-enabled devices comprises causation of respective ones of the plurality of multi-RAT capable wireless-enabled devices to utilize a contention management protocol associated with one RAT to obtain access to a respective portion of the quasi-licensed frequency band.

4. The computerized controller apparatus of claim 3, wherein the quasi-licensed frequency band comprises at least a portion of one or more of Long-Term Evolution (LTE) bands 42 or 43.

5. The computerized controller apparatus of claim 3, wherein:
the one RAT comprises at least one of: (i) LTE-U (Long Term Evolution in unlicensed spectrum), and/or (ii) LTE-LAA (Long Term Evolution, Licensed Assisted Access); and
the contention management protocol comprises a listen-before-talk (LBT) protocol.

6. The computerized controller apparatus of claim 1, wherein:
the detection comprises detection of reduced radio link performance associated with a first data session established using a first wireless interface of at least one of the one or more wireless-enabled devices; and
the data configured to enable the one or more wireless-enabled devices to utilize at least the portion of the quasi-licensed frequency band comprises data configured to enable the one or more wireless-enabled devices to utilize the portion of the quasi-licensed frequency band via a second wireless interface, the utilization of the second wireless interface comprising maintenance of the first data session via at least one layer above a physical layer (PHY).

7. A computerized method for providing wireless connectivity to at least one wireless-enabled device, the computerized method comprising:
detecting a level of congestion within an unlicensed frequency band utilized by the at least one wireless-enabled;
based at least on the detecting, selecting a quasi-licensed frequency band for the at least one wireless-enabled device to access;
causing allocation of at least a portion of the quasi-licensed frequency band to the at least one wireless-enabled device; and
enabling the at least one wireless-enabled device to utilize at least the portion of the quasi-licensed frequency band.

8. The computerized method of claim 7, wherein:
the enabling of the at least one wireless-enabled device to utilize at least the portion of the quasi-licensed frequency band comprises causing the at least one wireless-enabled device to transition from a unlicensed wireless LAN (WLAN) interface to a wireless interface compliant with a Third Generation Partnership Project (3GPP)-based standard;
the unlicensed WLAN interface is configured to utilize an industrial, scientific, and medical radio (ISM) band; and
the wireless interface compliant with the 3GPP-based standard is configured to utilize a Citizens Broadband Radio Service (CBRS) band.

9. The computerized method of claim 7, further comprising:
identifying a first wireless access node apparatus then-currently configured to utilize the quasi-licensed frequency band; and
identifying a second wireless access node apparatus (i) then-currently configured to utilize quasi-licensed frequency band, and (ii) capable of supporting operation of the at least one wireless-enabled device;
wherein the causing of the allocation of at least the portion of the quasi-licensed frequency band to the at least one wireless-enabled device comprises causing transmission of data to the first wireless access node apparatus, the transmitted data configured to cause the at least one wireless-enabled device to transition from the first wireless access node apparatus to the second wireless access node apparatus.

10. The computerized method of claim 9, wherein the detecting of the congestion within the unlicensed frequency band comprises receiving data relating to a level of performance associated with the at least one wireless-enabled device; and the computerized method further comprises:

causing measurement of the level of performance associated with the at least one wireless-enabled device to cause the receipt of the data relating thereto;

based at least on the received data relating to the level of performance, causing at least one of (i) the at least one wireless-enabled device, or (ii) the first wireless access node apparatus, to implement one or more configuration changes; and based at least on the implemented one or more configuration changes failing to improve the level of performance relative to a prescribed threshold, evaluating available spectrum within the quasi-licensed frequency band.

11. The computerized method of claim 7, wherein the causing of the allocation of at least the portion of the quasi-licensed frequency band to the at least one wireless-enabled device comprises optimizing one or more resource allocations across a distribution network by combining Citizens Broadband Radio Service (CBRS) Spectrum Access System (SAS) channel allocations across two or more CBRS small-cells.

12. The computerized method of claim 7, wherein the causing of the allocation of at least the portion of the quasi-licensed frequency band to the at least one wireless-enabled device comprises:
  accessing a subscriber database to identify two or more wireless-enabled user devices associated with respective subscribers of a network operator; and
  preferentially allocating a plurality of carriers first to the identified two or more wireless-enabled user devices before further allocation is conducted.

13. The computerized method of claim 7, wherein the detecting of the level of the congestion within the unlicensed frequency band utilized by the at least one wireless-enabled device comprises receiving data indicative of multiple failed connection attempts by the least one wireless-enabled device to connect to a wireless access point using a wireless interface configured for the unlicensed frequency band.

14. Computer readable apparatus comprising a non-transitory storage medium, the non-transitory storage medium comprising at least one computer program having a plurality of instructions, the plurality of instructions configured to, when executed on a processing apparatus, cause a computerized controller apparatus to:
  detect a level of congestion within an unlicensed frequency band utilized by one or more wireless-enabled devices;
  based at least on the detection, transmit data representative of a request to a spectrum allocation entity for the one or more wireless-enabled devices to access a quasi-licensed frequency band; and
  cause transmission of data, the transmitted data configured to (i) cause allocation of at least a portion of the quasi-licensed frequency band to the one or more wireless-enabled devices, and (ii) enable the one or more wireless-enabled devices to utilize at least the portion of the quasi-licensed frequency band.

15. The computer readable apparatus of claim 14, wherein:
  the detection of the level of the congestion within the unlicensed frequency band utilized by the one or more wireless-enabled user devices comprises obtainment of data relating to one or more measured RF parameters; and
  the plurality of instructions are further configured to, when executed on the processing apparatus, cause the computerized controller apparatus to:
    based on the obtained data relating to the one or more measured RF parameters, determine that unlicensed wireless LAN (WLAN) service to the one or more wireless-enabled devices is degraded below a prescribed level;
    obtain configuration data associated with the one or more wireless-enabled devices; and
    based on the configuration data, determine whether the one or more wireless-enabled devices are compliant with at least one Third Generation Partnership Project (3GPP) wireless standard.

16. The computer readable apparatus of claim 14, wherein:
  the detection of the level of the congestion within the unlicensed frequency band utilized by the one or more wireless-enabled user devices comprises obtainment of data relating to one or more measured RF parameters; and
  the plurality of instructions are further configured to, when executed on the processing apparatus, cause the computerized controller apparatus to:
    based on the obtained data relating to the one or more measured RF parameters, determine a reduced radio link performance associated with a first data session established via use of a first wireless interface of the one or more wireless-enabled devices; and
  the transmitted data comprises data configured to enable the one or more wireless-enabled devices to utilize the quasi-licensed frequency band via a second wireless interface, the utilization of the second wireless interface comprising maintaining the first data session via at least one layer above a physical (PHY) layer.

17. The computer readable apparatus of claim 14, wherein:
  the one or more wireless-enabled devices comprise a plurality of multi-RAT (Radio Area Technology) capable wireless-enabled devices of respective ones of subscribers of a network operator; and
  the allocation of at least the portion of the quasi-licensed frequency band to the one or more wireless-enabled devices comprises causation of the respective ones of the plurality of multi-RAT capable wireless-enabled devices to utilize a contention management protocol associated with at least one RAT to obtain access to a respective portion of the quasi-licensed frequency band.

18. The computer readable apparatus of claim 14, wherein:
  the detection of the level of the congestion within the unlicensed frequency band utilized by the one or more wireless-enabled user devices comprises obtainment of data from one or more wireless-enabled user devices, the obtained data relating to one or more measured RF parameters for at least one wireless access node apparatus; and
  the transmitted data is further configured to cause the one or more wireless-enabled devices to transition from the at least one wireless access node apparatus to at least one second wireless access node apparatus in order to maintain one or more QoS (quality of service) requirements invoked by a network operator.

19. The computer readable apparatus of claim 14, wherein the transmission of the data representative of the request to the spectrum allocation entity comprises transmission of the data to a domain proxy (DP), the DP configured to communicate at least a portion of the data to a spectrum access system (SAS) to obtain access to the quasi-licensed frequency band, the quasi-licensed frequency band comprising a Citizens Broadband Radio Service (CBRS) band.

20. The computer readable apparatus of claim 14, wherein the detection of the congestion within the unlicensed frequency band utilized by the one or more wireless-enabled user devices comprises obtainment data from the one or more wireless-enabled user devices, the obtained data relating to one or more measured RF parameters for at least one wireless access node apparatus, the obtained data relating to the one or more measured RF parameters for the at least one wireless access node apparatus comprising data indicative of multiple failed connection attempts by the one or more wireless-enabled devices to connect to the at least one wireless access node apparatus, the at least one wireless access node apparatus comprising a wireless access point.

* * * * *

UNITED STATES PATENT AND TRADEMARK OFFICE
CERTIFICATE OF CORRECTION

PATENT NO.       : 11,632,677 B2
APPLICATION NO.  : 16/741626
DATED            : April 18, 2023
INVENTOR(S)      : Don Gunasekara et al.

It is certified that error appears in the above-identified patent and that said Letters Patent is hereby corrected as shown below:

In the Claims

Column 44, Lines 17-31, Claim 7, Currently reads:
7. A computerized method for providing wireless connectivity to at least one wireless-enabled device, the computerized method comprising:
    detecting a level of congestion within an unlicensed frequency band utilized by the at least one wireless-enabled;
    based at least on the detecting, selecting a quasi-licensed frequency band for the at least one wireless-enabled device to access;
causing allocation of at least a portion of the quasi-licensed frequency band to the at least one wireless-enabled device; and
enabling the at least one wireless-enabled device to utilize at least the portion of the quasi-licensed frequency band.

Should read:
7. A computerized method for providing wireless connectivity to at least one wireless-enabled device, the computerized method comprising:
    detecting a level of congestion within an unlicensed frequency band utilized by the at least one wireless-enabled device;
    based at least on the detecting, selecting a quasi-licensed frequency band for the at least one wireless-enabled device to access;
causing allocation of at least a portion of the quasi-licensed frequency band to the at least one wireless-enabled device; and
enabling the at least one wireless-enabled device to utilize at least the portion of the quasi-licensed frequency band.

Signed and Sealed this
Twenty-third Day of May, 2023

Katherine Kelly Vidal
*Director of the United States Patent and Trademark Office*